United States Patent
Wang et al.

(10) Patent No.: US 11,751,112 B2
(45) Date of Patent: *Sep. 5, 2023

(54) HANDOVER METHOD AND DEVICE

(71) Applicant: HUAWEI TECHNOLOGIES CO., LTD., Guangdong (CN)

(72) Inventors: Hong Wang, Beijing (CN); Wei Quan, Beijing (CN); Jian Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 115 days.

This patent is subject to a terminal disclaimer.

(21) Appl. No.: 17/201,776

(22) Filed: Mar. 15, 2021

(65) Prior Publication Data
US 2021/0352546 A1     Nov. 11, 2021

Related U.S. Application Data

(63) Continuation of application No. 16/579,550, filed on Sep. 23, 2019, now Pat. No. 10,986,549, which is a
(Continued)

(30) Foreign Application Priority Data

Mar. 24, 2017   (CN) .......................... 201710186542.6

(51) Int. Cl.
*H04W 36/08*     (2009.01)
*H04W 76/27*     (2018.01)
(Continued)

(52) U.S. Cl.
CPC ......... *H04W 36/08* (2013.01); *H04W 12/037* (2021.01); *H04W 12/04* (2013.01);
(Continued)

(58) Field of Classification Search
CPC ... H04W 36/08; H04W 12/037; H04W 12/04; H04W 36/0058; H04W 76/27;
(Continued)

(56) References Cited

U.S. PATENT DOCUMENTS 6,173,222 B1   1/2001   Seo et al.
6,476,731 B1   11/2002  Miki et al.
(Continued)

FOREIGN PATENT DOCUMENTS

CN    102281535 A    12/2011
CN    103582044 A    2/2014
(Continued)

OTHER PUBLICATIONS

Huawei, HiSilicon, DC based NR scheme for 0ms interruption handover. 3GPP TSG-RAN WG2 #99, Berlin, Germany, Aug. 21 25, 2017, R2-1708877, 7 pages.
(Continued)

*Primary Examiner* — Marisol Figueroa
(74) *Attorney, Agent, or Firm* — Womble Bond Dickinson (US) LLP

(57) ABSTRACT

A method includes: sending, by a first network device, a first configuration message to a terminal device, where the first configuration message is used to instruct the terminal device to configure a second ciphering/deciphering function associated with a second network device and share a first data packet numbering/reordering function, and the terminal device is configured with the first data packet numbering/reordering function and a first ciphering/deciphering function associated with the first network device; and receiving, by the first network device, a first configuration complete message sent by the terminal device. In this embodiment, the first configuration message is used so that the terminal device may configure the function associated with the sec-
(Continued)

ond network device. Therefore, during handover, the terminal device may simultaneously perform data transmission with the second network device and the first network device, to reduce or avoid a service interruption time caused by handover.

22 Claims, 22 Drawing Sheets

Related U.S. Application Data continuation of application No. PCT/CN2018/080279, filed on Mar. 23, 2018.

(51) Int. Cl.
    *H04W 36/00*     (2009.01)
    *H04W 12/04*     (2021.01)
    *H04W 12/037*     (2021.01)
    *H04W 74/08*     (2009.01)

(52) U.S. Cl.
    CPC ....... *H04W 36/0058* (2018.08); *H04W 76/27* (2018.02); *H04W 74/0833* (2013.01)

(58) Field of Classification Search
    CPC . H04W 74/0833; H04W 36/28; H04W 36/18; H04W 36/22
    See application file for complete search history.

(56) References Cited

U.S. PATENT DOCUMENTS

| | | | |
|---|---|---|---|
| 10,986,549 B2 * | 4/2021 | Wang | .................... H04W 76/27 |
| 2002/0084894 A1 | 7/2002 | Horng | |
| 2012/0327238 A1 | 12/2012 | Satoh | |
| 2014/0257640 A1 | 9/2014 | Mitsumoto et al. | |
| 2015/0175161 A1 | 6/2015 | Breed | |
| 2016/0205608 A1 | 7/2016 | Cho | |
| 2016/0262066 A1 | 9/2016 | Ozturk et al. | |
| 2017/0192426 A1 | 7/2017 | Rust | |
| 2018/0083972 A1 * | 3/2018 | Kim | .................... H04L 41/0853 |
| 2018/0199315 A1 * | 7/2018 | Hong | ........................ H04L 5/00 |
| 2019/0092333 A1 | 3/2019 | Ishioka | |
| 2019/0253942 A1 * | 8/2019 | Yoo | ........................ H04W 76/27 |

FOREIGN PATENT DOCUMENTS

| | | | | |
|---|---|---|---|---|
| EP | 3081433 A1 | 10/2016 | | |
| JP | 2016206868 A | 12/2016 | | |
| KR | 100250323 B1 | 1/2000 | | |
| KR | 20110051531 | 5/2011 | | |
| WO | WO-2008054276 A1 * | 5/2008 | ............ H04W 12/02 | |
| WO | 2013069099 A1 | 5/2013 | | |
| WO | 2015064931 A1 | 5/2015 | | |
| WO | 2015145255 A2 | 10/2015 | | |
| WO | 2016021820 A1 | 2/2016 | | |

OTHER PUBLICATIONS

Huawei, HiSilicon, Comparison of 0ms interruption solutions. 3GPP TSG-RAN WG2 #98, Hangzhou, China, May 15 19, 2017, R2-1704854, 7 pages.

Qualcomm Incorporated, Correct that in NB-IoT PDCP linked to support of S1-U data transfer. 3GPP TSG-RAN WG2 Meeting #96, Reno, USA, Nov. 14-18, 2016, R2-167743, 14 pages.

* cited by examiner

HANDOVER METHOD AND DEVICE

CROSS-REFERENCE TO RELATED APPLICATIONS

This application is a continuation of U.S. patent application Ser. No. 16/579,550, filed on Sep. 23, 2019, which is a continuation of is a continuation of International Application No. PCT/CN2018/080279, filed on Mar. 23, 2018, which claims priority to Chinese Patent Application No. 201710186542.6, filed on Mar. 24, 2017. All of the aforementioned patent applications are hereby incorporated by reference in their entireties.

TECHNICAL FIELD

This application relates to the communications field, and more specifically, to a handover method and a device.

BACKGROUND

Mobile communication not only strives for a maximal capacity but also prefers a wider coverage range, that is, wherever a terminal device moves, there is radio network signal coverage. To resolve a problem of limited frequency resources, increase system capacities, and extend network coverage ranges, the Bell Laboratories of America provides a concept of cellular networking. In cellular networking, a network service area is divided into many coverage areas using a regular hexagon as a basic geometric figure, where the coverage area is referred to as a cellular cell. A transmitter with relatively low power serves a cellular cell, and a relatively large quantity of terminal devices are disposed in a relatively small area. Actually, not all terminal devices can complete all continuous services in a cellular cell. To ensure service continuity, when a terminal device that is being served enters a neighboring cell, the service should be handed over to the neighboring cell in a communication network, so that a communication process is not interrupted. Handover is a process of handing over a link carrying communication data from a cell (or a network device) to another cell (or a network device) in a mobile communication process, to ensure that communication is not interrupted.

In the prior art, as service types increase, service data volumes rapidly grow, and moving speeds of terminal devices increase, there is an increasingly high requirement on a service interruption time in a handover process. For example, mobile office, mobile video services, wireless automobile control, and wireless train control general prefer zero service interruption. However, in the prior art, a service is usually interrupted during handover, affecting user experience.

Therefore, how to reduce or avoid service interruption during handover becomes a problem that should be resolved.

SUMMARY

Embodiments of this application provide a handover method and a device, to reduce or avoid service interruption during handover.

In one embodiment, a handover method is provided. The method includes:

sending, by a first network device, a first configuration message to a terminal device, where the first configuration message is used to instruct the terminal device to configure a second ciphering/deciphering function associated with a second network device and share a first data packet numbering/reordering function, and the terminal device is configured with the first data packet numbering/reordering function and a first ciphering/deciphering function associated with the first network device; and receiving, by the first network device, a first configuration complete message sent by the terminal device.

Therefore, in this embodiment, the first configuration message is used so that the terminal device may configure functions associated with the second network device. Therefore, during handover, the terminal device may simultaneously perform data transmission with the second network device and the first network device, to reduce or avoid a service interruption time caused by handover.

It should be understood that in this embodiment of this application, the first ciphering/deciphering function configured for the terminal device not only can perform ciphering processing on data, but also can perform deciphering processing on data. "/" indicates that the first ciphering/deciphering function can choose to perform only one corresponding processing on same data. For example, the first ciphering/deciphering function may perform ciphering processing on uplink data, and the first ciphering/deciphering function may perform deciphering processing on downlink data. Similarly, the first data packet numbering/reordering function not only can perform numbering processing on data, but also can perform reordering processing on data. "/" indicates that the first data packet numbering/reordering function can choose to perform only one corresponding processing on same data. For example, the first data packet numbering/reordering function may perform numbering processing on uplink data, and the first data packet numbering/reordering function may perform reordering processing on downlink data. Similarly, another function in this specification is similar to this, and to avoid repetition, details are not described one by one herein again.

In one embodiment, before the sending, by a first network device, a first configuration message to a terminal device, the method further includes:

sending, by the first network device, a first request message to the second network device, where the first request message is used to request to hand over the terminal device to the second network device or the first request message is used to request to add the second network device as an auxiliary service device for the terminal device, and the first request message includes at least one of the following:

a first security key that is allocated by the first network device to the second network device and that is associated with the terminal device;

a second security key that is used by the first network device and that is associated with the terminal device;

first indication information indicating that the terminal device has a multi-connection-based handover capability;

second indication information indicating that the terminal device has a multi-connection communication capability; and third indication information indicating whether data forwarded by the first network device to the second network device is a repeated version or a non-repeated version; and receiving, by the first network device, a response message sent by the second network device, where the response message is used to indicate that the second network device accepts a request of the first request message of the first network device, and the response message includes at least one of the following:

a third security key allocated by the second network device to the terminal device;

a configuration parameter used by the second network device to configure a Packet Data Convergence Protocol (Packet Data Convergence Protocol, PDCP) entity of the terminal device;

a configuration parameter used by the second network device to configure the terminal device to establish a second header adding/removing function and/or the second ciphering/deciphering function and/or a second header compression/decompression function corresponding to the second network device;

fourth indication information indicating that the terminal device uses the first data packet numbering/reordering function; and fifth indication information instructing the terminal device to use, during communication with the second network device, a security key that is allocated by the first network device to the terminal device and that corresponds to the first network device.

Specifically, in an initial state, the terminal device and the first network device (for example, an SeNB) establish an RRC connection, and the terminal device sends a measurement report to the first network device. The measurement report includes measurement results of the first network device (or a first cell) and a neighboring network device (or a neighboring cell) of the first network device. The measurement report includes reference signal received power (Reference Signal Received Power, RSRP) and/or reference signal received quality (Reference Signal Received Quality, RSRQ) and/or a signal to interference plus noise ratio (Signal to Interference plus Noise Ratio, SINR). A manner or an occasion of sending the measurement report by the terminal device may be configured by the first network device. This is not limited in this embodiment of this application.

When the first network device determines, based on the measurement report, that the terminal device satisfies a handover condition, a handover procedure is started. For example, when a signal of the first network device becomes weak, a handover procedure is started. Specifically, the network device may determine to add a secondary base station (Secondary eNB) for the terminal device and then the terminal device is handed over to the secondary base station, where the secondary base station may also be referred to as a target base station TeNB.

Specifically, the first network device sends a first request message to the second network device (for example, a TeNB).

It should be understood that the first security key is allocated to the second network device by the first network device, and is used by the second network device to perform data transmission with the terminal device. The second network device may perform data transmission with the terminal device directly by using the key, or the second network device generates another new security key based on the first security key, and then performs data transmission with the terminal device by using the new security key.

The second security key is a key for data transmission between the first network device and the terminal device, and the first network device may send the key to the second network device, so that the key is used for data transmission between the second network device and the terminal device. The second network device may perform data transmission with the terminal device directly by using the key, or the second network device generates another new security key based on the second security key, and then performs data transmission with the terminal device by using the new security key.

The first indication information is used to indicate that the terminal device has a multi-connection-based handover capability, and multi-connection-based handover may be understood as that the UE may establish a connection to two or more base stations in advance in a handover process, and then release a source base station.

The second indication information is used to indicate that the terminal device has a multi-connection communication capability, and multi-connection communication may be understood as that the UE may communicate with two or more base stations.

The third indication information is used to indicate whether data forwarded to the second network device by the first network device is a repeated version or a non-repeated version, where the repeated version may be understood as that the first network device copies a data packet and sends data packet to the second network device. Therefore, the data packet sent to the terminal device by the first network device and the second network device is actually repeated, and receiving reliability of the UE can be improved. The non-repeated version may be understood as that a data packet is either retained on the first network device, or sent to the second network device. When receiving data sent by the first network device and the second network device, the UE receives no repeated data.

When the third indication information indicates that the first network device forwards a repeated version to the second network device, the first network device and the second network device may send same data to the terminal device through two links, thereby improving data transmission reliability. For example, the first network device sends downlink data packets 1, 2, and 3 to the terminal device once, the first network device forwards the data packets 1, 2, and 3 to the second network device, and then the second network device sends the data packets 1, 2, and 3 to the terminal device once again. When the third indication information indicates that data forwarded to the second network device by the first network device is a non-repeated version, the first network device sends a part of downlink data from a core network to the terminal device, and the second network device sends a part of the downlink data to the terminal device. For example, for downlink data packets 1, 2, 3, and 4, the first network device sends the data packets 1 and 3 to the terminal device, the first network device forwards the data packets 2 and 4 to the second network device, and the second network device sends the data packets 2 and 4 to the terminal device.

The fourth indication information is used to indicate that the first data packet numbering/reordering function is used. It may be understood as that uplink data numbered by the first data packet numbering/reordering function may be sent to the first header compression/decompression function for compression processing, or may be sent to the second header compression/decompression function for processing, and then is correspondingly processed by a ciphering/deciphering function and a header adding/removing function corresponding to (the header compression/decompression function). Alternatively, it may be understood that uplink data numbered by the first data packet numbering/reordering function is sent to the first header compression/decompression function for compression processing, and then may be sent to the first ciphering/deciphering function for ciphering, or may be sent to the second ciphering/deciphering function for ciphering. A reverse process may be used for downlink data.

It should be further understood that, when receiving the request message sent by the first network device, the second network device may learn the second security key associated with the first network device and the terminal device, and the second network device may instruct, by using the fifth indication information, the terminal device to communicate with the second network device by using the second security key. No specific security key should be transferred and only one piece of the indication information, that is, the fifth indication information, is sent herein. The indication information has a relatively small data volume, for example, the indication information may be only one bit of 1 or 0. Therefore, this can reduce signaling overheads and save network resources.

Optionally, the first request message may further include at least one of the following:

an identifier (for example, an eNB ID) of the first network device, a serving PLMN of the first network device, a serving gateway (Serving Gateway, S-GW) identifier of the first network device, an identifier of the second network device, an interface S1 between an SeNB and an S-GW, a tunnel identifier used to send data, a quality of service (Quality of Service, QoS) parameter of the terminal device, an X2 interface between the first network device and the second network device, a tunnel identifier used to send uplink data, context information (UE context) of the terminal device, and the like.

In one embodiment, the second network device is configured with a third ciphering/deciphering function, the third ciphering/deciphering function corresponds to the second ciphering/deciphering function, the first network device is configured with a fourth ciphering/deciphering function, and the fourth ciphering/deciphering function corresponds to the first ciphering/deciphering function.

Specifically, before the first network device sends the first request message to the second network device, the terminal device is configured with the first PDCP entity corresponding to the first network device. As shown in FIG. 4, the first PDCP entity includes a first header adding/removing function, a first header compression/decompression function, a first ciphering/deciphering function, and a first data packet numbering/reordering function.

It should be understood that in this embodiment of this application, the security key may be used for ciphering/deciphering of the PDCP layer. The third security key may be the same as the first security key or the second security key. When the third security key is the same as the first security key, it indicates that the second network device communicates with the terminal device by using the key allocated to the second network device by the first network device. When the third security key is the same as the second security key, it indicates that the second network device and the first network device communicate with the terminal device by using a same key. Therefore, the terminal device may avoid performing ciphering or deciphering processing on data by using a new key, thereby improving a data processing speed and system performance.

The second network device configures a configuration parameter of a PDCP entity of the terminal device, and the configuration parameter is used to configure a function of the PDCP entity of the terminal device; and optionally, in one embodiment, the method further includes:

configuring, by the first network device, a fifth ciphering/deciphering function, and the fifth ciphering/deciphering function corresponds to the second ciphering/deciphering function.

To be specific, the first network device may configure both the fourth ciphering/deciphering function that communicates with the terminal device and that corresponds to the first ciphering/deciphering function, and the fifth ciphering/deciphering function that communicates with the terminal device and that corresponds to the second ciphering/deciphering function.

Optionally, in one embodiment, a second Packet Data Convergence Protocol PDCP entity and a first PDCP entity are established for the terminal device, the second PDCP entity includes the second ciphering/deciphering function and a second data packet numbering/reordering function, and the first PDCP entity includes the first ciphering/deciphering function and the first data packet numbering/reordering function;

when the terminal device processes downlink data, the first data packet numbering/reordering function of the first PDCP entity performs reordering processing on data on which the second ciphering/deciphering function of the second PDCP entity has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function of the second PDCP entity to perform ciphering processing; or the second ciphering/deciphering function and the first PDCP entity are established for the terminal device, and the first PDCP entity includes the first ciphering/deciphering function and the first data packet numbering/reordering function;

when the terminal device processes downlink data, the first data packet numbering/reordering function of the first PDCP entity performs reordering processing on data on which the second ciphering/deciphering function has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function to perform ciphering processing;

Optionally, in one embodiment, the method further includes:

sending, by the first network device, non-enciphered first data to the second network device, so that the second network device enciphers the first data by using the third ciphering/deciphering function, where the first data is a part or all of data received by a PDCP layer of the first network device from a higher layer of the PDCP layer; or receiving, by the first network device, second data that is sent by the second network device and that is deciphered by using the third ciphering/deciphering function.

Optionally, in one embodiment, the method further includes:

sending, by the first network device, third data enciphered by using the fifth ciphering/deciphering function to the second network device, where the third data is a part or all of data received by a PDCP layer of the first network device from a higher layer of the PDCP layer; or receiving, by the first network device, non-deciphered fourth data sent by the second network device; and deciphering, by the first network device, the fourth data by using the fifth ciphering/deciphering function.

Specifically, the first PDCP entity communicating with the first network device is established in the terminal device, the first PDCP entity includes the first ciphering/deciphering function and the first data packet numbering/reordering function, and the first PDCP entity may further include the first header adding/removing function and the first header compression/decompression function. After receiving the first configuration message, the terminal device may configure a corresponding function communicating with the second network device, or configure the second PDCP entity communicating with the second network device. The second PDCP entity includes the second ciphering/deciphering function and the second data packet numbering/reordering function, and the second PDCP entity may further include the second header adding/removing function and the second header compression/decompression function.

Because the terminal device shares the first data packet numbering/reordering function, when the terminal device processes the downlink data, the first data packet numbering/reordering function of the first PDCP entity performs reordering processing on the downlink data on which the second ciphering/deciphering function of the second PDCP entity has performed deciphering processing.

When the terminal device processes the uplink data, the first data packet numbering/reordering function of the first PDCP entity performs numbering processing on the data, and then sends the data to the first ciphering/deciphering function of the first PDCP entity and/or the second ciphering/deciphering function of the second PDCP entity for ciphering processing.

It should be understood that because the terminal device shares the first data packet numbering/reordering function, although the terminal device is configured with the second data packet numbering/reordering function of the PDCP, the second data packet numbering/reordering function is not used in an actual application.

Therefore, alternatively, after receiving the first configuration message, the terminal device does should not be configured with the entire second PDCP entity, and may be configured with only the second ciphering/deciphering function communicating with the second network device. The function of the first PDCP entity is still used for other functions. For example, the first data packet numbering/reordering function, the first header adding/removing function, and the first header compression/decompression function are shared.

In this case, when the terminal device processes downlink data, the first data packet numbering/reordering function of the first PDCP entity performs reordering processing on data on which the second ciphering/deciphering function has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function to perform ciphering processing;

Therefore, in this embodiment of this application, when communicating with the second network device, the terminal device may configure, by sharing the first data packet numbering/reordering function, only the second ciphering/deciphering function communicating with the second network device, and should not configure a complete PDCP entity, thereby reducing a configuration time and improving handover performance.

Alternatively, after receiving the first configuration message, the terminal device should not be configured with the entire second PDCP entity, and for example, may be configured with only the second ciphering/deciphering function and the second header adding/removing function communicating with the second network device. The function of the first PDCP entity is still used for other functions. For example, the first data packet numbering/reordering function and the first header compression/decompression function are shared.

In this case, when the terminal device processes downlink data, the first data packet numbering/reordering function of the first PDCP entity performs reordering processing on data on which the second ciphering/deciphering function has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function to perform ciphering processing.

Therefore, in this embodiment of this application, when communicating with the second network device, the terminal device may configure, by sharing the first data packet numbering/reordering function, only the second ciphering/deciphering function and the second header adding/removing function communicating with the second network device, and should not configure a complete PDCP entity, thereby reducing a configuration time and improving handover performance.

Optionally, in another embodiment, the second network device is configured with the third ciphering/deciphering function communicating with the terminal device, and the third ciphering/deciphering function corresponds to the second ciphering/deciphering function.

It should be understood that the first network device is configured with the fourth ciphering/deciphering function communicating with the terminal device, and the fourth ciphering/deciphering function corresponds to the first ciphering/deciphering function.

It should be understood that in this embodiment of this application, the two ciphering/deciphering functions correspond to each other, and it indicates that after one ciphering/deciphering function performs ciphering processing on data by using a key, the other ciphering/deciphering function can perform a reverse process to decipher the data by using the key.

For example, in this embodiment of this application, the fourth ciphering/deciphering function corresponds to the first ciphering/deciphering function, and it indicates that after the terminal device enciphers the uplink data by using the first ciphering/deciphering function, the fourth ciphering/deciphering function of the network device can decipher the uplink data enciphered by the first ciphering/deciphering function. Similarly, after the network device enciphers the downlink data by using the fourth ciphering/deciphering function, the first ciphering/deciphering function of the terminal device can decipher the downlink data enciphered by the fourth ciphering/deciphering function.

That is, after one of the corresponding two ciphering/deciphering functions performs ciphering processing on data, the other ciphering/deciphering function can obtain the data through deciphering in a reverse process.

Optionally, in on embodiment, after the receiving, by the first network device, a first configuration complete message sent by the terminal device, the method further includes:

sending, by the first network device, sixth indication information to the second network device, where the sixth indication information is used to indicate that the terminal device already completes RRC connection reconfiguration; or sending, by the first network device, seventh indication information to the terminal device, where the seventh indication information is used to instruct the terminal device to release an RRC connection to the first network device; or sending, by the first network device, eighth indication information to the terminal device, where the eighth indication information is used to instruct the terminal device to start an RRC connection to the second network device.

Optionally, in one embodiment, the method further includes:

sending, by the first network device, ninth indication information to the second network device, where the ninth indication information is used to indicate downlink data already successfully received by the terminal device, so that the second network device discards the downlink data already successfully received by the terminal device.

Optionally, in one embodiment, the method further includes:

sending, by the first network device, tenth indication information to the second network device, where the tenth indication information is used to indicate uplink data already successfully transferred to a third network device by the first network device, so that the second network device discards the uplink data already successfully transferred to the third network device by the first network device.

Therefore, in this embodiment, in a handover preparation stage, a connection between the terminal device and the second network device is first established, and RRC configuration information therebetween is configured; and in a handover execution stage, the terminal device may simultaneously perform data transmission with the second network device and the first network device, thereby reducing or avoiding a service interruption time caused by handover.

According to one embodiment, a handover method is provided. The method includes:

receiving, by a second network device, a first request message sent by a first network device, where the first request message is used to request to hand over the terminal device to the second network device or the first request message is used to request to add the second network device as an auxiliary service device for the terminal device, and the first request message includes at least one of the following:

a first security key that is allocated by the first network device to the second network device and that is associated with the terminal device;

a second security key that is used by the first network device and that is associated with the terminal device;

first indication information indicating that the terminal device has a multi-connection-based handover capability;

second indication information indicating that the terminal device has a multi-connection communication capability; and third indication information indicating whether data forwarded by the first network device to the second network device is a repeated version or a non-repeated version; and sending, by the second network device, a response message to the first network device, so that the first network device sends a first configuration message to the terminal device, where the first configuration message is used to instruct the terminal device to configure a second ciphering/deciphering function associated with the second network device and share a first data packet numbering/reordering function, the terminal device is configured with the first data packet numbering/reordering function and a first ciphering/deciphering function associated with the first network device, the response message is used to indicate that the second network device accepts a request of the first request message of the first network device, and the response message includes at least one of the following:

a third security key allocated by the second network device to the terminal device;

a configuration parameter used by the second network device to configure a Packet Data Convergence Protocol PDCP entity of the terminal device;

a configuration parameter used by the second network device to configure the terminal device to establish a second header adding/removing function and/or the second ciphering/deciphering function and/or a second header compression/decompression function corresponding to the second network device;

fourth indication information indicating that the terminal device uses the first data packet numbering/reordering function; and fifth indication information instructing the terminal device to use, during communication with the second network device, a security key that is allocated by the first network device to the terminal device and that corresponds to the first network device.

Therefore, in this embodiment, the first configuration message is used so that the terminal device may configure the function associated with the second network device. Therefore, during handover, the terminal device may simultaneously perform data transmission with the second network device and the first network device, to reduce or avoid a service interruption time caused by handover.

It should be understood that some embodiments may be executed by the first network device, and some embodiments may be executed by the second terminal device. For corresponding features and corresponding beneficial effects of the method on a second network device side, refer to the corresponding descriptions on the first network device side. Therefore, for brevity, detailed descriptions are properly omitted.

Optionally, in one embodiment, the method further includes:

the second network device is configured with a third ciphering/deciphering function, and the third ciphering/deciphering function corresponds to the second ciphering/deciphering function, where the first network device is configured with a fourth ciphering/deciphering function, and the fourth ciphering/deciphering function corresponds to the first ciphering/deciphering function.

Optionally, in one embodiment, the first network device is configured with a fifth ciphering/deciphering function, and the fifth ciphering/deciphering function corresponds to the second ciphering/deciphering function.

Optionally, in one embodiment, a second PDCP entity and a first PDCP entity are established for the terminal device, the second PDCP entity includes the second ciphering/deciphering function and a second data packet numbering/reordering function, and the first PDCP entity includes the first ciphering/deciphering function and the first data packet numbering/reordering function;

when the terminal device processes downlink data, the first data packet numbering/reordering function of the first PDCP entity performs reordering processing on data on which the second ciphering/deciphering function of the second PDCP entity has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function of the second PDCP entity to perform ciphering processing; or the second ciphering/deciphering function and the first PDCP entity are established for the terminal device, and the first PDCP entity includes the first ciphering/deciphering function and the first data packet numbering/reordering function;

when the terminal device processes downlink data, the first data packet numbering/reordering function of the first PDCP entity performs reordering processing on data on which the second ciphering/deciphering function has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function to perform ciphering processing.

Optionally, in one embodiment, the method further includes:

receiving, by the second network device, sixth indication information sent by the first network device, where the sixth indication information is used to indicate that the terminal device already completes RRC connection reconfiguration.

Optionally, in one embodiment, the method further includes:

receiving, by the second network device, non-enciphered first data sent by the first network device; and enciphering, by the second network device, the first data by using the third ciphering/deciphering function, where the first data is a part or all of data received by a PDCP layer of the first network device from a higher layer of the PDCP layer; or sending, by the second network device, second data deciphered by using the third ciphering/deciphering function to the first network device.

Optionally, in one embodiment, the method further includes:

receiving, by the second network device, third data that is enciphered by using the fifth ciphering/deciphering function and that is sent by the first network device, where the third data is a part or all of the data received by the PDCP layer of the first network device from the higher layer of the PDCP layer; or sending, by the second network device, non-deciphered fourth data to the first network device, so that the first network device deciphers the fourth data by using the fifth ciphering/deciphering function.

Optionally, in one embodiment, the method further includes:

receiving, by the second network device, ninth indication information sent by the first network device, where the ninth indication information is used to indicate downlink data already successfully received by the terminal device, so that the second network device discards the downlink data already successfully received by the terminal device.

Optionally, in one embodiment, the method further includes:

receiving, by the second network device, tenth indication information sent by the first network device, where the tenth indication information is used to indicate uplink data already successfully transferred to a third network device by the first network device, so that the second network device discards the uplink data already successfully transferred to the third network device by the first network device.

Optionally, in one embodiment, the method further includes:

after the second network device and the terminal device establish an RRC connection, sending, by the second network device, an eleventh indication message to the first network device, where the eleventh indication information is used to instruct the first network device to stop sending the downlink data to the terminal device.

Therefore, in this embodiment, in a handover preparation stage, a connection between the terminal device and the second network device is first established, and RRC configuration information therebetween is configured; and in a handover execution stage, the terminal device may simultaneously perform data transmission with the second network device and the first network device, thereby reducing or avoiding a service interruption time caused by handover.

According to one embodiment, a handover method is provided. The method includes:

receiving, by a terminal device, a first configuration message sent by a first network device, where the first configuration message is used to instruct the terminal device to configure a second ciphering/deciphering function associated with a second network device and share a first data packet numbering/reordering function, and the terminal device is configured with the first data packet numbering/reordering function and a first ciphering/deciphering function associated with the first network device; and sending, by the terminal device, a first configuration complete message sent by the first network device.

Therefore, in this embodiment, the first configuration message is used so that the terminal device may configure the function associated with the second network device. Therefore, during handover, the terminal device may simultaneously perform data transmission with the second network device and the first network device, to reduce or avoid a service interruption time caused by handover.

It should be understood that some embodiments may be executed by the terminal device, and some embodiments may be executed by the first network device and the second terminal device interacting with the terminal device. For corresponding features and corresponding beneficial effects of the method on a terminal device side, refer to the corresponding descriptions on the first network device side and the second network device side. Therefore, for brevity, detailed descriptions are properly omitted.

Optionally, in one embodiment, the second network device is configured with a third ciphering/deciphering function, the third ciphering/deciphering function corresponds to the second ciphering/deciphering function, the first network device is configured with a fourth ciphering/deciphering function, and the fourth ciphering/deciphering function corresponds to the first ciphering/deciphering function.

Optionally, in one embodiment, the first network device is configured with a fifth ciphering/deciphering function, and the fifth ciphering/deciphering function corresponds to the second ciphering/deciphering function.

Optionally, in one embodiment, a second Packet Data Convergence Protocol PDCP entity and a first PDCP entity are established for the terminal device, the second PDCP entity includes the second ciphering/deciphering function and a second data packet numbering/reordering function, and the first PDCP entity includes the first ciphering/deciphering function and the first data packet numbering/reordering function; and the method further includes:

when the terminal device processes downlink data, the first data packet numbering/reordering function of the first PDCP entity performs reordering processing on data on which the second ciphering/deciphering function of the second PDCP entity has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function of the second PDCP entity to perform ciphering processing; or the second ciphering/deciphering function and the first PDCP entity are established for the terminal device, and the first PDCP entity includes the first ciphering/deciphering function and the first data packet numbering/reordering function; and the method further includes:

when the terminal device processes downlink data, the first data packet numbering/reordering function of the first PDCP entity performs reordering processing on data on which the second ciphering/deciphering function has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function to perform ciphering processing;

Optionally, in one embodiment, the method further includes:

receiving, by the terminal device, seventh indication information sent by the first network device, where the seventh indication information is used to instruct the terminal device to release an RRC connection to the first network device; or receiving, by the terminal device, eighth indication information sent by the first network device, where the eighth indication information is used to instruct the terminal device to start an RRC connection to the second network device.

Therefore, in this embodiment, in a handover preparation stage, a connection between the terminal device and the second network device is first established, and RRC configuration information therebetween is configured; and in a handover execution stage, the terminal device may simultaneously perform data transmission with the second network device and the first network device, thereby reducing or avoiding a service interruption time caused by handover.

According to one embodiment, a first network device is provided. The first network device is configured to perform the method according to any one of the embodiments disclosed herein. Specifically, the first network device includes units configured to perform the foregoing method.

According to one embodiment, a second network device is provided. The second network device is configured to perform the method according to any one of the embodiments disclosed herein. Specifically, the second network device includes units configured to perform the foregoing method.

According to, a terminal device is provided. The terminal device is configured to perform the method according to any one of the embodiments disclosed herein. Specifically, the terminal device includes units configured to perform the foregoing method.

According to one embodiment, a first network device is provided. The first network device includes a processor and a memory. The memory is configured to store a computer program. The processor is configured to execute the computer program stored in the memory, to perform the method according to any one of the embodiments disclosed herein.

According to one embodiment, a second network device is provided. The second network device includes a processor and a memory. The memory is configured to store a computer program. The processor is configured to execute the computer program stored in the memory, to perform the method according to any one of the embodiments disclosed herein.

According to one embodiment, a terminal device is provided. The terminal device includes a processor and a memory. The memory is configured to store a computer program. The processor is configured to execute the computer program stored in the memory, to perform the method according to any one of the embodiments disclosed herein.

According to one embodiment, a computer-readable medium is provided, and stores a computer program. When the computer program is executed by a processor, the method according to any one of the embodiments disclosed herein.

According to one embodiment, a computer-readable medium is provided, and stores a computer program. When the computer program is executed by a processor, the method according to any one of embodiments disclosed herein.

According to one embodiment, a computer-readable medium is provided, and stores a computer program. When the computer program is executed by a processor, the method according to any one of the embodiments disclosed herein.

DESCRIPTION OF EMBODIMENTS

The following describes technical solutions of this application with reference to accompanying drawings.

The embodiments of this application may be applied to various communications systems. Therefore, the following descriptions are not limited to a particular communications system. For example, the embodiments of this application may be applied to a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and Universal Mobile Telecommunications System (UMTS).

A terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. An access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

In the embodiments of this application, a network device may be a device such as a network side device configured to communicate with a mobile device. The network side device may be a base transceiver station (BTS) in GSM or CDMA, or may be a NodeB (NB) in WCDMA, or may be an eNB or an evolved Node B (eNodeB) in LTE, or a relay station or an access point, an in-vehicle device, a wearable device, or a network side device in a future 5G network, for example, a gNB. The embodiments of this application are not limited thereto.

Figure 1:
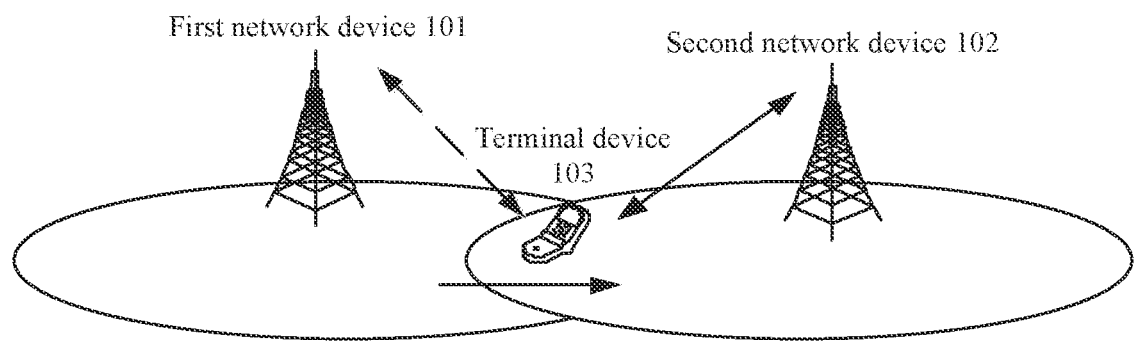
FIG. 1 is a scenario diagram of an applicable communications system according to an embodiment of this application.

FIG. 1 is a schematic scenario diagram of an applicable communications system according to an embodiment of this application. The communications system may be any one of the foregoing communications systems. As shown in FIG. 1, the communications system 100 includes a first network device 101, a second network device 102, and a terminal device 103. When the terminal device moves from a coverage area (also may be referred to as a first cell) of the first network device 101 to a coverage area (also may be referred to as a second cell) of the second network device 102, a communication data link of the terminal device 103 should be handed over from the first network device 101 to the second network device 102.

It should be understood that the first network device 101 and the second network device 102 may be any one of the foregoing network devices. The first network device 101 and the second network device 102 may be the same or different. For example, both the first network device 101 and the second network device 102 may be an eNB in an LTE system; or both the first network device 101 and the second network device 102 may be a gNB in a 5G network; or the first network device 101 is an eNB in an LTE system and the second network device 102 is a gNB in a 5G network; or the first network device 102 is a gNB in a 5G network and the second network device 101 is an eNB in an LTE system. This embodiment of this application is not limited thereto.

Figure 2:
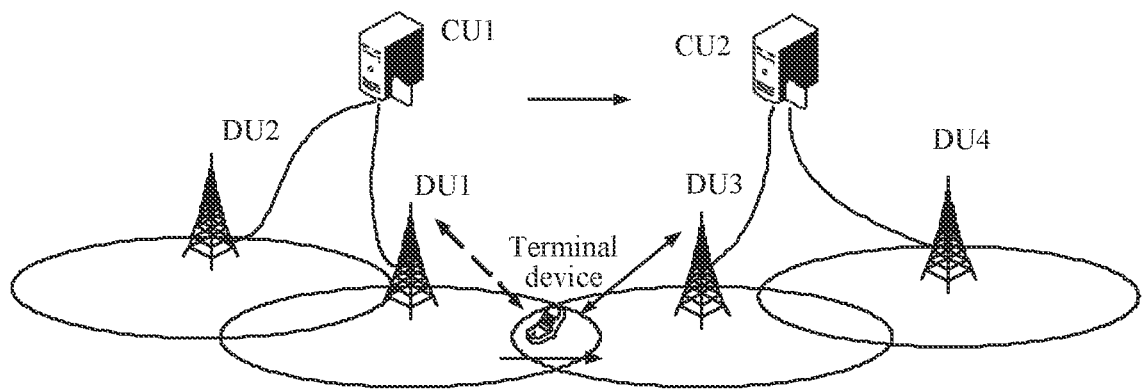
FIG. 2 is a scenario diagram of an applicable communications system according to another embodiment of this application.

It should be noted that when both the first network device and the second network device are an gNB in a 5G network, the gNB may include a distributed unit (DU) and a centralized unit (CU), and a plurality of DUs may be connected to a same CU. For example, as shown in FIG. 2, handover of the terminal device between the first network device and the second network device may be understood as handover between different CUs.

It should be understood that in this embodiment of this application, the first network device may also be referred to as a source network device, and the second network device may also be referred to as a target network device. For ease of description in the following, for example, a network device is an eNB, the first network device a source base station (SeNB), the second network device is a target base station (TeNB), and the terminal device is UE. However, the embodiments of this application are not limited thereto, and the network device and the terminal device may be any one of the devices defined above.

The following describes an inter-base station (eNB) handover procedure used in an LTE system. For example, the handover is a handover process initiated by a source eNB, and a main process of the handover is as follows: a source base station (Source eNB, SeNB) determines, based on a measurement report of UE, to hand over the UE and initiates a handover request to a target base station (Target eNB, TeNB), after obtaining an acknowledgment handover response of the TeNB, the SeNB sends a handover command to the UE, after receiving the handover command, the UE stops uplink or downlink data transmission with the SeNB, starts to synchronize with the TeNB, and initiates an initial access process. When sending the handover command to the UE, the SeNB stops uplink or downlink data transmission with the UE, and sends data stored in the SeNB to the TeNB. After successfully accessing the TeNB, the UE starts uplink or downlink data transmission with the TeNB.

In the foregoing technology, after receiving the handover command, the UE stops uplink or downlink data transmission with the source base station, starts to perform downlink synchronization with the target base station, and then initiates a random access process to the target base station based on configuration information in the handover command. The UE starts to perform uplink or downlink data transmission with the target base station only after completing random access and sending an RRC connection reconfiguration complete message to the target base station. As can be learned, uplink or downlink data transmission of the UE is interrupted.

To resolve the transmission interruption problem in the foregoing handover procedure, in a solution, after receiving the handover command of a source cell (or the source base station), the UE continues to perform uplink or downlink data transmission with the source base station, and the UE synchronizes with the target base station at the same time. In the following case, the UE stops uplink or downlink transmission with the source base station:

To be specific, after being synchronized with the target base station, when initiating random access to the target base station, that is, sending a random access preamble to the target base station, the UE stops uplink or downlink transmission with the source base station, and sends a preamble to obtain an uplink timing advance (TA) or an uplink resource grant (UL Grant) from the target base station. Both the uplink timing advance and the uplink resource grant are sent to the UE by using a random access response (RAR) message. Subsequently, the UE sends, by using the TA and the UL grant configured by the target base station, an RRC connection reconfiguration complete (RRC Connection Reconfiguration Complete) message indicating "handover complete". If the UE has uplink data and the UL grant is sufficiently large at this time, the UE may send a part of the uplink data when sending the RRC connection reconfiguration complete message. Alternatively, the UE requests an uplink resource from the target base station and then sends the uplink data. For downlink, after receiving the RRC connection reconfiguration complete message sent by the UE, the target base station starts to send downlink data to the UE.

As can be learned, in the foregoing improved solution, in uplink transmission, when the UE sends the preamble, uplink transmission interruption starts, and the uplink transmission starts to continue only after the RAR is received and then the RRC connection reconfiguration complete (RRC Connection Reconfiguration Complete) is sent to the target base station. Therefore, in the solution, the uplink transmission has an interruption time. For downlink, the UE stops receiving downlink data of the source base station once sending the preamble, and the target eNB starts to send downlink data to the UE only after the UE sends the RRC connection reconfiguration complete (RRC Connection Reconfiguration Complete). Therefore, in the solution, the downlink transmission also has an interruption time.

To resolve the problem in the foregoing handover procedure, in another improved solution, the UE can obtain the TA and the UL grant in advance, and the UE may not perform a random access process and directly send the RRC connection reconfiguration complete message to the target base station. Then, the UE performs uplink or downlink data transmission with the target base station.

In the solution, in uplink transmission, after stopping sending uplink data to the source base station, the UE starts to send the RRC connection reconfigure complete (to the target base station by using the TA and the UL grant already obtained. If the UL grant is sufficiently large, the UE may send a part of the uplink data to the target base station. In this case, it may be considered that the uplink transmission is not interrupted. However, the UL grant initially configured for the UE is usually not very large because the base station does not know a data volume of the UE. If excessive resources are allocated, resource waste is caused. In this case, if the UE has uplink data, the UE should request an uplink resource from an eNB, resulting in an extra uplink transmission interruption. For downlink, after stopping receiving data from the source base station, only after the UE sends the RRC connection reconfiguration complete to the target base station by using the TA and the UL grant already obtained, the target eNB starts to send downlink data to the UE. In addition, in some embodiments of the solution, there is a very higher precision is preferred on the TA, and currently only scenarios of equal TAs, that is, intra-base station cell handover or TA=0, that is, inter-micro base station handover are supported. Most handover scenarios are not supported, and consequently the solution is limited.

In conclusion, in the foregoing handover procedures, the service of the terminal device all has an interruption problem, and the service interruption problem cannot be alleviated or avoided.

To resolve the foregoing problem, the embodiments of this application ingeniously provide establishing a user plane bearer and a control plane configuration between the terminal device and the second network device in advance at a handover preparation stage, to reduce an interruption time caused by path handover and control plane signaling transmission in a handover process. In addition, in the embodiments of this application, in a handover process, data is simultaneously received and sent on two links, to ensure data transmission reliability. In other words, in the embodiments of this application, the terminal device may simultaneously communicate with the first network device and the second network device in a handover process, to ensure service continuity and avoid or reduce a service interruption in a handover process.

In the following, for ease of understanding and description, an execution process and an action of a handover method of this application in a communications system are described, for a purpose of example instead of limitation.

Figure 3:
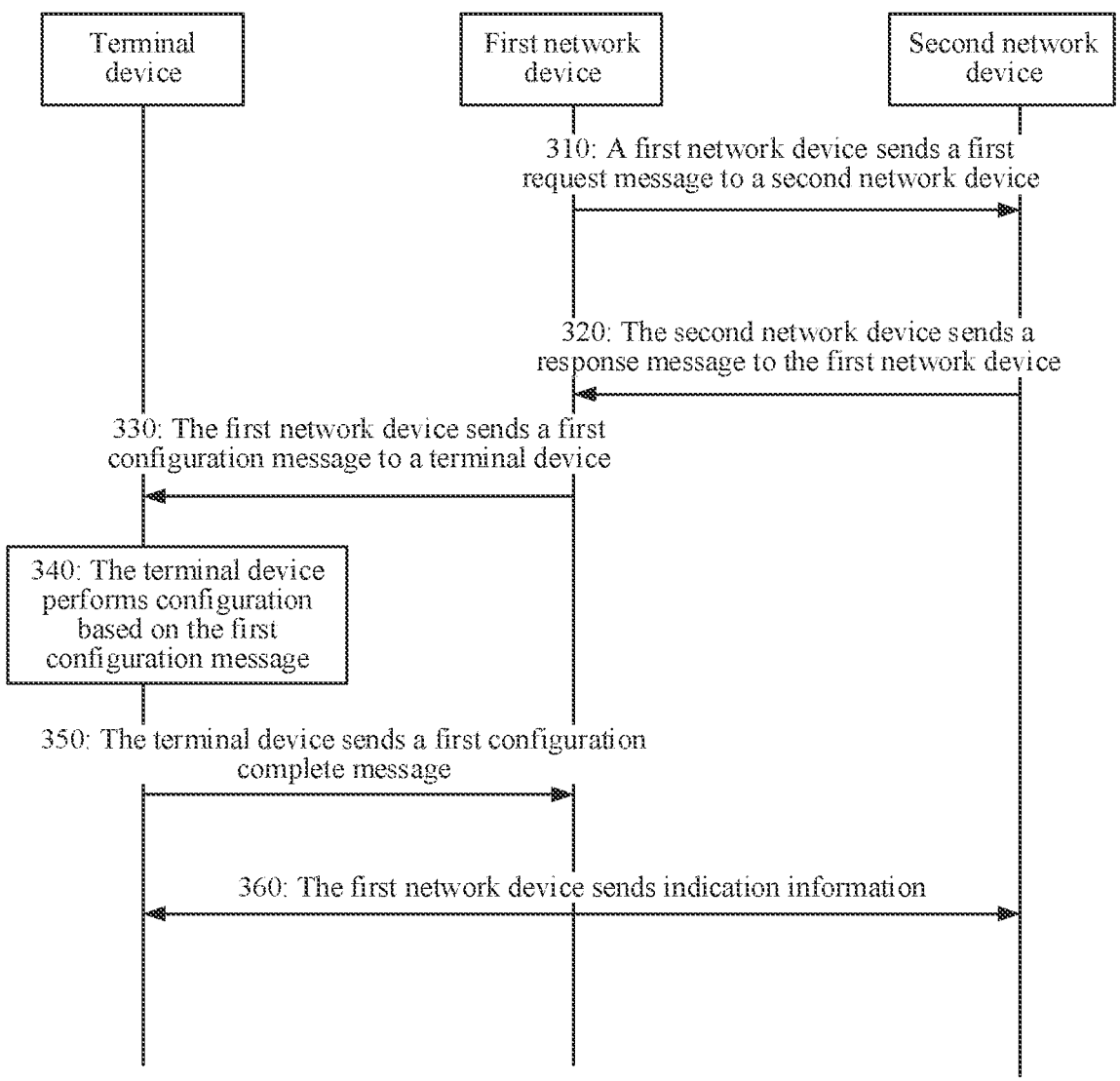
FIG. 3 is a schematic flowchart of a handover method according to an embodiment of this application.

FIG. 3 is a schematic flowchart of a handover method according to an embodiment of this application. The handover method 300 shown in FIG. 3 includes:

310: A first network device sends a first request message to a second network device.

The first request message is used to request to hand over a terminal device to the second network device or the first request message is used to request to add the second network device as an auxiliary service device for the terminal device.

Specifically, in an initial state, the terminal device and the first network device (for example, an SeNB) establish an RRC connection, and the terminal device sends a measurement report to the first network device. The measurement report includes measurement results of the first network device (or a first cell) and a neighboring network device (or a neighboring cell) of the first network device. The measurement report includes reference signal received power (RSRP) and/or reference signal received quality (RSRQ) and/or a signal to interference plus noise ratio (SINR). A manner or an occasion of sending the measurement report by the terminal device may be configured by the first network device. This is not limited in this embodiment of this application.

When the first network device determines, based on the measurement report, that the terminal device satisfies a handover condition, a handover procedure is started. For example, when a signal of the first network device becomes weak, a handover procedure is started. Specifically, the first network device may determine to add a secondary base station (Secondary eNB) for the terminal device and then the terminal device is handed over to the secondary base station, where the secondary base station may also be referred to as a target base station TeNB.

Specifically, the first network device sends a first request message to the second network device (for example, a TeNB). The first request message is used to request to hand over a terminal device to the second network device or the first request message is used to request to add the second network device as an auxiliary service device for the terminal device.

The first request message includes at least one of the following:

a first security key that is allocated by the first network device to the second network device and that is associated with the terminal device;

a second security key that is used by the first network device and that is associated with the terminal device;

first indication information indicating that the terminal device has a multi-connection-based handover capability;

second indication information indicating that the terminal device has a multi-connection communication capability; and third indication information indicating whether data forwarded by the first network device to the second network device is a repeated version or a non-repeated version.

It should be understood that the first security key is allocated to the second network device by the first network device, and is used by the second network device to perform data transmission with the terminal device. The second network device may perform data transmission with the terminal device directly by using the key, or the second network device generates another new security key based on the first security key, and then performs data transmission with the terminal device by using the new security key.

The second security key is a key for data transmission between the first network device and the terminal device, and the first network device may send the key to the second network device, so that the key is used for data transmission between the second network device and the terminal device. The second network device may perform data transmission with the terminal device directly by using the key, or the second network device generates another new security key based on the second security key, and then performs data transmission with the terminal device by using the new security key.

The first indication information is used to indicate that the terminal device has a multi-connection-based handover capability, and multi-connection-based handover may be understood as that the UE may establish a connection to two or more base stations in advance in a handover process, and then release a source base station.

The second indication information is used to indicate that the terminal device has a multi-connection communication capability, and multi-connection communication may be understood as that the UE may communicate with two or more base stations.

The third indication information is used to indicate whether data forwarded to the second network device by the first network device is a repeated version or a non-repeated version, where the repeated version may be understood as that the first network device copies a data packet and sends data packet to the second network device. Therefore, the data packet sent to the terminal device by the first network device and the second network device is actually repeated, and receiving reliability of the UE can be improved. The non-repeated version may be understood as that a data packet is either retained on the first network device, or sent to the second network device. When receiving data sent by the first network device and the second network device, the UE receives no repeated data.

When the third indication information indicates that the first network device forwards a repeated version to the second network device, the first network device and the second network device may send same data to the terminal device through two links, thereby improving data transmission reliability. For example, for downlink data packets 1, 2, and 3, the first network device sends the downlink data packets 1, 2, and 3 to the terminal device once, the first network device forwards the data packets 1, 2, and 3 to the second network device, and then the second network device sends the data packets 1, 2, and 3 to the terminal device once again. When the third indication information indicates that data forwarded to the second network device by the first network device is a non-repeated version, the first network device sends a part of downlink data from a core network to the terminal device, and the second network device sends a part of the downlink data to the terminal device. For example, for downlink data packets 1, 2, 3, and 4, the first network device sends the data packets 1 and 3 to the terminal device, the first network device forwards the data packets 2 and 4 to the second network device, and the second network device sends the data packets 2 and 4 to the terminal device.

Optionally, the first request message may further include at least one of the following:

an identifier (for example, an eNB ID) of the first network device, a serving PLMN of the first network device, a serving gateway (S-GW) identifier of the first network device, an identifier of the second network device, an interface S1 between an SeNB and an S-GW, a tunnel identifier used to send data, a quality of service (QoS) parameter of the terminal device, an X2 interface between the first network device and the second network device, a tunnel identifier used to send uplink data, context information (UE context) of the terminal device, and the like.

320: The second network device sends a response message to the first network device.

The response message is used to indicate that the second network device accepts a request of the first request message of the first network device.

Specifically, after receiving the request message sent by the first network device, the second network device determines whether to agree on the request of the first network device based on a resource status and a load status of the second network device; and if agreeing on the request of the first network device, sends the response message to the first network device. The response message may include at least one of the following:

a third security key allocated by the second network device to the terminal device;

a configuration parameter used by the second network device to configure a PDCP entity of the terminal device;

a configuration parameter that is configured by the second network device and that is used by the communications device to establish a second header adding/removing function and/or the second ciphering/deciphering function and/or a second header compression/decompression function corresponding to the second network device;

fourth indication information indicating that the terminal device uses the first data packet numbering/reordering function; and fifth indication information instructing the terminal device to use, during communication with the second network device, a security key that is allocated by the first network device to the terminal device and that corresponds to the first network device.

Figure 4:
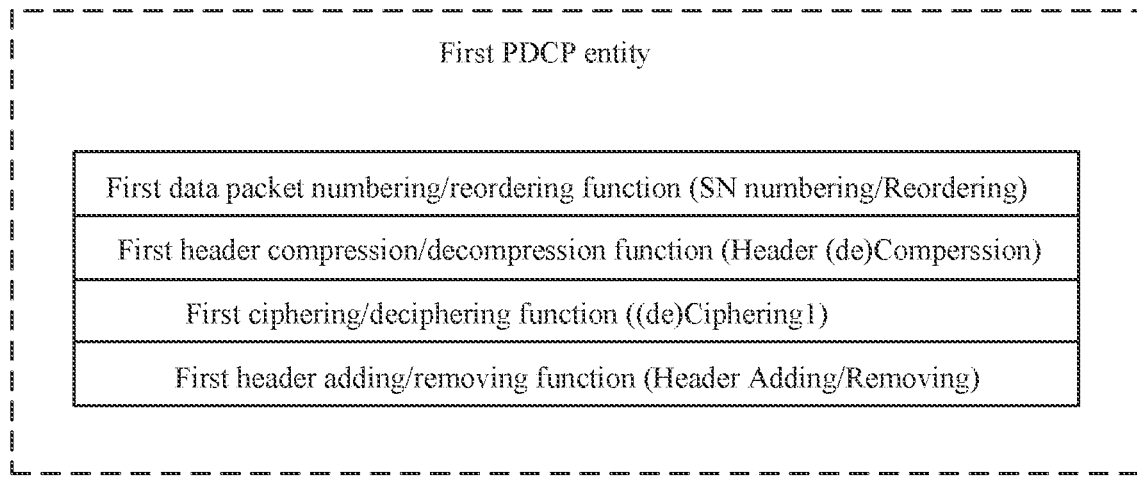
FIG. 4 is a schematic diagram of a PDCP entity according to an embodiment of this application.

Specifically, before the first network device sends the first request message to the second network device, the terminal device is configured with the first PDCP entity corresponding to the first network device. As shown in FIG. 4, the first PDCP entity includes a first header adding/removing function (Header Adding/Removing), a first header compression/decompression function (Header (de)Compression), a first ciphering/deciphering function ((de)Ciphering 1), and a first data packet numbering/reordering function (SN numbering/Reordering).

It should be understood that in this embodiment of this application, the security key may be used for ciphering/deciphering of the PDCP layer. The third security key may be the same as the first security key or the second security key. When the third security key is the same as the first security key, it indicates that the second network device communicates with the terminal device by using the key allocated to the second network device by the first network device. When the third security key is the same as the second security key, it indicates that the second network device and the first network device communicate with the terminal device by using a same key. Therefore, the terminal device may avoid performing ciphering or deciphering processing on data by using a new key, thereby improving a data processing speed and system performance.

Figure 5:
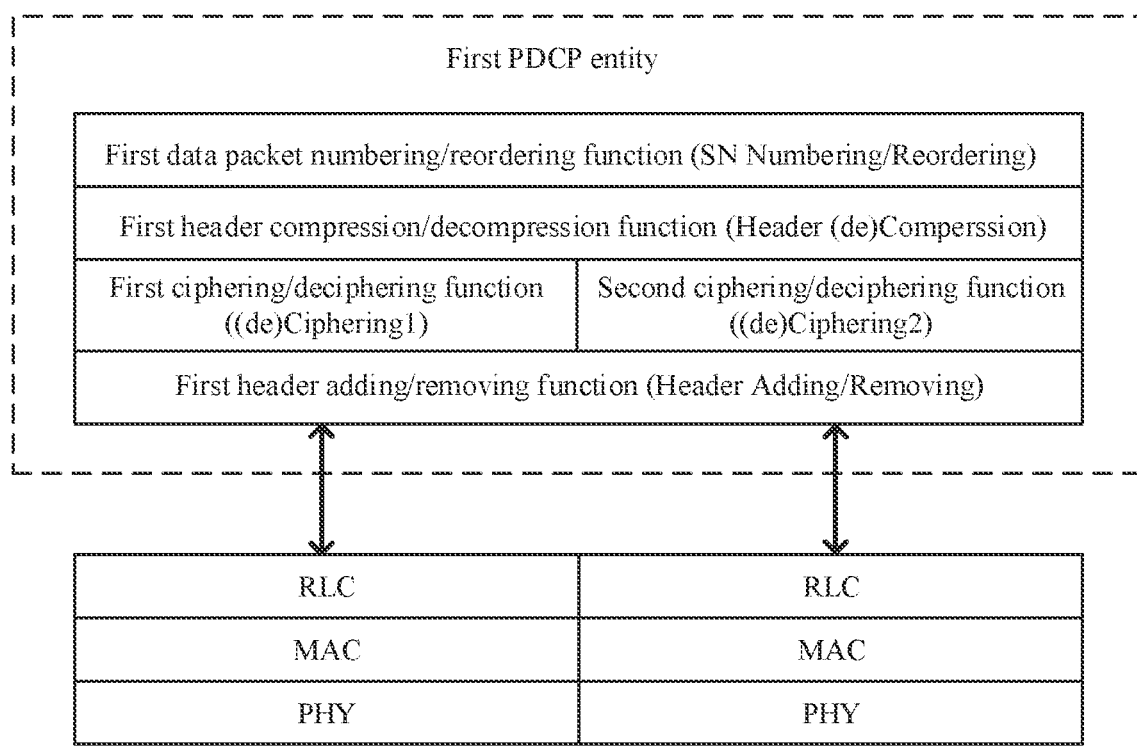
FIG. 5 is a schematic diagram of a PDCP entity according to another embodiment of this application.

The second network device configures a configuration parameter of a PDCP entity of the terminal device. The configuration parameter is used to configure a function of the PDCP entity of the terminal device. Specifically, the configuration parameter may be used to configure the function of the PDCP entity of the terminal device in the following manner:

Manner 1: As shown in FIG. 5, the second ciphering/deciphering function is configured based on the first PDCP entity, and another function follows that of the first PDCP entity. Alternatively, it is configured that the UE uses the first ciphering/deciphering function, but data may be ciphered by using a different key.

Figure 6:
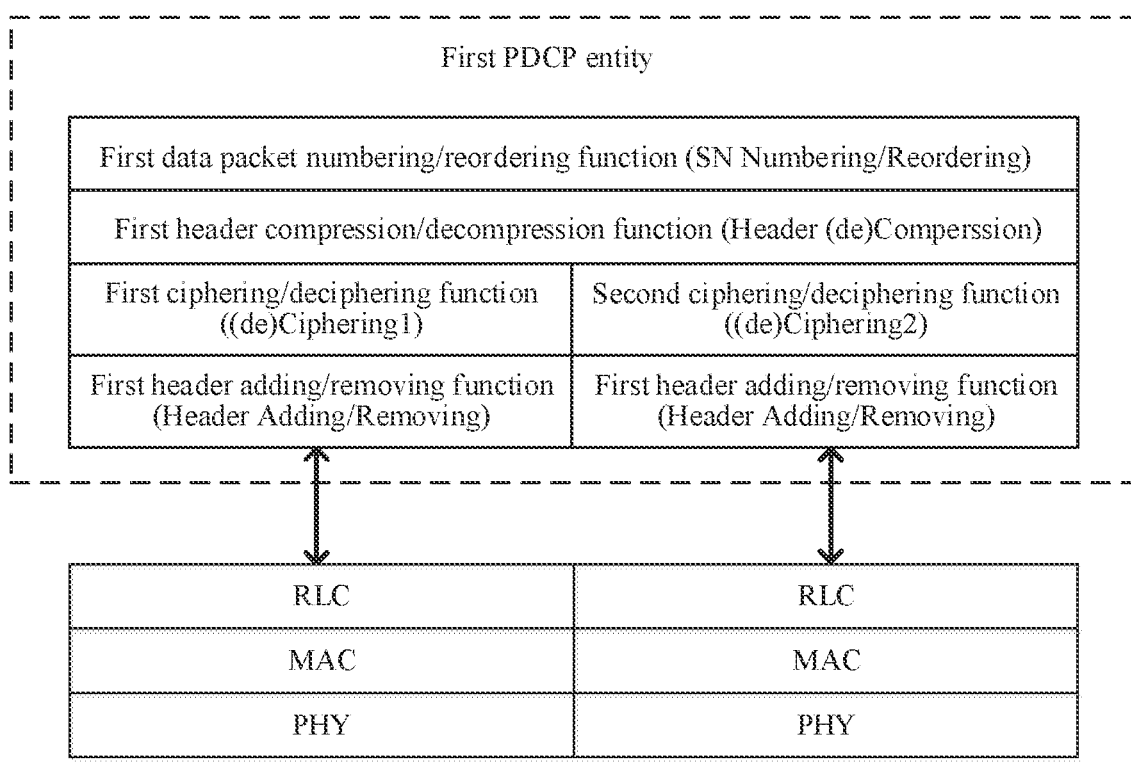
FIG. 6 is a schematic diagram of a PDCP entity according to another embodiment of this application.

Manner 2: As shown in FIG. 6, the second header adding/removing function and the second ciphering/deciphering function are established based on the first PDCP entity. Another function follows that of the first PDCP entity.

Figure 7:
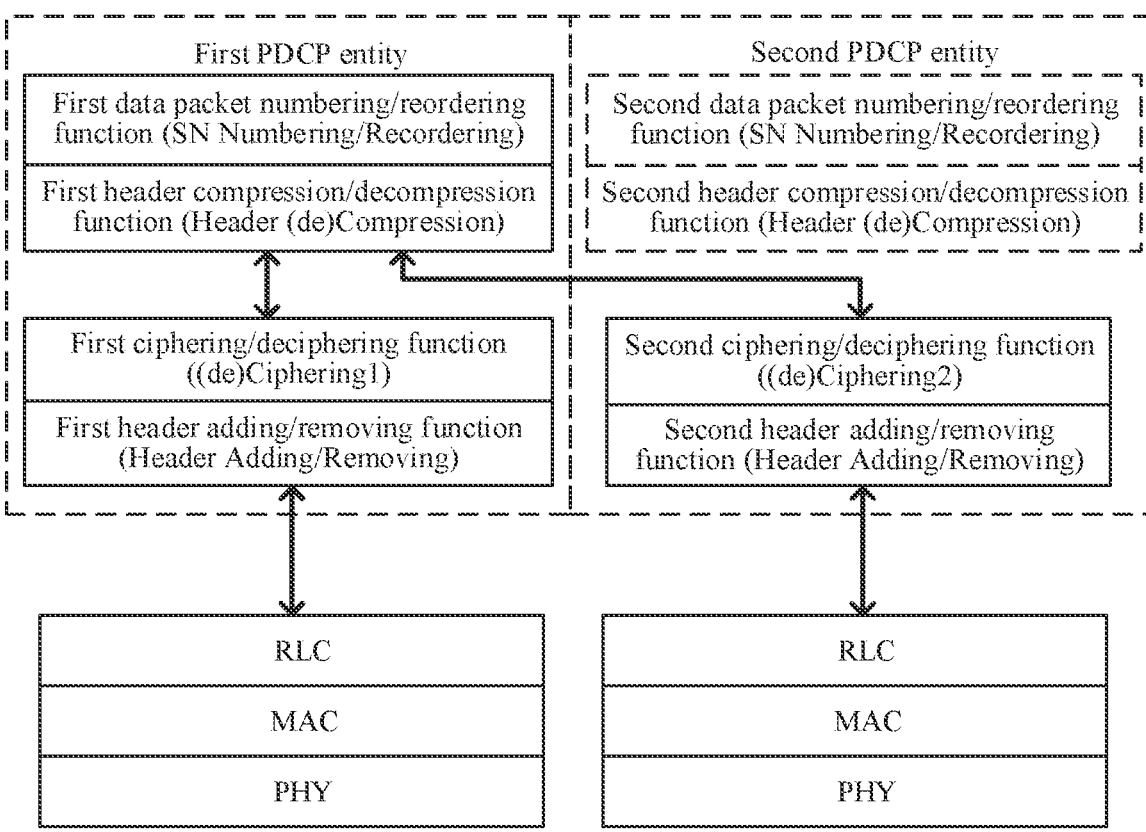
FIG. 7 is a schematic diagram of a PDCP entity according to another embodiment of this application.

Manner 3: As shown in FIG. 7, the second PDCP entity is established, and the second data packet numbering/reordering function and the second header compression/decompression function of the second PDCP entity are deactivated. A data transmission manner thereof is shown in FIG. 7.

Figure 8:
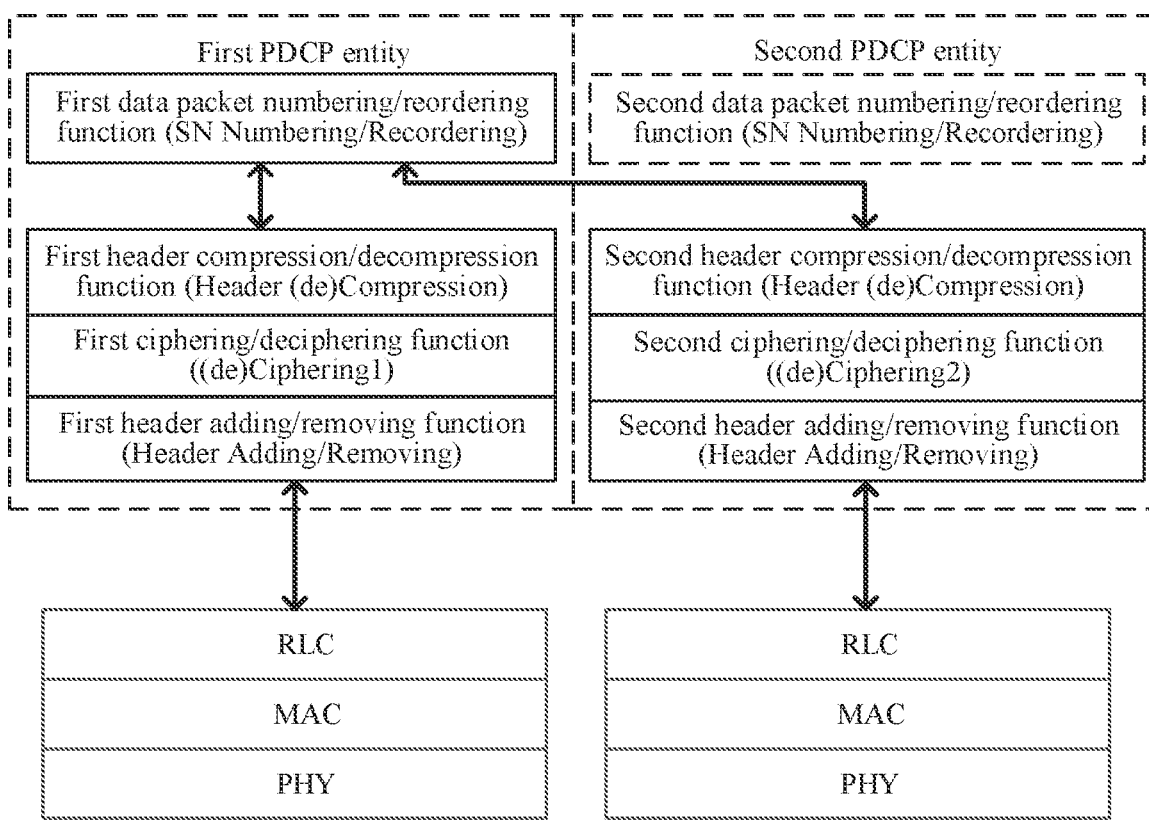
FIG. 8 is a schematic diagram of a PDCP entity according to another embodiment of this application.

Manner 4: As shown in FIG. 8, the second PDCP entity is established, and the second data packet numbering/reordering function is deactivated. A data transmission manner thereof is shown in FIG. 8.

The fourth indication information is used to indicate that the first data packet numbering/reordering function is used. It may be understood as that uplink data numbered by the first data packet numbering/reordering function may be sent to the first header compression/decompression function for compression processing, or may be sent to the second header compression/decompression function for processing, and then is correspondingly processed by an ciphering/deciphering function and a header adding/removing function corresponding to (the header compression/decompression function). Alternatively, it may be understood that uplink data numbered by the first data packet numbering/reordering function is sent to the first header compression/decompression function for compression processing, and then may be sent to the first ciphering/deciphering function for ciphering, or may be sent to the second ciphering/deciphering function for ciphering. A reverse process may be used for downlink data.

It should be further understood that, when receiving the request message sent by the first network device, the second network device may learn the first network device and the second security key associated with the terminal device, and the second network device may instruct, by using the fifth indication information, the terminal device to communicate with the second network device by using the second security key. No specific security key should be transferred and only indication information, that is, the fifth indication information, is sent herein. The indication information has a relatively small data volume, for example, the indication information may be only one bit of 1 or 0. Therefore, this can reduce signaling overheads and save network resources.

330: The first network device sends a first configuration message to a terminal device.

The first configuration message is used to instruct the terminal device to configure the second ciphering/deciphering function associated with the second network device and share the first data packet numbering/reordering function, and the terminal device is configured with the first data packet numbering/reordering function and the first ciphering/deciphering function associated with the first network device.

Specifically, after receiving the response message sent by the second network device, the first network device sends the first configuration message (also may be referred to as an RRC connection reconfiguration (RRC Connection Reconfiguration) message) to the terminal device. The first configuration message includes a part or all of information included in the response message sent by the second network device to the first network device.

It should be understood that in this embodiment of this application, the first ciphering/deciphering function configured for the terminal device not only can perform ciphering processing on data, but also can perform deciphering processing on data. "/" indicates that the first ciphering/deciphering function can choose to perform only one corresponding processing on same data. For example, the first ciphering/deciphering function may perform ciphering processing on uplink data, and the first ciphering/deciphering function may perform deciphering processing on downlink data. Similarly, the first data packet numbering/reordering function not only can perform numbering processing on data, but also can perform reordering processing on data. "I" indicates that the first data packet numbering/reordering function can choose to perform only one corresponding processing on same data. For example, the first data packet numbering/reordering function may perform numbering processing on uplink data, and the first data packet numbering/reordering function may perform reordering processing on downlink data. Similarly, another function in this specification is similar to this, and to avoid repetition, details are not described herein again.

Optionally, the first configuration message may further include at least one of the following:

identifiers of the first network device and the second network device; an S1 interface between the second network device and an S-GW; a tunnel identifier used to receive downlink data; an X2 interface between the second network device and the first network device, a tunnel identifier used to receive downlink data or send uplink data; and uplink resource information configured by the second network device for the terminal device.

340: The terminal device performs configuration based on the first message information.

Specifically, the terminal device configures the second ciphering/deciphering function associated with the second network device and shares the first data packet numbering/reordering function based on the first configuration message, and the terminal device is configured with the first data packet numbering/reordering function and the first ciphering/deciphering function associated with the first network device.

Specifically, the terminal device may perform configuration in the manner shown in FIG. 5 to FIG. 8.

Specifically, the first PDCP entity communicating with the first network device is established in the terminal device, as shown in FIG. 4, the first PDCP entity includes the first ciphering/deciphering function and the first data packet numbering/reordering function, and the first PDCP entity may further include the first header adding/removing function and the first header compression/decompression function. After receiving the first configuration message, the terminal device may configure a corresponding function communicating with the second network device (as shown in FIG. 5 and FIG. 6), or configure the second PDCP entity communicating with the second network device (as shown in FIG. 7 and FIG. 8). The second PDCP entity includes the second ciphering/deciphering function and the second data packet numbering/reordering function, and the second PDCP entity may further include the second header adding/removing function and the second header compression/decompression function.

Using FIG. 7 and FIG. 8 as an example, because the terminal device shares the first data packet numbering/reordering function, when the terminal device processes the downlink data, the first data packet numbering/reordering function of the first PDCP entity performs reordering processing on the downlink data on which the second ciphering/deciphering function of the second PDCP entity has performed deciphering processing.

When the terminal device processes the uplink data, the first data packet numbering/reordering function of the first PDCP entity performs numbering processing on the data, and then sends the data to the first ciphering/deciphering function of the first PDCP entity and/or the second ciphering/deciphering function of the second PDCP entity for ciphering processing.

It should be understood that because the terminal device shares the first data packet numbering/reordering function, although the terminal device is configured with the second data packet numbering/reordering function of the PDCP, the second data packet numbering/reordering function is not used in an actual application.

Therefore, alternatively, after receiving the first configuration message, the terminal device does not should be configured with the entire second PDCP entity, and as shown in FIG. 5, may be configured with only the second ciphering/deciphering function communicating with the second network device. The function of the first PDCP entity is still used for other functions. For example, the first data packet numbering/reordering function, the first header adding/removing function, and the first header compression/decompression function are shared.

In this case, when the terminal device processes the downlink data, the first data packet numbering/reordering function of the first PDCP entity performs reordering processing on the data on which the second ciphering/deciphering function has performed deciphering processing.

When the terminal device processes the uplink data, the first data packet numbering/reordering function of the first PDCP entity performs numbering processing on the data, and then sends the data to the first ciphering/deciphering function of the first PDCP entity and/or the second ciphering/deciphering function for ciphering processing.

Therefore, in this embodiment of this application, when communicating with the second network device, the terminal device may configure, by sharing the first data packet numbering/reordering function, only the second ciphering/deciphering function communicating with the second network device, and should not configure a complete PDCP entity, thereby reducing a configuration time and improving handover performance.

Alternatively, after receiving the first configuration message, the terminal device should not configured with the entire second PDCP entity, and as shown in FIG. 6, may be configured with only the second ciphering/deciphering function and the second header adding/removing function communicating with the second network device. The function of the first PDCP entity is still used for other functions. For example, the first data packet numbering/reordering function and the first header compression/decompression function are shared.

In this case, when the terminal device processes downlink data, the first data packet numbering/reordering function of the first PDCP entity performs reordering processing on data on which the second ciphering/deciphering function has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function to perform ciphering processing.

Therefore, in this embodiment of this application, when communicating with the second network device, the terminal device may configure, by sharing the first data packet numbering/reordering function, only the second ciphering/deciphering function and the second header adding/removing function communicating with the second network device, and should not configure a complete PDCP entity, thereby reducing a configuration time and improving handover performance.

Optionally, in another embodiment, as shown in FIG. 9A and FIG. 9B, FIG. 10A and FIG. 10B, and FIG. 11A and FIG. 11B, the second network device is configured with the third ciphering/deciphering function communicating with the terminal device, and the third ciphering/deciphering function corresponds to the second ciphering/deciphering function.

It should be understood that the first network device is configured with the fourth ciphering/deciphering function communicating with the terminal device, and the fourth ciphering/deciphering function corresponds to the first ciphering/deciphering function.

It should be understood that in this embodiment of this application, the two ciphering/deciphering functions correspond to each other, and it indicates that after one ciphering/deciphering function performs ciphering processing on data by using a key, the other ciphering/deciphering function can perform a reverse process to decipher the data by using the key.

For example, in this embodiment of this application, the fourth ciphering/deciphering function corresponds to the first ciphering/deciphering function, and it indicates that after the terminal device enciphers the uplink data by using the first ciphering/deciphering function, the fourth ciphering/deciphering function of the network device can decipher the uplink data enciphered by the first ciphering/deciphering function. Similarly, after the network device enciphers the downlink data by using the fourth ciphering/deciphering function, the first ciphering/deciphering function of the terminal device can decipher the downlink data enciphered by the fourth ciphering/deciphering function.

That is, after one of the corresponding two ciphering/deciphering functions performs ciphering processing on data, the other ciphering/deciphering function can obtain the data through deciphering in a reverse process.

Alternatively, in another embodiment, the first network device may be further configured with a fifth ciphering/deciphering function, and the fifth ciphering/deciphering function corresponds to the second ciphering/deciphering function.

To be specific, the first network device may be configured with both the fourth ciphering/deciphering function that communicates with the terminal device and that corresponds to the first ciphering/deciphering function, and the fifth ciphering/deciphering function that communicates with the terminal device and that corresponds to the second ciphering/deciphering function.

350: The terminal device sends a first configuration complete message.

The first configuration complete message (also may be referred to as an RRC connection reconfiguration complete message (RRC Connection Reconfiguration Complete)) indicates that the terminal device successfully accesses the second network device, or the first configuration complete message indicates that the terminal device completes configuration of a connection to the second network device.

Specifically, after completing configuration of the connection to the second network device based on the first configuration message, the terminal device may send the first configuration complete message to the first network device, to indicate that the terminal device completes configuration of the connection to the second network device.

Alternatively, after completing configuration, the terminal device may initiate random access to the second network device by using a corresponding random access preamble (RAP) and a corresponding uplink resource (UL Grant), to obtain an uplink timing advance (TA) and an uplink resource. The terminal device receives a random access response message (RAR) sent by the second network device, where the message includes the uplink grant (UL Grant) and the uplink timing advance (TA). When the terminal device receives the UL grant and the TA sent by the second network device, in a non-contention-based random access process, it indicates that uplink access succeeds. Subsequently, the terminal device may send the first configuration complete message to the second network device, to indicate that the terminal device successfully accesses the second network device.

It should be noted that after block 350 or block 320, the first network device may send a part or all of the downlink data to the second network device through copying or non-copying, so that the second network device sends the corresponding downlink data to the terminal device.

In this way, in this embodiment of this application, the first network device and the second network device may simultaneously send the downlink data to the terminal device, to provide data transmission reliability and avoid a service interruption problem caused by handover.

In this specification, in block 310 and block 320, there may be a handover request message and a handover response message, that is, a handover procedure is used; or there may be a secondary base station adding request message and a secondary base station adding response message, that is, a secondary base station adding procedure is used.

Specifically, before forwarding data to the second network device, the first network device only sends data from a core network to the terminal device or sends uplink data sent by the terminal device to a core network. After block 350, that is, after the first network device receives the first configuration complete message (also may be referred to as an RRC connection reconfiguration complete message), or after block 320, that is, after the first network device receives the response message (also may be an adding request response message) sent by the second network device, the first network device starts to forward data to the second network device. A data forwarding form may correspond to content indicated by the third indication information in the first request message in block 310. To be specific, data forwarded by the first network device to the second network device is a repeated version (also may be referred to as a copied version) or a non-repeated version (also may be referred to as a non-copied version). Specifically, if copied-version data is forwarded, after block 320 or block 350, the first network device starts to forward, to the second network device, a counterpart version of data received by the first network device from a core network device (CN). If non-copied-version data is forwarded, after block 320 or block 350, the first network device starts to forward the non-copied-version data to the second network device. For example, when copied-version data is forwarded, if the downlink data received by the first network device from the CN is PDCP SDUs 1 to 10, although the PDCP SDUs 1, 2, and 3 are already sent by the first network device to the terminal device, the first network device should forward the PDCP SDUs 1, 2, and 3 to the second network device for resending if receiving no feedback of the terminal device.

It should be noted that in this embodiment of this application, in a process of performing blocks 310 to 350, the service of the terminal device always maintains transmission in a data plane. For example, in a process of performing blocks 310 to 350, the first network device may further send data packets 4 to 10 to the terminal device. In addition, the first network device may further receive a data packet from the CN, and the first network device sends the data packet to the terminal device in one embodiment, or may forward the data packet to the second network device through copying or non-copying in another embodiment.

Therefore, in this embodiment of this application, at a handover preparation stage, data transmission of the service of the terminal is not affected, and user experience can be improved.

The following describes a specific implementation of forwarding data between the first network device and the second network device after block 350 or block 320:

In block 310, the first network device may send an address (for example, a tunnel endpoint identifier (TEID)) of a serving gateway (S-GW) on a core network (CN) side to the second network device. After 310, the second network device can already send uplink data to the Serving GW, but in block 310, no uplink data arrives at the second network device yet. In addition, the first request message sent by the first network device in block 310 may further carry a data transmission destination address of the first network device. In this way, after block 310, the second network device may send user data to the first network device. In block 320, the second network device sends a new data transmission destination address to the first network device. In this way, after block 320, the first network device may forward user data to the second network device.

Specific data processing processes of the first network device, the second network device, and the terminal device are described below from the perspective of uplink data and downlink data.

First, the perspective of uplink data is used:

In an optional manner, after block 320, the first network device may forward user uplink data to the second network device, and then the second network device sends the user uplink data to the serving GW. In this way, regardless of whether the terminal device sends same data or different data to the first network device, the data is collected in the second network device, and the second network device performs reordering, repeated packet detection, or the like.

In another optional manner, after block 320, the first network device transfers, to the S-GW, ordered data that may be transferred to the S-GW. The first network device sends, to the second network device, a copied version of data (for example, SDUs 4, 6, and 8) that cannot be sequentially transferred to the S-GW. When receiving an SDU 5, the first network device may transfer the SDUs 4, 5, and 6 to the S-GW. In this case, the first network device sends a status report to the second network device, to indicate that the SDU 6 and the previous data packets are already sent to the S-GW, and the second network device discards the SDUs 4 and 6. During specific uplink transmission, the terminal device may continue to send uplink data to the first network device, while initiating an access process to the second network device. After block 350, the terminal device starts to send uplink data to the second network device.

It should be understood that in this embodiment of this application, the terminal device may send same data (a copied version) to the first network device and the second network device, that is, to ensure sending reliability, or the terminal device may send different data to the first network device and the second network device, that is, send a part of data to the first network device and send the remaining data to the second network device.

When the terminal device sends different data to the first network device and the second network device and sends uplink data, and the terminal device successfully accesses the second network device, the terminal device starts to send the uplink data to the second network device. In this case, the uplink data may include: new uplink data generated on a terminal device side, and uplink data that is sent by the terminal device side to the first network device but that has no ACK response. The ACK response indicates that the data is successfully received. In this case, if the terminal device receives a NACK of a data packet, where the NACK indicates that the data is not successfully received, if the terminal device has not sent the data packet to the second network device, the terminal device retransmits the data packet to the first network device. If the terminal device has sent the data packet to the second network device, the terminal device feeds back an ACK to the first network device, to indicate that the data packet is already successfully sent.

Next, the perspective of downlink data is used:

When the first network device learns that the second network device is successfully added, the first network device may send, to the second network device, new data sent by the core network and data that has no ACK response from the terminal device. When receiving a NACK of a data packet that is sent by the terminal device, the first network device retransmits the data packet. Alternatively, when the first network device receives a NACK of a data packet that is sent by the terminal device, if the data is already forwarded to the second network device, the first network device feeds back an ACK to the terminal device, to indicate that the data packet is already successfully sent.

When the terminal device side receives downlink data, and the terminal device receives data retransmitted by the first network device (during retransmission, it is indicated whether the data packet is forwarded to the second network device) and successfully receives the data packet after feeding back a NACK to the first network device, if the data packet is already forwarded to the second network device, the terminal device reports an ACK to the second network device, to indicate that the data packet is already successfully received.

When receiving data forwarded by the first network device, if receiving no ACK of a data packet from the terminal device, the second network device sends the data packet; or if receiving an ACK, the second network device discards the data packet. If first successfully receiving a data packet from the second network device, the terminal device side feeds back an ACK to the two eNBs; otherwise, feeds back a NACK to the two eNBs.

It should be understood that the foregoing separately describes specific data transmission processes of the first network device, the second network device, and the terminal device in the embodiments of this application from the perspective of uplink and downlink data transmission. The ACK and the NACK may be HARQ feedback information of a MAC layer and a physical layer, or feedback information (that is, a status report) of an RLC layer, or feedback information (that is, a status report) of a PDCP layer. This embodiment of this application is not limited thereto.

The following describes specific data processing processes of the first network device, the second network device, and the terminal device on a PDCP layer on a data link layer (L2) in a data forwarding process in different cases with reference to FIG. 9A and FIG. 9B, FIG. 10A and FIG. 10B, and FIG. 11A and FIG. 11B.

Figure 9A:
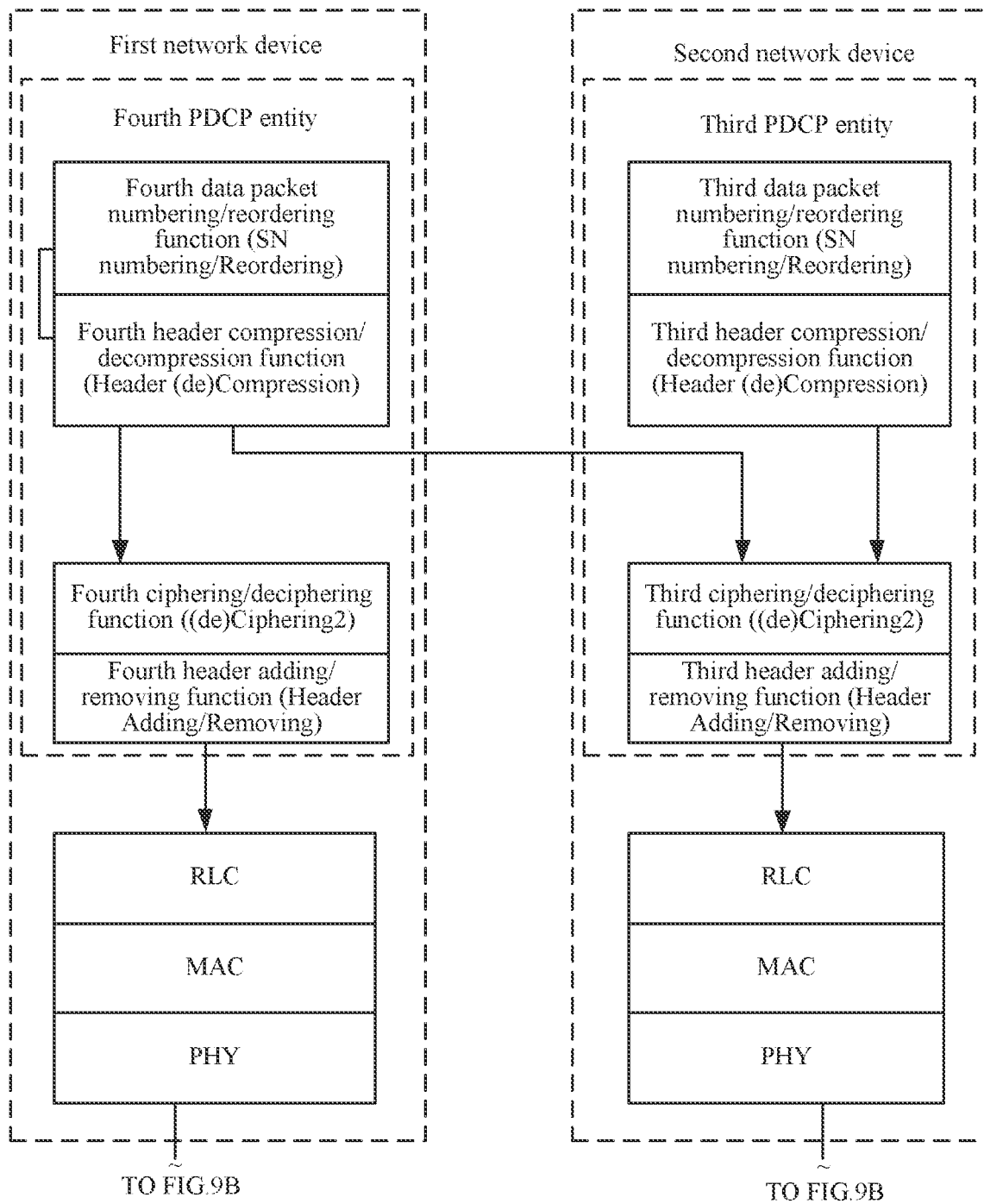
FIG. 9A and FIG. 9B are a schematic diagram of a data processing process according to an embodiment of this application.
Figure 9B:
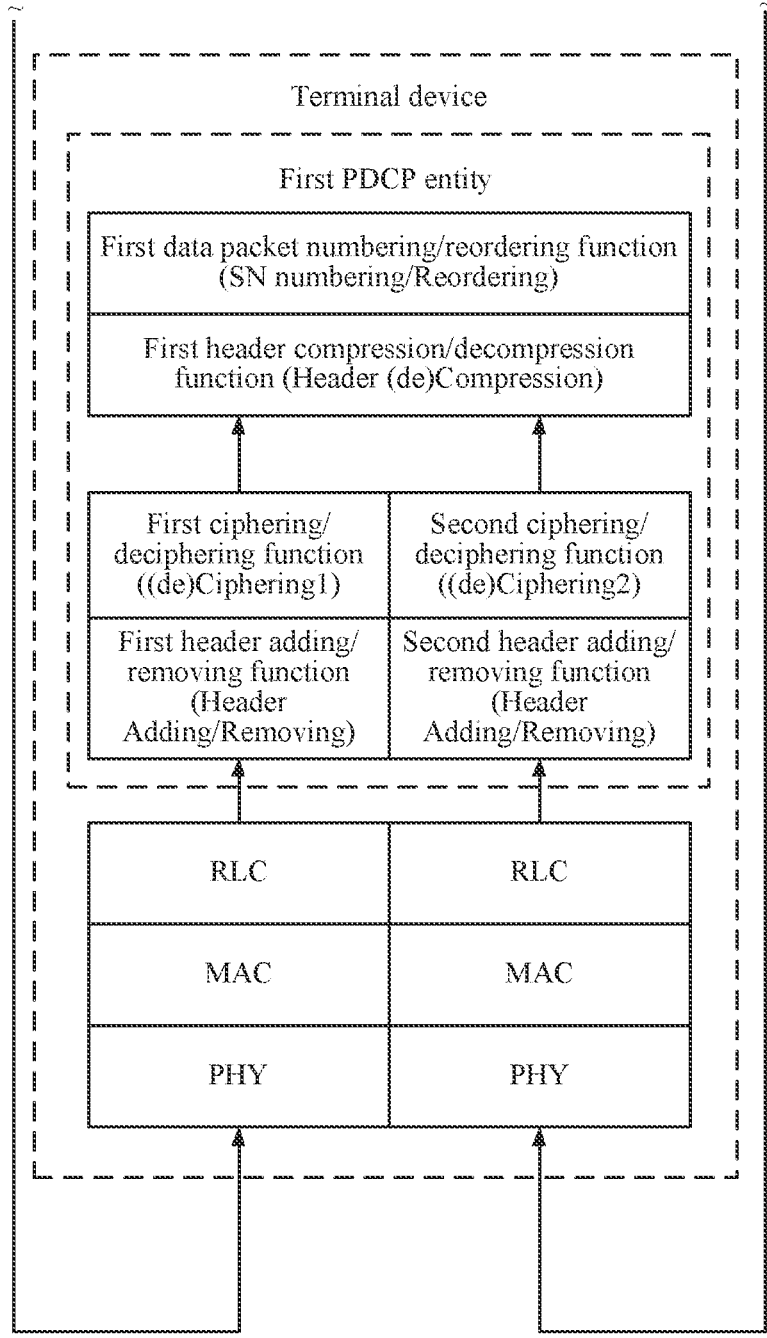

In a first case, as shown in FIG. 9A and FIG. 9B, the terminal device is configured with a first PDCP entity, the first network device is configured with a fourth PDCP entity, and the second network device is configured with a third PDCP entity. Each PDCP entity has corresponding functions.

For example, the terminal device is configured with the first ciphering/deciphering function, the first data packet numbering/reordering function, and the second ciphering/deciphering function; the second network device is configured with the third ciphering/deciphering function; and the first network device is configured with the fourth ciphering/deciphering function.

The third ciphering/deciphering function corresponds to the second ciphering/deciphering function, and the fourth ciphering/deciphering function corresponds to the first ciphering/deciphering function.

In the first case, when forwarding downlink data to the second network device, the first network device sends non-enciphered first data to the second network device, so that the second network device enciphers the first data by using the third ciphering/deciphering function. The first data is a part or all of data received by the PDCP layer of the first network device from a higher layer of the PDCP layer.

When receiving uplink data sent by the second network device, the first network device receives second data that is sent by the second network device and that is deciphered by using the third ciphering/deciphering function.

Specifically, as shown in FIG. 9A and FIG. 9B, the fourth ciphering/deciphering function and the first ciphering/deciphering function correspond to each other and both correspond to a ciphering manner 1 (Ciphering 1) and a deciphering manner 1 (deciphering 1); and the third ciphering/deciphering function and the second ciphering/deciphering function correspond to each other and both correspond to a ciphering manner 2 (Ciphering 2) and a deciphering manner 2 (deciphering 2).

For example, as shown in FIG. 9A and FIG. 9B, when processing downlink data, on the PDCP layer, the first network device first performs numbering (SN numbering) and then performs header compression (Header Compression) on the data, the first network device then sends a part or all (that is, corresponding to a copied version or a non-copied version) of the data to the second network device, and the first network device performs ciphering processing on the data in the ciphering manner 1 corresponding to the fourth ciphering/deciphering function, then performs corresponding header adding processing, and finally sends the data to the terminal device sequentially through an RLC layer, a MAC layer, and a PHY layer of the first network device. On the PDCP layer, the second network device performs ciphering processing on the data in the ciphering manner 2 corresponding to the third ciphering/deciphering function, then performs header adding processing, and sends the data to the terminal device sequentially through an RLC layer, a MAC layer, and a PHY layer of the second network device. The data passes through the corresponding PHY layer, MAC layer, and RLC layer. The terminal device performs header removing (Header remove) processing on the PDCP layer, performs deciphering processing on the data in the deciphering manner 1 corresponding to the first ciphering/deciphering function and the deciphering manner 2 corresponding to the second ciphering/deciphering function, and finally performs header decompression and reordering on the data to obtain corresponding downlink data by using both the first header compression/decompression function and the first data packet numbering/reordering function.

It should be understood that for processing of uplink data, refer to an inverse process of the downlink data shown in FIG. 9A and FIG. 9B. To avoid repetition, details are not described herein again.

Figure 10A:
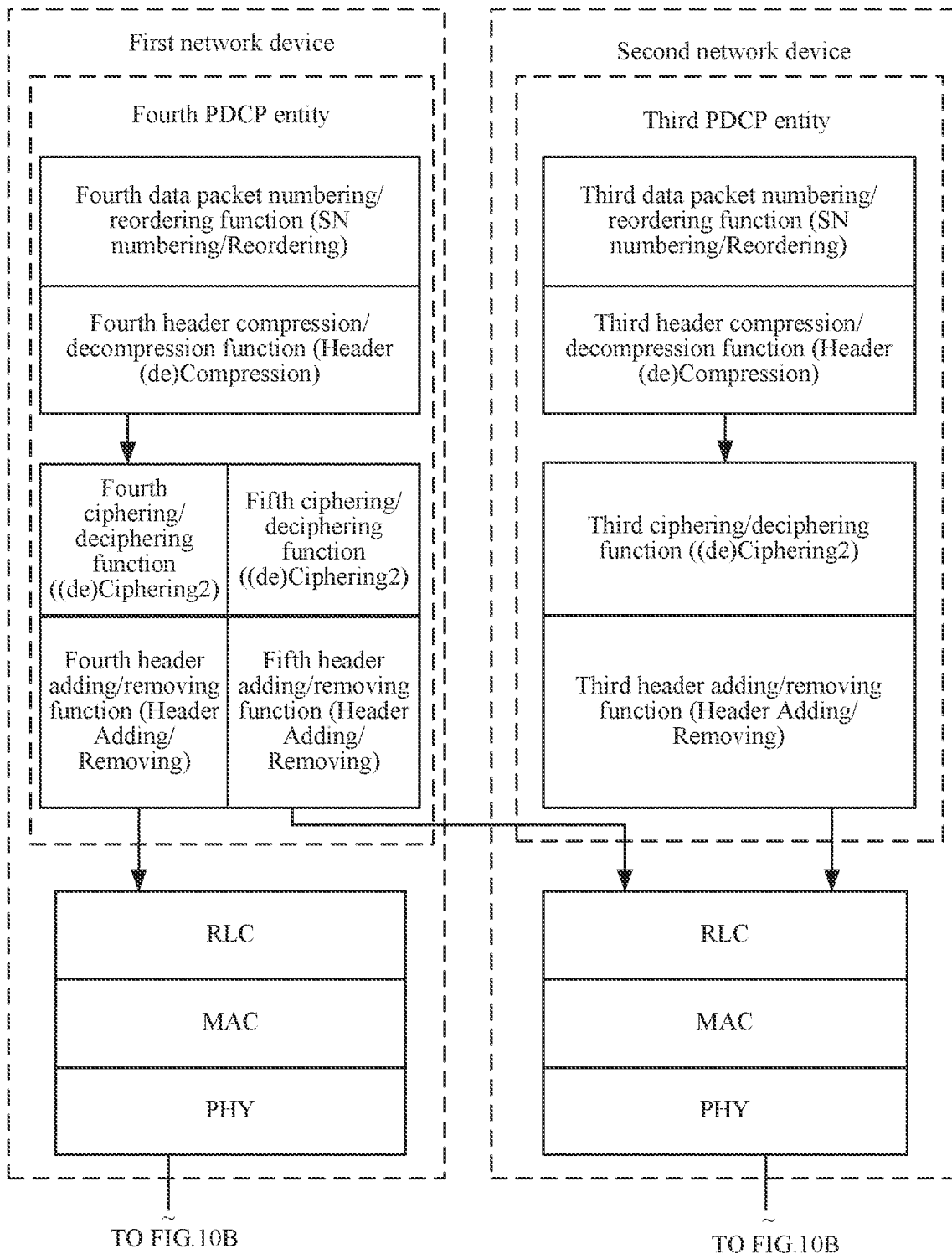
FIG. 10A and FIG. 10B are a schematic diagram of a data processing process according to another embodiment of this application.
Figure 10B:
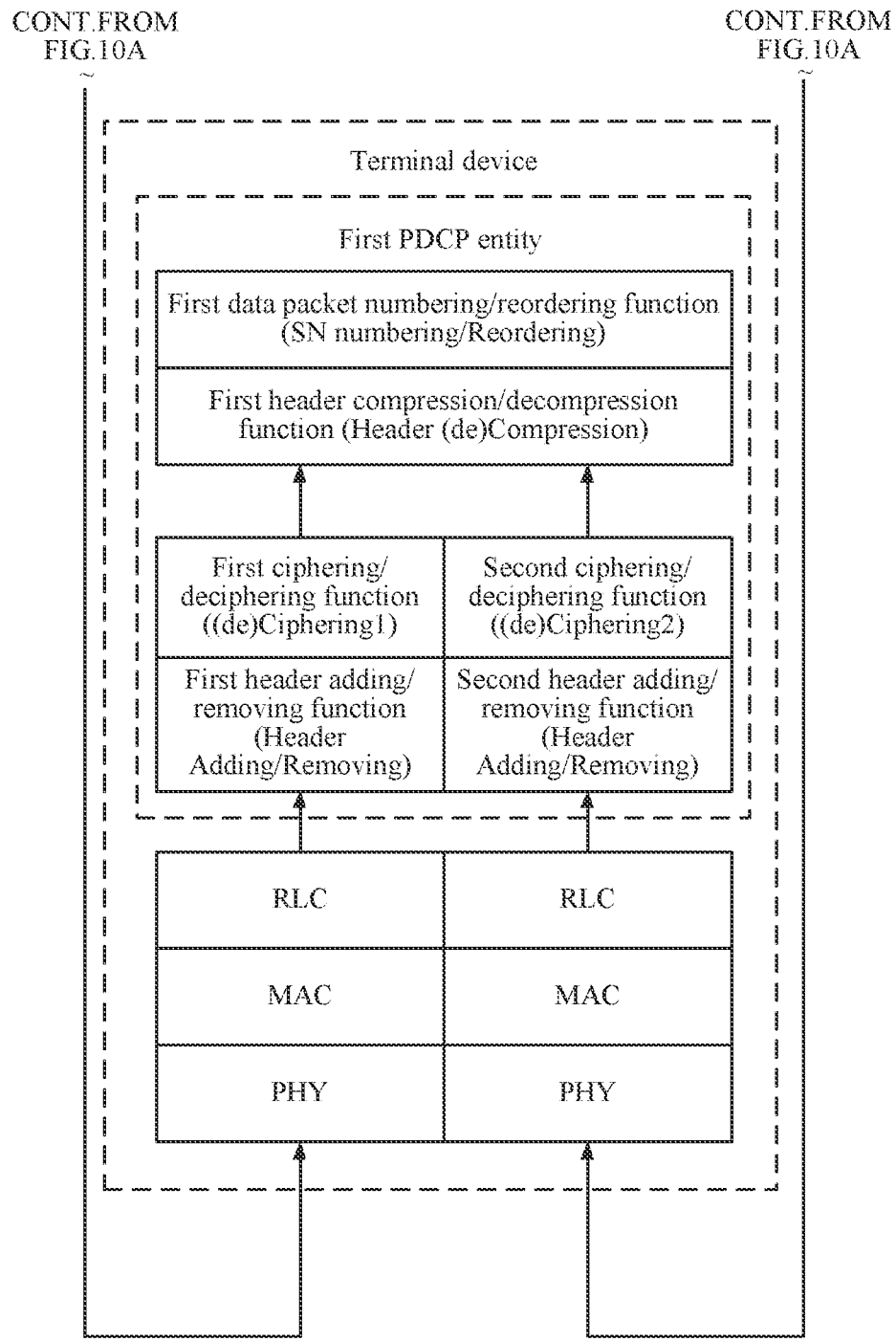

In a second case, as shown in FIG. 10A and FIG. 10B, the terminal device is configured with a first PDCP entity, the first network device is configured with a fourth PDCP entity, and the second network device is configured with a third PDCP entity. Each PDCP entity has corresponding functions.

For example, the terminal device is configured with the first ciphering/deciphering function, the first data packet numbering/reordering function, and the second ciphering/deciphering function; the second network device is configured with the third ciphering/deciphering function; and the first network device is configured with the fourth ciphering/deciphering function and the fifth ciphering/deciphering function.

The third ciphering/deciphering function corresponds to the second ciphering/deciphering function, and the fourth ciphering/deciphering function corresponds to the first ciphering/deciphering function. The fifth ciphering/deciphering function corresponds to the second ciphering/deciphering function.

That is, the third ciphering/deciphering function and the fifth ciphering/deciphering function both correspond to the second ciphering/deciphering function.

In the second case, when forwarding downlink data to the second network device, the first network device sends third data enciphered by the fifth ciphering/deciphering function to the second network device. The third data is a part or all of data received by the PDCP layer of the first network device from a higher layer of the PDCP layer; and when receiving uplink data sent by the second network device, the first network device receives non-deciphered fourth data that is sent by the second network device, and the first network device deciphers the fourth data by using the fifth ciphering/deciphering function.

Specifically, as shown in FIG. 10A and FIG. 10B, the fourth ciphering/deciphering function and the first ciphering/deciphering function correspond to each other and both correspond to a ciphering manner 1 (Ciphering 1) and a deciphering manner 1 (deciphering 1); and the third ciphering/deciphering function and the fifth ciphering/deciphering function both correspond to the second ciphering/deciphering function, and the third ciphering/deciphering function, the fifth ciphering/deciphering function, and the second ciphering/deciphering function all correspond to a ciphering manner 2 (Ciphering 2) and a deciphering manner 2 (deciphering 2).

For example, as shown in FIG. 10A and FIG. 10B, when processing downlink data, on the PDCP layer, the first network device first performs numbering (SN numbering) and then performs header compression (Header Compression) on the data, and then performs ciphering processing on a part of the data in the ciphering manner 1 corresponding to the fourth ciphering/deciphering function of the first network device, then performs corresponding header adding (Header adding) processing, and finally sends the data to the terminal device sequentially through an RLC layer, a MAC layer, and a PHY layer of the first network device, and performs ciphering processing on another part of the data in the ciphering manner 1 corresponding to the fourth ciphering/deciphering function of the first network device, then performs corresponding header adding (Header adding) processing, and then sends the another part of the data to the second network device. The second network device sends the data to the terminal device sequentially through an RLC layer, a MAC layer, and a PHY layer of the second network device. The data passes through the corresponding PHY layer, MAC layer, and RLC layer. The terminal device performs header removing (Header remove) processing on the PDCP layer, performs deciphering processing on the data in the deciphering manner 1 corresponding to the first ciphering/deciphering function and the deciphering manner 2 corresponding to the second ciphering/deciphering function, and finally performs header decompression and reordering on the data to obtain corresponding downlink data by using both the first header compression/decompression function and the first data packet numbering/reordering function.

It should be understood that for processing of uplink data, refer to an inverse process of the downlink data shown in FIG. 10A and FIG. 10B. To avoid repetition, details are not described herein again.

A difference between the data processing process shown in FIG. 10A and FIG. 10B and the data processing process shown in FIG. 9A and FIG. 9B lies in that no ciphering processing is performed on the downlink data forwarded by the first network device to the second network device, and the second network device should perform ciphering processing on the downlink data, and then sends the downlink data to the terminal device. In FIG. 10A and FIG. 10B, ciphering processing is already performed on the downlink data forwarded by the first network device to the second network device, and the second network device should not perform ciphering processing on the downlink data before sending the downlink data to the terminal device.

It should be understood that in the data processing manner shown in FIG. 9A and FIG. 9B, a key used by the second network device may be the same as or different from that used by the first network device. This is not limited in this embodiment of this application.

Figure 11A:
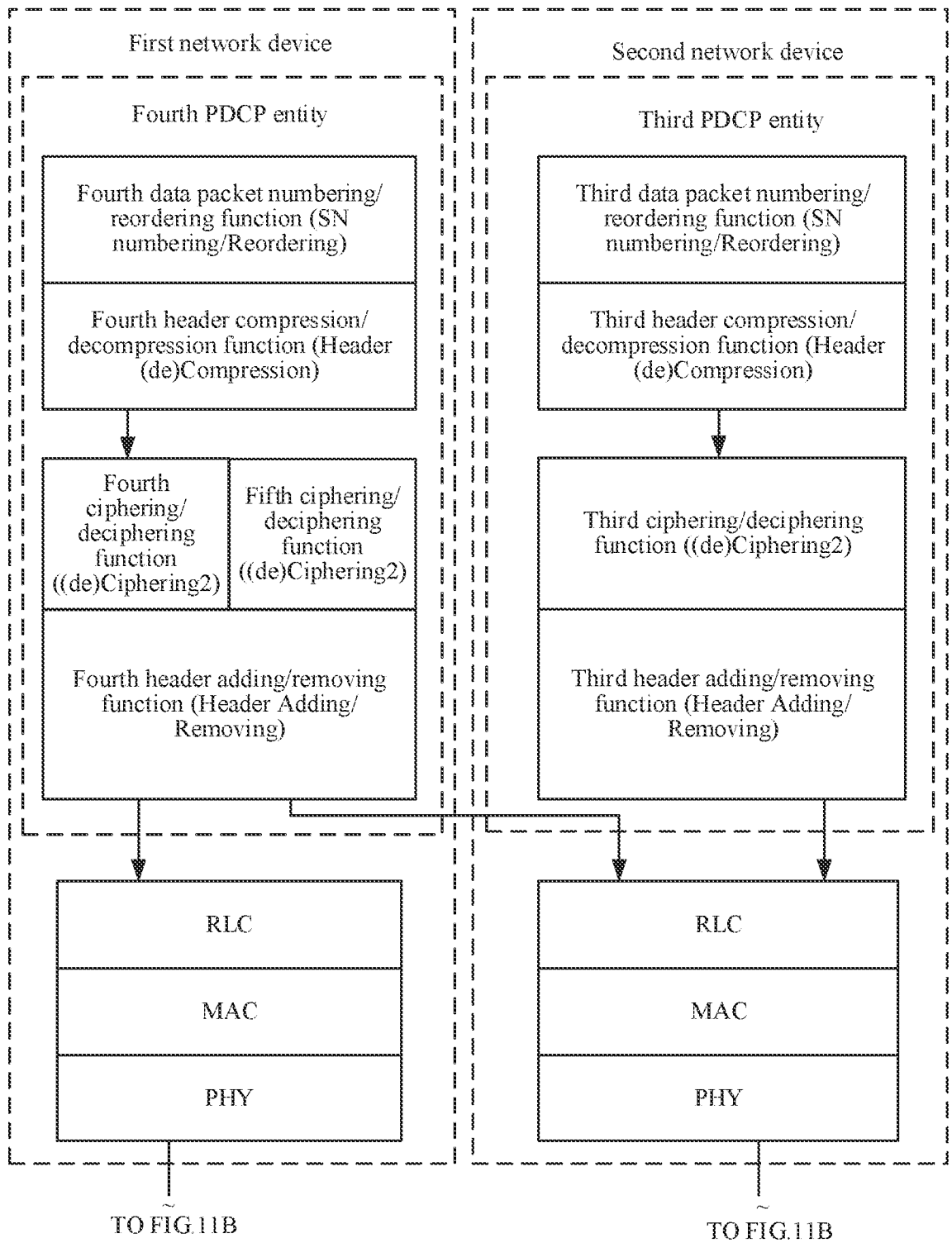
FIG. 11A and FIG. 11B are a schematic diagram of a data processing process according to another embodiment of this application.
Figure 11B:
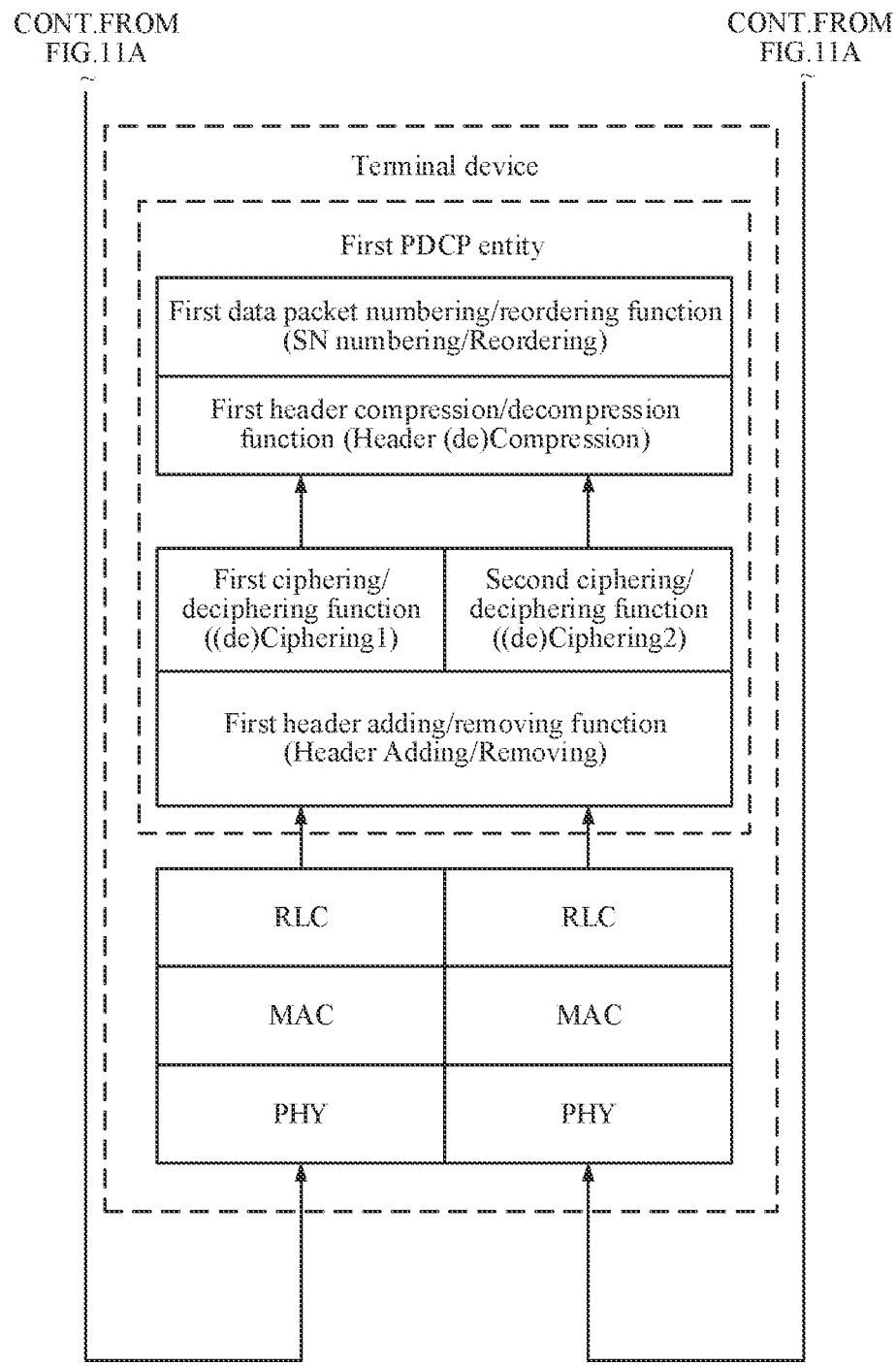

In a third case, as shown in FIG. 11A and FIG. 11B, the terminal device is configured with a first PDCP entity, the first network device is configured with a fourth PDCP entity, and the second network device is configured with a third PDCP entity. Each PDCP entity has corresponding functions.

It should be understood that a data processing process in FIG. 11A and FIG. 11B is similar to that in FIG. 10A and FIG. 10B. To avoid repetition, only a difference between FIG. 10A and FIG. 10B and FIG. 11A and FIG. 11B is described herein. Another processing process in FIG. 11A and FIG. 11B is similar to that in FIG. 10A and FIG. 10B, and details are not described herein again.

Specifically, a difference between FIG. 10A and FIG. 10B and FIG. 11A and FIG. 11B lies in that in FIG. 10A and FIG. 10B, the fourth PDCP entity of the first network device is configured with two header adding/removing functions, that is, the fourth header adding/removing function and the fifth header adding/removing function, and the first PDCP entity of the terminal device is configured with the first header adding/removing function and the second header adding/removing function separately corresponding to the fourth header adding/removing function and the fifth header adding/removing function.

In FIG. 10A and FIG. 10B, during processing of the downlink data, the fourth header adding/removing function performs header adding processing on data on which the fourth ciphering/deciphering function has performed ciphering processing. On the terminal device side, the corresponding first header adding/removing function performs header removing processing, and the first ciphering/deciphering function performs deciphering processing.

The fifth header adding/removing function performs header adding processing on the data on which the fifth ciphering/deciphering function has performed ciphering processing. On the terminal device side, the corresponding second header adding/removing function performs header removing processing, and the second ciphering/deciphering function performs deciphering processing. Similarly, a processing process of the uplink data is opposite to that of the downlink data, and details are not described again.

However, in FIG. 11A and FIG. 11B, the fourth PDCP entity of the first network device is configured with one header adding/removing function, that is, the fourth header adding/removing function, and the first PDCP entity of the terminal device is configured with the first header adding/removing function corresponding to the fourth header adding/removing function.

During processing of the downlink data, the fourth header adding/removing function performs header adding processing on data on which the fourth ciphering/deciphering function has performed ciphering processing. On the terminal device side, the corresponding first header adding/removing function performs header removing processing, and the first ciphering/deciphering function performs deciphering processing.

The fourth header adding/removing function also performs header adding processing on the data on which the fifth ciphering/deciphering function has performed ciphering processing. On the terminal device side, the corresponding first header adding/removing function performs header removing processing, and the second ciphering/deciphering function performs deciphering processing. Similarly, a processing process of the uplink data is opposite to that of the downlink data, and details are not described again.

It should be understood that the examples of FIG. 9A and FIG. 9B, FIG. 10A and FIG. 10B, and FIG. 11A and FIG. 11B are only intended to help a person skilled in the art understand the embodiments of this application, instead of limiting the embodiments of this application to examples of specific values or specific scenarios. Apparently, a person skilled in the art may make various equivalent modifications or changes based on the examples in FIG. 9A and FIG. 9B, FIG. 10A and FIG. 10B, and FIG. 11A and FIG. 11B. Such modifications or changes shall also fall within the range of the embodiments of this application.

For example, the terminal device in FIG. 9A and FIG. 9B, FIG. 10A and FIG. 10B, and FIG. 11A and FIG. 11B may be configured in any one of the manners in FIG. 5 to FIG. 8. This embodiment of this application is not limited thereto.

Optionally, in another embodiment, the handover method may further include:

sending, by the first network device, ninth indication information to the second network device, where the ninth indication information is used to indicate downlink data already successfully received by the terminal device, so that the second network device discards the downlink data already successfully received by the terminal device.

Optionally, in another embodiment, after the first network device transfers uplink data of the terminal device to a core network device (which also may be referred to as a third network device), the handover method may further include:

sending, by the first network device, tenth indication information to the second network device, where the tenth indication information is used to indicate uplink data already successfully transferred to a third network device by the first network device, so that the second network device discards the uplink data already successfully transferred to the third network device by the first network device.

Optionally, in another embodiment, after 350, the handover method may further include:

360: The first network device sends indication information.

Specifically, the first network device sends sixth indication information to the second network device, where the sixth indication information is used to indicate that the terminal device already completes RRC connection reconfiguration; or the first network device sends seventh indication information to the terminal device, where the seventh indication information is used to instruct the terminal device to release an RRC connection to the first network device; or the first network device sends eighth indication information to the terminal device, where the eighth indication information is used to instruct the terminal device to start an RRC connection to the second network device.

More specifically, after the first network device sends the sixth indication information to the second network device, optionally, in another embodiment, the second network device sends RRC connection activation indication information to the terminal device. The indication information is used to instruct the terminal device to start all functions included in the PDCP entity corresponding to the second network device, that is, the UE directly communicates with the second network device by using the second PDCP entity. In addition, the terminal device starts to perform signaling encapsulation by using an RRC entity corresponding to the second network device, and then performs signaling exchange with the second network device. Optionally, in another embodiment, the RRC connection activation indication information may be sent in any one of the following manners:

(1) MAC control element (Control Element, CE);
(2) RLC control PDU;
(3) PDCP control PDU; and
(4) RRC message. In consideration that the terminal device has not started an RRC connection corresponding to the second network device yet, the RRC message may be encapsulated into a PDCP PDU sent by the second network device to the terminal device. It is identified in the PDCP PDU that the PDCP PDU includes the RRC message. Alternatively, a PDCP entity, such as a signaling radio bearer (Signaling Radio Bearer, SRB), is established for the RRC message.

More specifically, the first network device sends the seventh indication information to the terminal device, where the seventh indication information is used to instruct the terminal device to release the RRC connection to the first network device. Optionally, in another embodiment, the seventh indication information may be included in a MAC PDU sent by the first network device to the terminal device. More specifically, the seventh indication information may be encapsulated into a MAC control element (Control Element, CE) and then encapsulated into a MAC PDU, so that the seventh indication information is sent to the terminal device. After receiving the seventh indication information, the terminal device releases various configurations that are stored by the terminal device and that correspond to the first network device, for example, configurations of MAC, RLC, and PDCP layers.

More specifically, the first network device sends the eighth indication information to the terminal device, where the eighth indication information is used to instruct the terminal device to start an RRC connection to the second network device. Optionally, in another embodiment, the eighth indication information may be sent in any one of the following manners:

(1) MAC control element (Control Element, CE);
(2) RLC control PDU;
(3) PDCP control PDU; and
(4) RRC message.

In this specification, data sent by the first network device and the second network device to the terminal device may include user plane data (User Plane Data) or control plane signaling (Control Plane Signaling).

Optionally, in another embodiment, after block 360, that is, after the second network device and the terminal device establish an RRC connection, the first network device may continuously send downlink data to the terminal device, and when the first network device receives, in a preset period, no feedback message sent by the terminal device, stop sending downlink data to the terminal device; or when receiving a feedback status report that is sent by the terminal device and that carries indication information instructing to stop performing data transmission with the first network device, the first network device stops sending downlink data to the terminal device; or after receiving a stop indication message of the second network device, the first network device stops sending downlink data to the terminal device, where the stop indication information is used to instruct the first network device to stop sending downlink data to the terminal device.

Therefore, in this embodiment, in a handover preparation stage, a connection between the terminal device and the second network device is first established, and RRC configuration information therebetween is configured; and in a handover execution stage, the terminal device may simultaneously perform data transmission with the second network device and the first network device, thereby reducing or avoiding a service interruption time caused by handover.

The foregoing describes the handover method based on the embodiments of this application with reference to FIG. 1 to FIG. 11A and FIG. 11B, and the following describes handover methods in the embodiments of this application in detail with reference to more specific examples.

Figure 12:
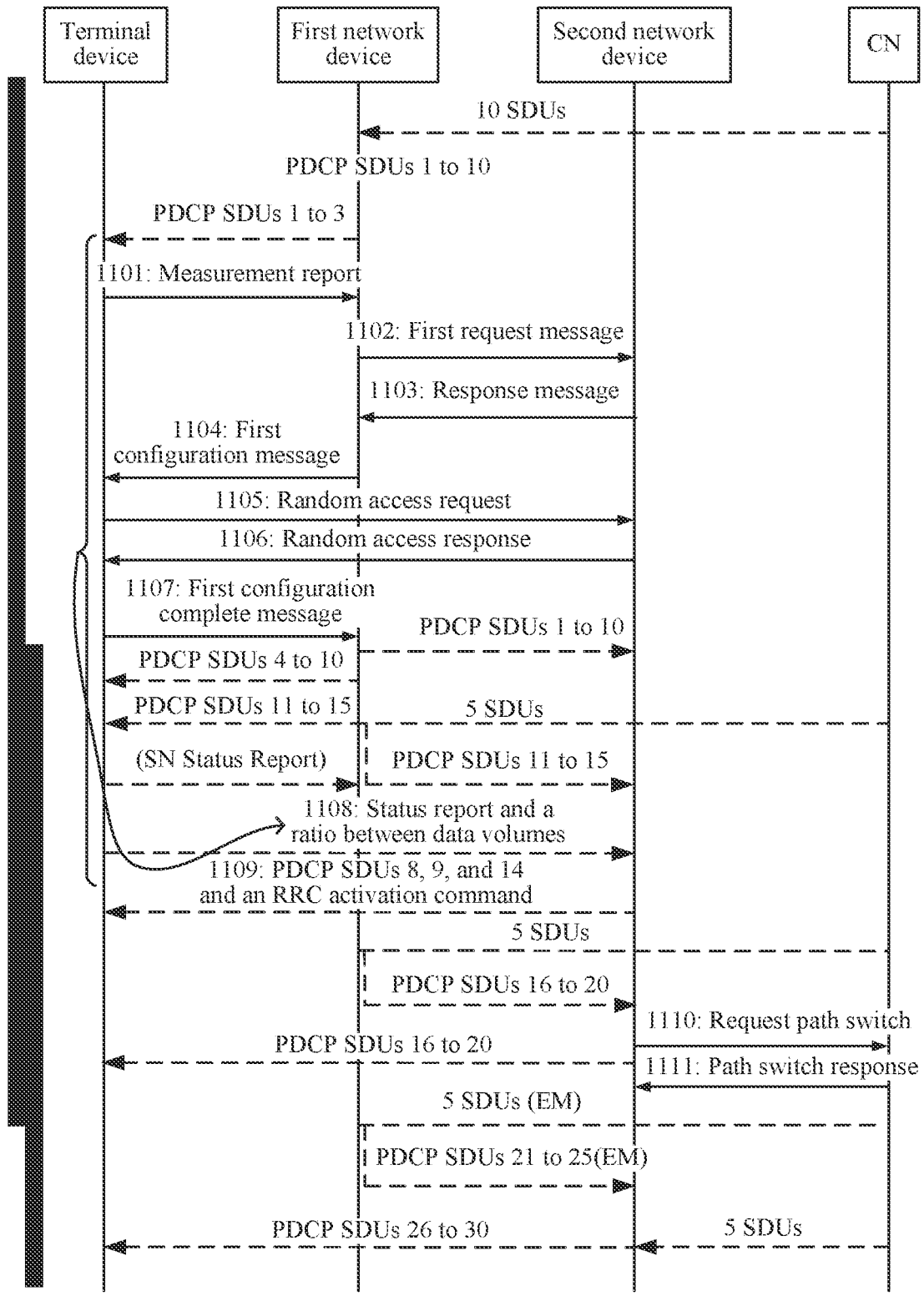
FIG. 12 is a schematic flowchart of a handover method according to another embodiment of this application.

FIG. 12 is a schematic flowchart of a handover method according to another embodiment of this application. In the method shown in FIG. 12, a specific handover process of downlink data transmission is described.

As shown in FIG. 12, in an initial state, a terminal device and a first network device have established an RRC connection and performed data transmission. Downlink (Downlink, DL) is used as an example. The first network device receives downlink data from a core network (Core Network, CN), for example, 10 IP packets (Packet) that are referred to as PDCP SDUs before PDCP encapsulation, that is, the network device receives PDCP SDUs 1 to 10. The first network device first sends the PDCP SDUs 1, 2, and 3 to the terminal device. Subsequently, as shown in FIG. 12, the handover method 1100 specifically includes:

1101: The terminal device sends a measurement report (Measurement Report) to the first network device.

The measurement report includes measurement results of the first network device (or a first cell) and a neighboring network device (or a neighboring cell) of the first network device. The measurement report includes reference signal received power (RSRP) and/or reference signal received quality (RSRQ) and/or a signal to interference plus noise ratio (SINR). A manner or an occasion of sending the measurement report by the terminal device may be configured by the first network device. This is not limited in this embodiment of this application.

1102: The first network device sends a first request message to a second network device.

Specifically, the first network device determines to add a secondary base station (Secondary eNB), that is, the second network device, for the terminal device based on the measurement report of the terminal device, for example, a signal of the first network device becomes weak. In this case, the first network device is a master base station (Master eNB), and the first request message sent by the first network device to the second network device may be a target base station adding request message (TeNB Addition Request).

It should be understood that for the first request message, refer to descriptions of the first request message in block 310 in FIG. 3. To avoid repetition, details are not described herein again.

1103: The second network device sends a response message to the first network device.

Specifically, after receiving the request message sent by the first network device, the second network device determines whether to agree on the request of the first network device based on a resource status and a load status of the second network device; and if agreeing on the request of the first network device, sends the response message to the first network device.

It should be understood that for the response message, refer to descriptions of the response message in block 320 in FIG. 3. To avoid repetition, details are not described herein again.

1104: The first network device sends a first configuration message to the terminal device.

The first configuration message is used to instruct the terminal device to configure the second ciphering/deciphering function associated with the second network device and share the first data packet numbering/reordering function, and the terminal device is configured with the first data packet numbering/reordering function and the first ciphering/deciphering function associated with the first network device.

Specifically, after receiving the response message sent by the second network device, the first network device sends the first configuration message (also may be referred to as an RRC connection reconfiguration (RRC Connection Reconfiguration) message) to the terminal device. The first configuration message includes a part or all of information included in the response message sent by the second network device to the first network device.

It should be understood that for the first configuration message, refer to descriptions of the first configuration message in block 330 in FIG. 3. To avoid repetition, details are not described herein again.

1105: The terminal device sends a random access request to the second network device.

First, the terminal device performs configuration based on the first configuration message. Specifically, for a configuration method, refer to descriptions of block 340 in FIG. 3, and configuration may be performed in any one of the manners in FIG. 5 to FIG. 8. To avoid repetition, details are not described herein again.

The terminal device performs configuration based on the first configuration message, and establishes a second protocol stack corresponding to the second network device. Subsequently, the terminal device initiates random access to the second network device by using configuration information of the second network device, a corresponding random access preamble (RAP), and a corresponding uplink resource (UL Grant), to obtain an uplink timing advance (TA) and an uplink resource.

1106: The second network device sends a random access response to the terminal device.

Specifically, the terminal device receives a random access response message (Random Access Response, RAR) sent by the second network device, where the message includes the uplink grant (UL Grant) and the uplink timing advance (TA).

1107: The terminal device sends a first configuration complete message.

Specifically, when the terminal device receives the UL grant and the TA of the second network device, in a non-contention-based random access process, it indicates that uplink access succeeds. Subsequently, the terminal device may send the first configuration complete message (also may be referred to as an RRC Connection Reconfiguration Complete message (RRC Connection Reconfiguration Complete)) to the second network device, to indicate that the terminal device successfully accesses the second network device.

Optionally, block 1107 may be further performed between blocks 1104 and 1105. In this case, the first configuration complete message no longer indicates that the terminal device already successfully accesses the second network device, and instead indicates that the terminal device completes configuration based on the configuration message.

It should be noted that before forwarding data to the second network device, the first network device only sends data from a core network to the terminal device or sends uplink data sent by the terminal device to a core network. After block 1107, that is, after the first network device receives the RRC connection reconfiguration complete message, or after block 1103, that is, after the first network device receives the adding request response message of the second network device, the first network device starts to forward data to the second network device. A data forwarding form corresponds to content indicated by third indication information in the first request message in block 1102. If copied-version data is forwarded, after block 1103 or block 1107, the first network device starts to forward, to the second network device, a counterpart version of data received by the first network device from the CN. For example, the first network device forwards PDCP SDUs 1 to 10 to the second network device. If non-copied-version data is forwarded, after block 1103 or block 1107, the first network device starts to forward the PDCP SDUs 1 to 10 to the second network device. Although the PDCP SDUs 1, 2, and 3 are already sent by the first network device to the terminal device, if no feedback of the terminal device is received, the PDCP SDUs 1, 2, and 3 should be forwarded to the second network device for resending. In addition, in a process of blocks 1101 to 1107, data-plane data is always transmitted. For example, during this period, the first network device further sends data packets 4 to 10 to the terminal device.

Subsequently, the first network device sends, to the terminal device, a data packet received from the CN in one embodiment, and forwards the data packet to the second network device in another embodiment.

For example, as shown in FIG. 12, during blocks 1101 to 1107, the first network device may further receive 5 SDUs sent by the CN, that is, PDCP SDUs 11 to 15. The first network device sends the PDCP SDUs 11 to 15 to the terminal device in one embodiment, and forwards PDCP SDUs 11 to 15 to the second network device in another embodiment.

At a handover stage, the terminal device reports an SN status report (SN status Report) to the first network device, to indicate data successfully received and data not successfully received yet from the first network device. After block 1106, if the second network device should send downlink data to the terminal device, the second network device may send the data to the terminal device after block 1106. In this way, an SN status report reported by the terminal device to the first network device may be an original report reflecting only a status of data transmission between the first network device and the terminal device, or may be a report reflecting a status of data transmission between the first network device and the terminal device and between the second network device and the terminal device. To be specific, if some data is successfully received from the second network device, the terminal device may indicate, in the status report to the first network device, that the data is already successfully received.

If forwarding non-copied-version data to the second network device, after receiving an SN status report sent by the terminal device, the first network device further should forward the following data to the second network device: data that cannot be sent to the terminal device because a signal of the first network device is poor; and downlink data sent by the core network to the first network device. In a normal case, the first network device should send the downlink data to the terminal device. In this case, the first network device forwards a part or all of the downlink data to the second network device.

In addition, for downlink data forwarded by the first network device to the second network device, the first network device sends a PDCP SDU that is not encapsulated and a corresponding SN to the second network device. The second network device encapsulates the PDCP PDU by using the corresponding SN and a key allocated to the second network device.

Optionally, in another embodiment, the first network device may determine to send a handover command (or the first network device releases a command) to the terminal device based on the measurement report of the terminal device. The handover command is generated by the first network device, and may be sent by the first network device and the second network device to the terminal device. After sending the handover command, the first network device deletes an RRC entity corresponding to the terminal device and a corresponding SRB.

After receiving the handover command, the terminal device deletes an SRB corresponding to the first network device, enables an SRB corresponding to the second network device, and enables a disabled SRB configuration. Subsequently, the terminal device sends a handover complete message to the second network device by using the SRB corresponding to the second network device, and indicates activation of the SRB of the second network device on a MAC layer/RLC layer/PDCP layer.

1108: The terminal device sends, to the second network device by using the TA and the UL grant obtained in block 1106, a status report (SN Status Report) and a ratio between data volumes successfully received from the first network device and the second network device (Ratio S/T).

The status report indicates, to the second network device, data received successfully and data not received successfully. The second network device sends, to the terminal device based on the status report reported by the terminal device, a data packet not received successfully by the terminal device. The ratio between the data volumes reflects a comparison between data (quantities of data packets or data volumes, for example, data volumes in a unit of Byte or bit) successfully received by the terminal device from the first network device and the second network device. The comparison may be provided to the second network device for reference, to activate an RRC connection of a second network device side.

Alternatively, in another embodiment, after block 1107, the first network device indicates, to the second network device, that the terminal device already configures an RRC configuration. When receiving this indication, the second network device activates the RRC connection corresponding to the second network device.

Alternatively, in another embodiment, block 1107 may be replaced with sending, by the terminal device, a configuration complete message to the second network device. The second network device activates the RRC configuration based on the message.

1109: The second network device sends an RRC activation command to the terminal device.

Specifically, the RRC activation signaling may be sent by using an RRC message or a MAC CE.

In block 1109, the second network device may alternatively send downlink data while transmitting an RRC activation command. The downlink data may be downlink data that has a feedback that is from the terminal device and that indicates unsuccessful receiving in block 1108, and is for example, PDCP SDUs 8, 9, and 14.

It should be understood that in this embodiment of this application, after block 1109, the first network device may keep sending downlink data to the terminal device for a period. The first network device may autonomously determine a time at which the first network device stops sending downlink data to the terminal device. For example, when the terminal device stops providing a feedback to the first network device when steadily receiving downlink data from the second network device, and the first network device detects no feedback from the terminal device, the first network device stops sending downlink data to the terminal device.

That the first network device stops sending data to the terminal device may be triggered as follows:

(1) when the terminal device sends the last status report to the first network device, a MAC CE is carried, indicating that the first network device may stop sending data to the terminal device; or (2) the second network device requests the first network device to forward all data from the CN, and indicates that the first network device may stop sending data to the terminal device; or (3) the first network device autonomously determines to stop sending data to the terminal device.

It should be understood that in a process of blocks 1108 to 1109, data-plane data is always transmitted. For example, during this period, the first network device may further receive 5 SDUs: PDCP SDUs 16 to 20 sent by the CN.

After obtaining the 5 SDUs, the first network device may send the data to the second network device, and the second network device sends the data to the terminal device.

1110: The second network device requests path switching (Path Switch) from the core network, and requests an S-GW to forward downlink data to the second network device.

1111: The core network sends a path switch acknowledgement (Path Switch ACK) to the second network device.

In addition, the core network (for example, the S-GW) identifies, with a marker "end", the last data packet sent to the first network device.

For example, the core network sends another 5 SDUs to the terminal device, that is, PDCP SDUs 21 to 25, and identifies the last data packet with an end marker (End Marker, EM).

The first network device forwards the marker to the second network device. When receiving the data packet identified with the marker "end", the second network device starts to send, to the terminal device, downlink data sent by the core network (for example, the S-GW). For example, the second network device sends 5 new SDUs: PDCP SDUs 26 to 30 to the terminal device.

Therefore, in this embodiment, in a handover preparation stage, a connection between the terminal device and the second network device is first established, and RRC configuration information therebetween is configured; and in a handover execution stage, the terminal device may simultaneously perform data transmission with the second network device and the first network device, thereby reducing an interruption time caused by handover.

It should be understood that in FIG. 12, an upper vertical bar on the left corresponds to interaction between the terminal device and the first network device, a lower vertical bar on the left corresponds to interaction between the terminal device and the second network device, and an overlapping part of the two vertical bars indicates that the terminal device may simultaneously interact with the first network device and the second network device. FIG. 13 to FIG. 17 are similar to this. To avoid repetition, details are not described herein again.

Figure 13:
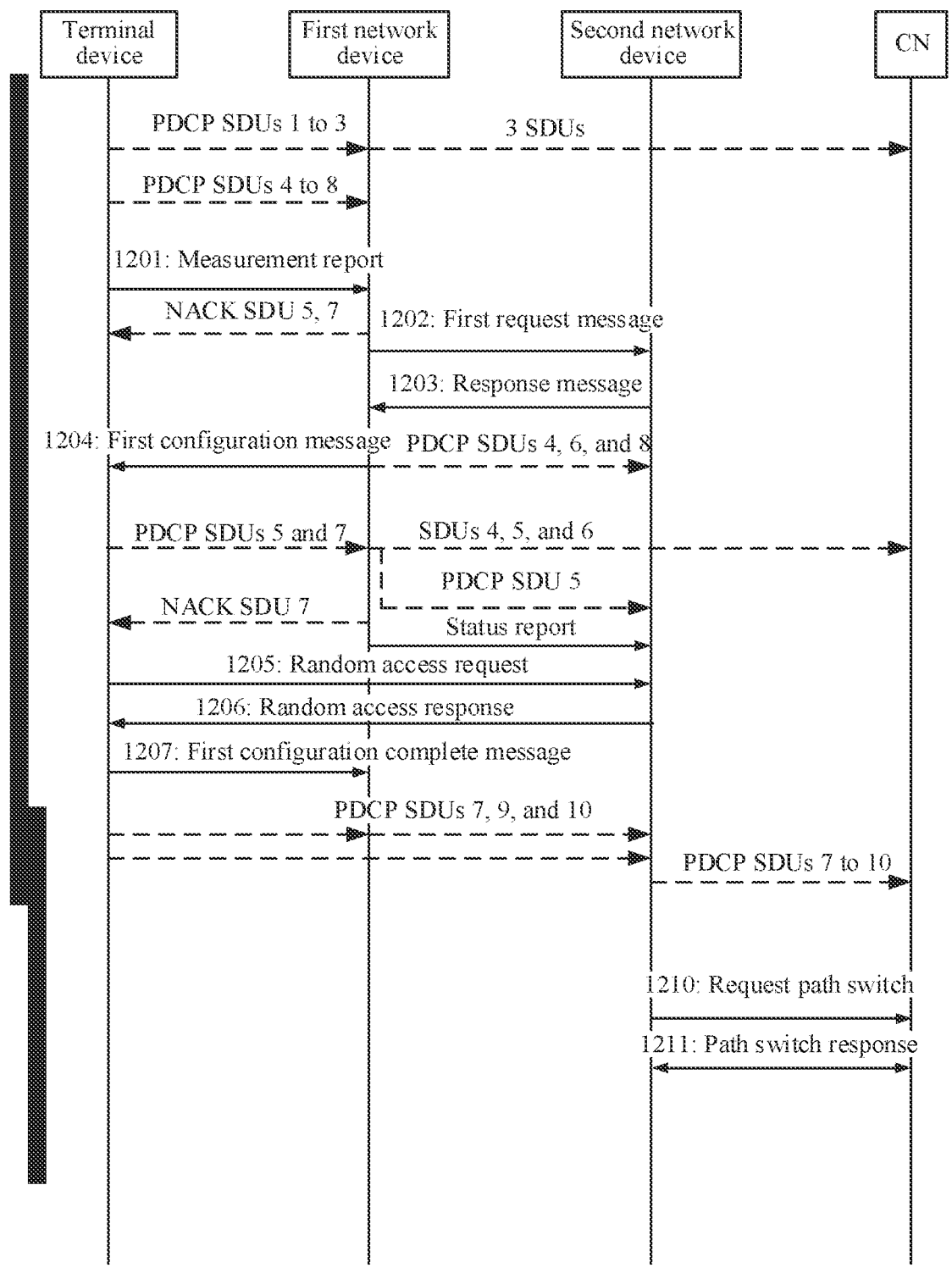
FIG. 13 is a schematic flowchart of a handover method according to another embodiment of this application.

FIG. 13 is a schematic flowchart of a handover method according to another embodiment of this application. In the method shown in FIG. 13, a specific handover process of uplink data transmission is described.

Specifically, in an initial state, a terminal device and a first network device have established an RRC connection and performed data transmission. Uplink (Uplink, UL) is used as an example. The first network device receives uplink data such as PDCP SDUs 1 to 8 from the terminal device, and the first network device may first send the PDCP SDUs 1, 2, and 3 to a core network device. Subsequently, as shown in FIG. 13, the handover method 1200 specifically includes:

1201: The terminal device sends a measurement report (Measurement Report) to the first network device.

The measurement report includes measurement results of the first network device (or a first cell) and a neighboring network device (or a neighboring cell) of the first network device. The measurement report includes reference signal received power (Reference Signal Received Power, RSRP) and/or reference signal received quality (Reference Signal Received Quality, RSRQ) and/or a signal to interference plus noise ratio (Signal Interference Noisy Ratio, SINR). A manner or an occasion of sending the measurement report by the terminal device may be configured by the first network device. This is not limited in this embodiment of this application.

Optionally, in another embodiment, in this process, because a network status is relatively poor, the first network device does not successfully receive some data, for example, PDCP SDUs 5 and 7. In this case, the first network device may feed back, to the terminal device, a feedback message indicating that the SDUs 5 and 7 (NACK SDUs 5 and 7) are not successfully received.

1202: The first network device sends a first request message to a second network device.

Specifically, the first network device determines to add a secondary base station (Secondary eNB), that is, the second network device, for the terminal device based on the measurement report of the terminal device, for example, a signal of the first network device becomes weak. In this case, the first network device is a master base station (Master eNB), and the first request message sent by the first network device to the second network device may be a target base station adding request message (second network device Addition Request).

It should be understood that for the first request message, refer to descriptions of the first request message in block 310 in FIG. 3. To avoid repetition, details are not described herein again.

It should be noted that a difference between block 1202 in uplink transmission and block 1102 in downlink transmission lies in that in block 1202, the first network device already sends an address (referred to as a tunnel endpoint identifier, Tunnel Endpoint Identifier, TEID) of a serving gateway on a CN side to the second network device. The second network device can already send uplink data to the serving GW, but in block 1202, no uplink data arrives at the second network device yet. In addition, block 1202 may further carry a data transmission destination address of the first network device. In this way, after block 2, the second network device may send user data to the first network device.

1203: The second network device sends a response message to the first network device.

Specifically, after receiving the request message sent by the first network device, the second network device determines whether to agree on the request of the first network device based on a resource status and a load status of the second network device; and if agreeing on the request of the first network device, sends the response message to the first network device.

It should be understood that for the response message, refer to descriptions of the response message in block 320 in FIG. 3. To avoid repetition, details are not described herein again.

It should be understood that a difference between block 1203 in uplink transmission and block 1103 in downlink transmission lies in that in block 1203, the second network device sends a data transmission destination address to the first network device, and the first network device may forward user data to the second network device.

In a method, after block 1203, the first network device may forward user uplink data to the second network device, and then the second network device sends the user uplink data to the serving GW. In this way, regardless of whether the terminal device sends same data or different data to the first network device, the data is collected in the second network device, and the second network device performs reordering, repeated packet detection, or the like.

In another method, after block 1203, the first network device transfers, to the S-GW, ordered data that may be transferred to the S-GW. The first network device sends, to the second network device, a copied version of data (for example, SDUs 4, 6, and 8) that cannot be sequentially transferred to the S-GW. When receiving an SDU 5, the first network device may transfer the SDUs 4, 5, and 6 to the S-GW. In this case, the first network device sends a status report to the second network device, to indicate that the SDU 6 and the previous data packets are already sent to the S-GW, and the second network device discards the SDUs 4 and 6.

1204: The first network device sends a first configuration message to the terminal device.

The first configuration message is used to instruct the terminal device to configure the second ciphering/deciphering function associated with the second network device and share the first data packet numbering/reordering function, and the terminal device is configured with the first data packet numbering/reordering function and the first ciphering/deciphering function associated with the first network device.

Specifically, after receiving the response message sent by the second network device, the first network device sends the first configuration message (also may be referred to as an RRC connection reconfiguration (RRC Connection Reconfiguration) message) to the terminal device. The first configuration message includes a part or all of information included in the response message sent by the second network device to the first network device.

It should be understood that for the first configuration message, refer to descriptions of the first configuration message in block 330 in FIG. 3. To avoid repetition, details are not described herein again.

Optionally, after block 1204, the first network device may send an SN status transfer (SN Status Transfer) to the second network device, to indicate an SDU number not successfully received.

In this period, the first network device may feed back, to the terminal device, a feedback message indicating that the SDU 7 (NACK SDU 7) is not successfully received.

1205: The terminal device sends a random access request to the second network device.

First, the terminal device performs configuration based on the first configuration message. Specifically, for a configuration method, refer to descriptions of block 340 in FIG. 3, and configuration may be performed in any one of the manners in FIG. 5 to FIG. 8. To avoid repetition, details are not described herein again.

The terminal device performs configuration based on the first configuration message, and establishes a second protocol stack corresponding to the second network device. Subsequently, the terminal device initiates random access to the second network device by using configuration information of the second network device, a corresponding random access preamble (Random access preamble, RAP), and a corresponding uplink resource (UL Grant), to obtain an uplink timing advance (Timing Advance, TA) and an uplink resource.

1206: The second network device sends a random access response to the terminal device.

Specifically, the terminal device receives a random access response message (RAR) sent by the second network device, where the message includes the uplink grant (UL Grant) and the uplink timing advance (TA).

1207: The terminal device sends a first configuration complete message.

Specifically, when the terminal device receives an UL grant and a TA of the second network device, in a non-contention-based random access process, it indicates that uplink access succeeds. Subsequently, the terminal device may send the first configuration complete message (also may be referred to as an RRC Connection Reconfiguration Complete message) to the first network device, to indicate that the terminal device successfully accesses the second network device.

Optionally, block 1207 may be further performed between blocks 1204 and 1205. In this case, the first configuration complete message no longer indicates that the terminal device already successfully accesses the second network device, and instead indicates that the terminal device completes configuration based on the configuration message.

In addition, in a process of blocks 1201 to 1207, data-plane data is always transmitted. For example, in this period, the terminal device further sends the PDCP SDUs 9 and 10, and further sends the PDCP SDU 7 not successfully received by the first network device. Finally, the PDCP SDUs 7, 8, 9, and 10 are sent by the second network to the core network.

It should be understood that in block 1205 and block 1206, the terminal device continues to send uplink data to the first network device, and initiates an access process to the second network device. After block 7, the terminal device starts to send uplink data to the second network device.

When sending the data, the terminal device may send same data (a copied version) to the first network device and the second network device, that is, to ensure sending reliability, or the terminal device may send different data to the first network device and the second network device, that is, send a part of data to the first network device and send the remaining data to the second network device.

When the terminal device sends different data to the first network device and the second network device and the terminal device successfully accesses the second network device, the terminal device starts to send uplink data to the second network device. In this case, an uplink data packet includes: new uplink data (for example, the PDCP SDUs 9 and 10) generated by the terminal device side, and uplink data (for example, the PDCP SDU 7) that is sent by the terminal device side to the first network device but that has no ACK response. In this case, if the terminal device receives a NACK of a data packet, where the NACK indicates that the data is not successfully received, if the terminal device has not sent the data packet to the second network device, the terminal device retransmits the data packet to the first network device. If the terminal device has sent the data packet to the second network device, the terminal device may feed back an ACK to the first network device, to indicate that the data packet is already successfully sent.

1210: The second network device requests path switching (Path Switch) from the core network, and requests an S-GW to forward downlink data to the second network device.

1211: The core network sends a path switch acknowledgement (ACK) to the second network device.

Therefore, in this embodiment, in a handover preparation stage, a connection between the terminal device and the second network device is first established, and RRC configuration information therebetween is configured; and in a handover execution stage, the terminal device may simultaneously perform data transmission with the second network device and the first network device, thereby reducing an interruption time caused by handover.

Figure 14:
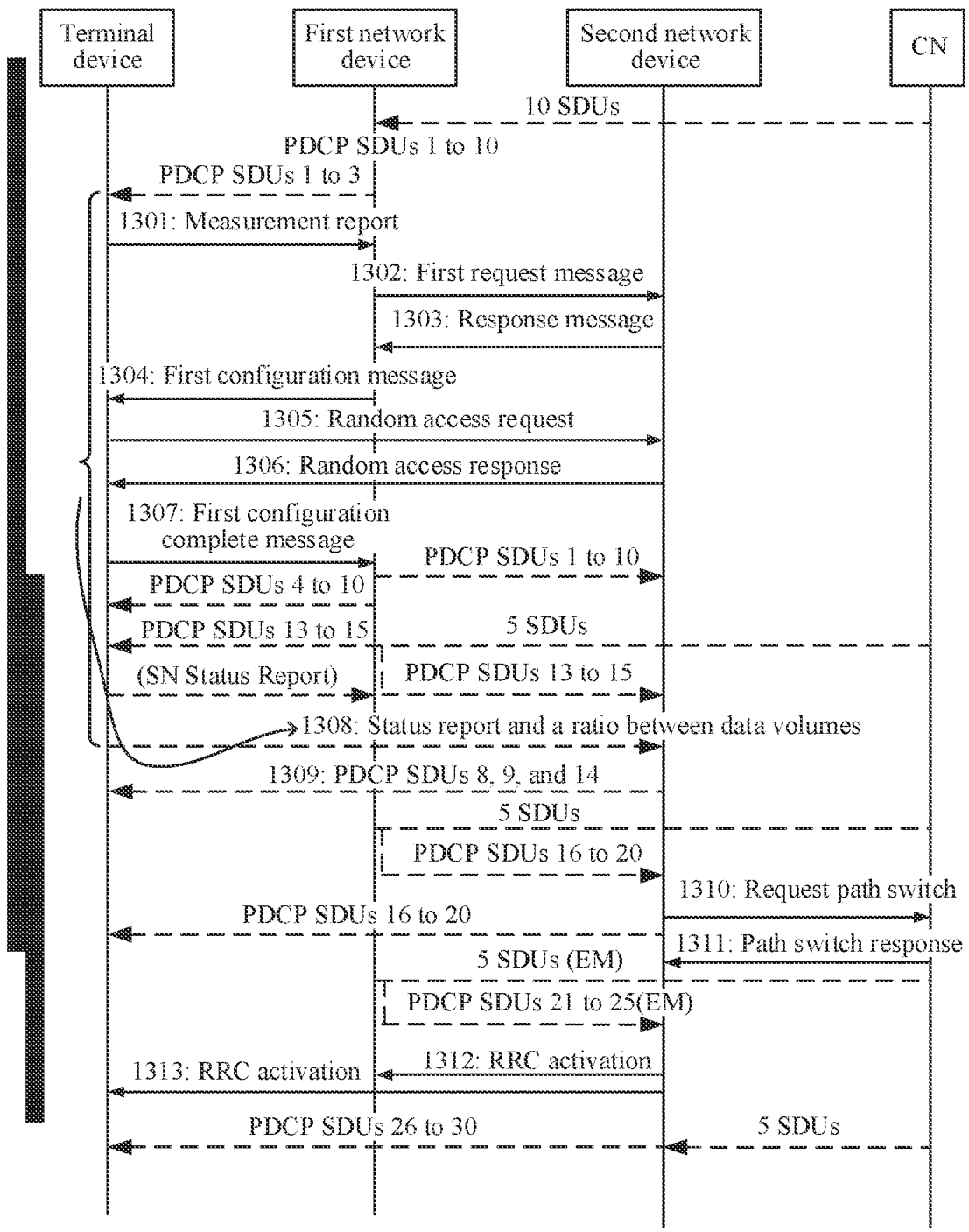
FIG. 14 is a schematic flowchart of a handover method according to another embodiment of this application.

FIG. 14 is a schematic flowchart of a handover method according to another embodiment of this application. In the method shown in FIG. 14, a specific handover process of downlink data transmission is described.

The handover method 1300 shown in FIG. 14 is similar to the handover method 1100 shown in FIG. 12. To avoid repetition, detailed descriptions are properly omitted herein.

Specifically, blocks 1301 to 1308 correspond to blocks 1101 to 1108, and refer to the descriptions in FIG. 12.

Block 1309: A second network device sends corresponding downlink data, for example, PDCP SDUs 8, 9, and 14, to a terminal device based on a status report of the terminal device in block 1308.

A difference between block 1309 and block 1109 lies in that in block 1109, the second network device may further send an RRC activation command to the terminal device. Only the corresponding downlink data is sent in block 1309, and the RRC activation command is sent in blocks 1312 and 1313.

Blocks 1310 and 1311 correspond to blocks 1110 and 1111, and refer to the descriptions in FIG. 12.

In blocks 1312 and 1313, when receiving a data packet identified with the marker "end", the second network device sends an RRC connection activation indication message to the first network device and the terminal device, to instruct the terminal device to use an RRC entity corresponding to the second network device.

It should be understood that in this embodiment of this application, the activation indication message may be generated in any one of the following manners. However, this embodiment of this application is not limited thereto.

Manner 1: An RRC entity on the second network device side generates the activation indication information, where the activation indication information is then encapsulated into an RRC message. The RRC message is sent to a T-PDCP (in consideration that the second network device is a target station, a prefix T is added to the front of a name of each layer, to be distinguished from a corresponding layer of a source station (a prefix S is added to the front of a name of a corresponding layer of the source station)) of the second network device. The RRC message is sent to the terminal device through a T-RLC, a T-MAC, and a T-PHY. The terminal device receives the RRC message by using the T-PHY, the T-MAC, the T-RLC, and the T-PDCP corresponding to the second network device, and forwards the RRC message to an S-PDCP layer corresponding to the first network device. The RRC message is sent to an S-RRC entity corresponding to the first network device. The S-RRC entity parses the message.

Manner 2: The activation indication information is encapsulated into an RRC message carrying second indication information, indicating that the RRC message is parsed by the T-RRC entity. Then, on the terminal device side, the S-RRC entity forwards the received RRC message to the T-RRC, and the T-RRC entity parses the RRC message.

Manner 3: When the T-PDCP encapsulates the RRC message, it is indicated that the PDCP SDU is transferred to the T-RRC entity. On the terminal device side, when receiving the PDCP PDU, the T-PDCP directly transfers the RRC message to the T-RRC entity based on indication information, to perform parsing.

Manner 4: The T-MAC layer of the second network device directly sends MAC control signaling to the terminal device side, to activate an RRC connection of the second network device.

It should be understood that in this embodiment of this application, numbers of blocks 1312 and 1313 do not indicate a time sequence. Blocks 1312 and 1313 may further be performed after block 1308 or block 1309. This embodiment of this application is not limited thereto.

Figure 15:
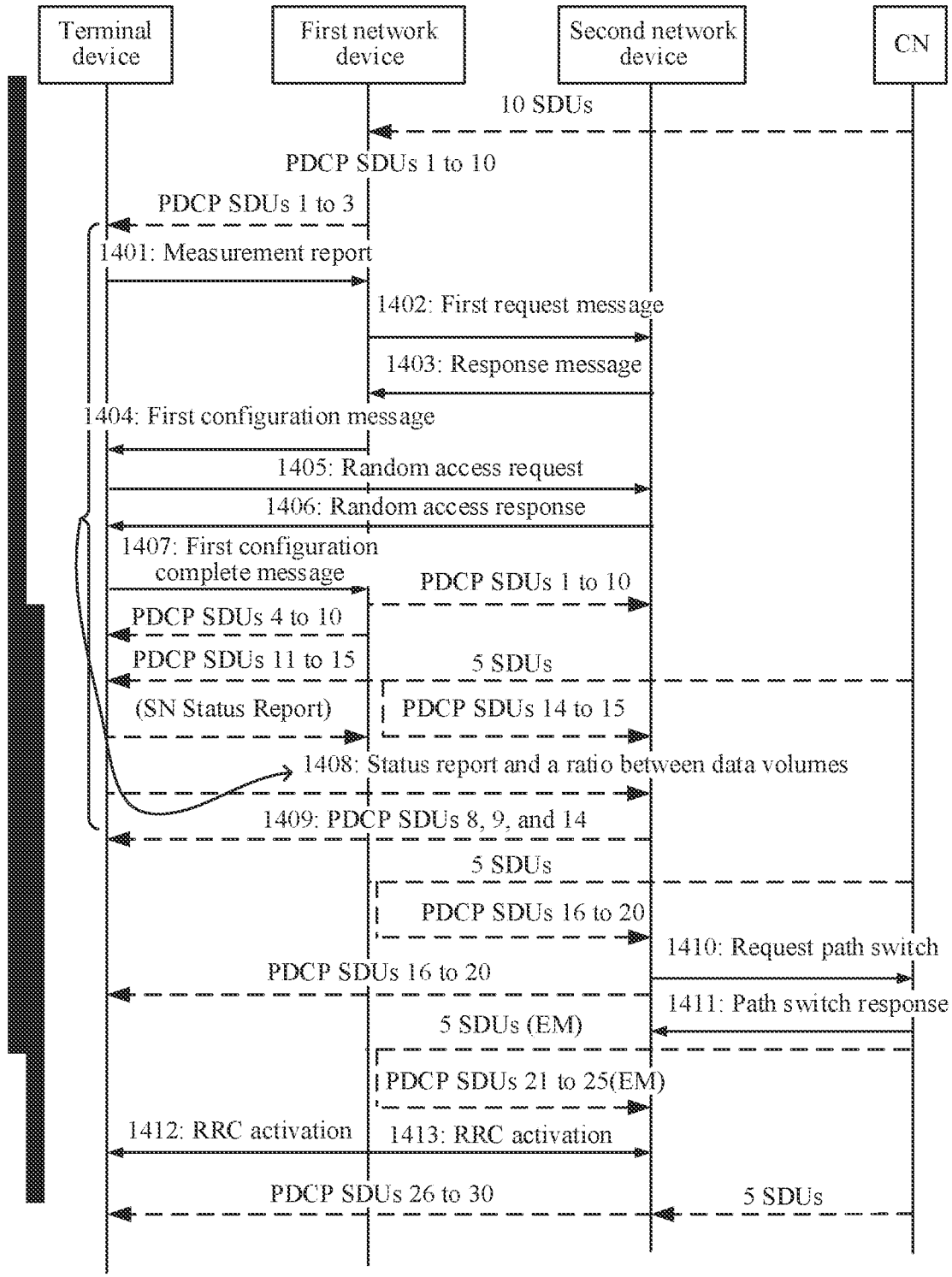
FIG. 15 is a schematic flowchart of a handover method according to another embodiment of this application.

FIG. 15 is a schematic flowchart of a handover method according to another embodiment of this application. In the method shown in FIG. 15, a specific handover process of downlink data transmission is described.

The handover method 1400 shown in FIG. 15 is similar to the handover method 1400 shown in FIG. 12. To avoid repetition, detailed descriptions are properly omitted herein.

Specifically, blocks 1401 to 1408 correspond to blocks 1201 to 1208, and refer to the descriptions in FIG. 12.

Block 1409: A second network device sends corresponding downlink data, for example, PDCP SDUs 8, 9, and 14, to a terminal device based on a status report of the terminal device in block 1408.

A difference between block 1409 and block 1109 lies in that in block 1109, the second network device may send an RRC activation command to the terminal device. Only the corresponding downlink data is sent in block 1409, and the RRC activation command is sent in blocks 1412 and 1413.

Blocks 1410 and 1411 correspond to blocks 1210 and 1211, and refer to the descriptions in FIG. 12.

Blocks 1412 and 1413: When receiving a data packet identified with a marker "end", a first network device sends an RRC connection activation indication message to a second network device and a terminal device.

A difference between FIG. 14 and FIG. 15 lies in that in FIG. 14, an RRC activation command is sent by the second network device. In FIG. 15, the RRC activation command is sent by the first network device.

It should be understood that in this embodiment of this application, an RRC connection may be further activated in another manner, and is not limited to the activation manners in FIG. 12, 13, and FIG. 15.

For example, alternatively, in this embodiment of this application, an RRC activation process may be further performed after block 1109, and the second network device instructs the first network device to perform RRC activation, to instruct the first network device to deactivate an original RRC connection.

Alternatively, in this embodiment of this application, after block 1109, that is, after the terminal device receives an RRC activation message, the terminal device may send an RRC activation notification message to the first network device, to notify the first network device that the terminal device already activates the RRC connection of the second network device side.

Figure 16:
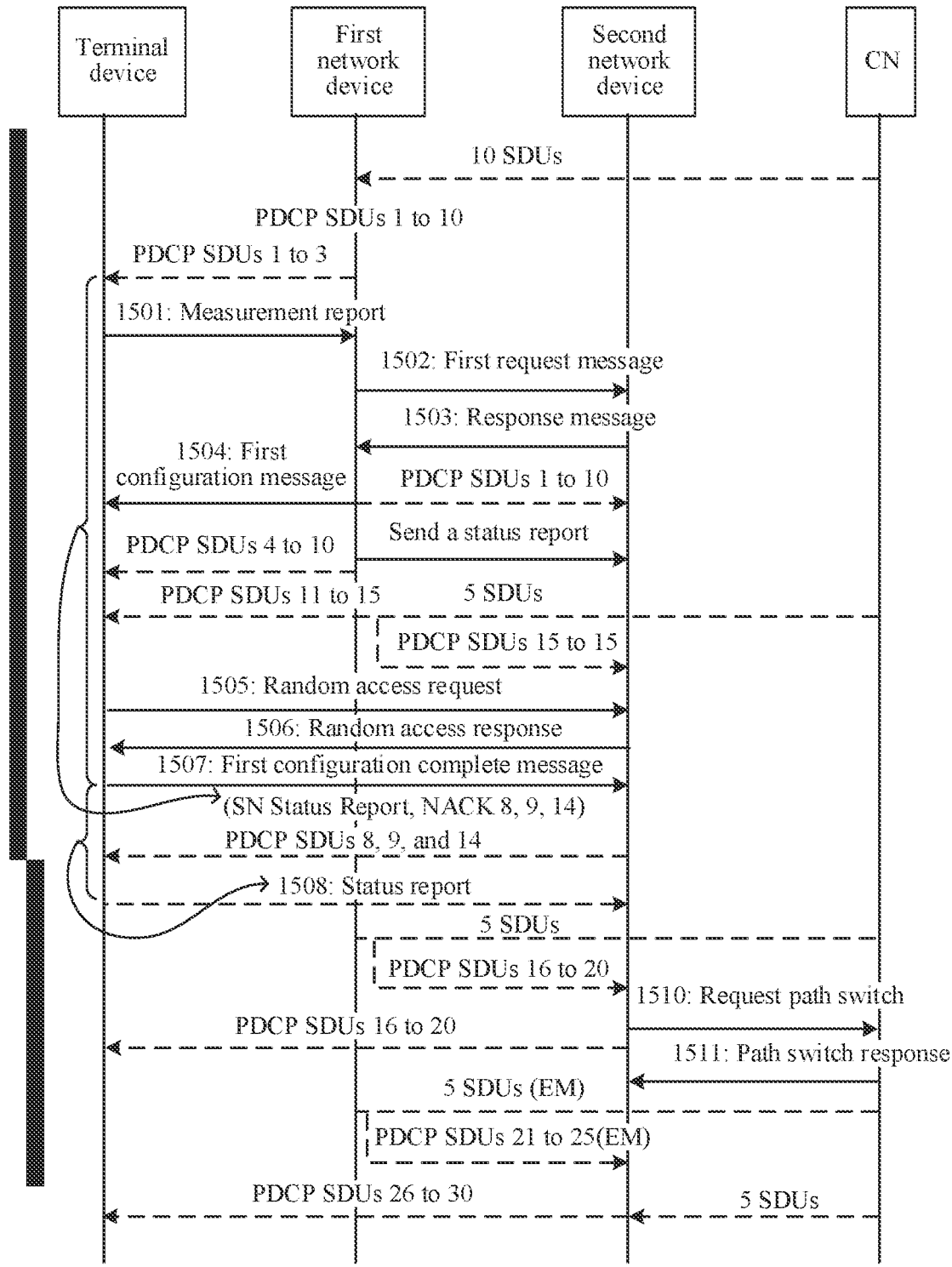
FIG. 16 is a schematic flowchart of a handover method according to another embodiment of this application.

FIG. 16 is a schematic flowchart of a handover method according to another embodiment of this application. In the method shown in FIG. 16, a specific handover process of downlink data transmission is described.

The handover method 1500 shown in FIG. 16 is similar to the handover method 1100 shown in FIG. 12. To avoid repetition, detailed descriptions are properly omitted herein.

The following mainly describes a difference between FIG. 16 and FIG. 12, and a same part of FIG. 16 and FIG. 12 is not described in detail.

Blocks 1501 to 1504 correspond to blocks 1101 to 1104, and a difference lies in that in block 1502 and block 1503, messages carrying corresponding content are a handover request message and a handover request response message.

After block 1503 or block 1504, the first network device starts to forward downlink data to the second network device, for example, sends PDCP SDUs 1 to 10. To ensure a handover interruption time of 0 ms, the downlink data should be prepared on the second network device. However, in consideration that the second network device has not established a connection to the terminal device at this time, downlink data cannot be sent to the terminal device yet. Forwarding data by the first network device to the second network device increases a storage load of the second network device. Therefore, the first network device may send a status report (SN status Transfer) to the second network device, to indicate data that is already successfully received by the terminal device. In this way, the second network device may discard the successfully received data packet, and store only data not successfully received by the terminal device yet.

In this way, in a process of sending data by the first network device to the terminal device, a part of the data is also backed up on the second network device.

Blocks 1505 and 1506 correspond to blocks 1105 and 1106, and the terminal device is synchronized with the second network device and obtains an uplink resource and a TA.

Block 1507: The terminal device sends a first configuration complete message, for example, an RRC connection reconfiguration complete message, to the second network device by using the uplink resource and the TA obtained in block 1506, where the message may further carry a status report (SN Status Report), and the status report is used by the terminal device to indicate an already successfully received data packet and an unsuccessfully received data packet in a previous process to the second network device. For example, data packets 8, 9, and 14 are not successfully received. After block 1507, the terminal device starts to receive data from the second network device, and the second network device sends data not successfully received and new data to the terminal device.

For example, the second network device sends the PDCP SDUs 8, 9, and 14 to the terminal device.

Block 1508: The terminal device sends a status report to the second network device, for example, sends a status report indicating whether the PDCP SDUs 8, 9, and 14 are successfully received.

Blocks 1510 and 1511 correspond to blocks 1110 and 1111. Refer to descriptions of FIG. 12.

Figure 17:
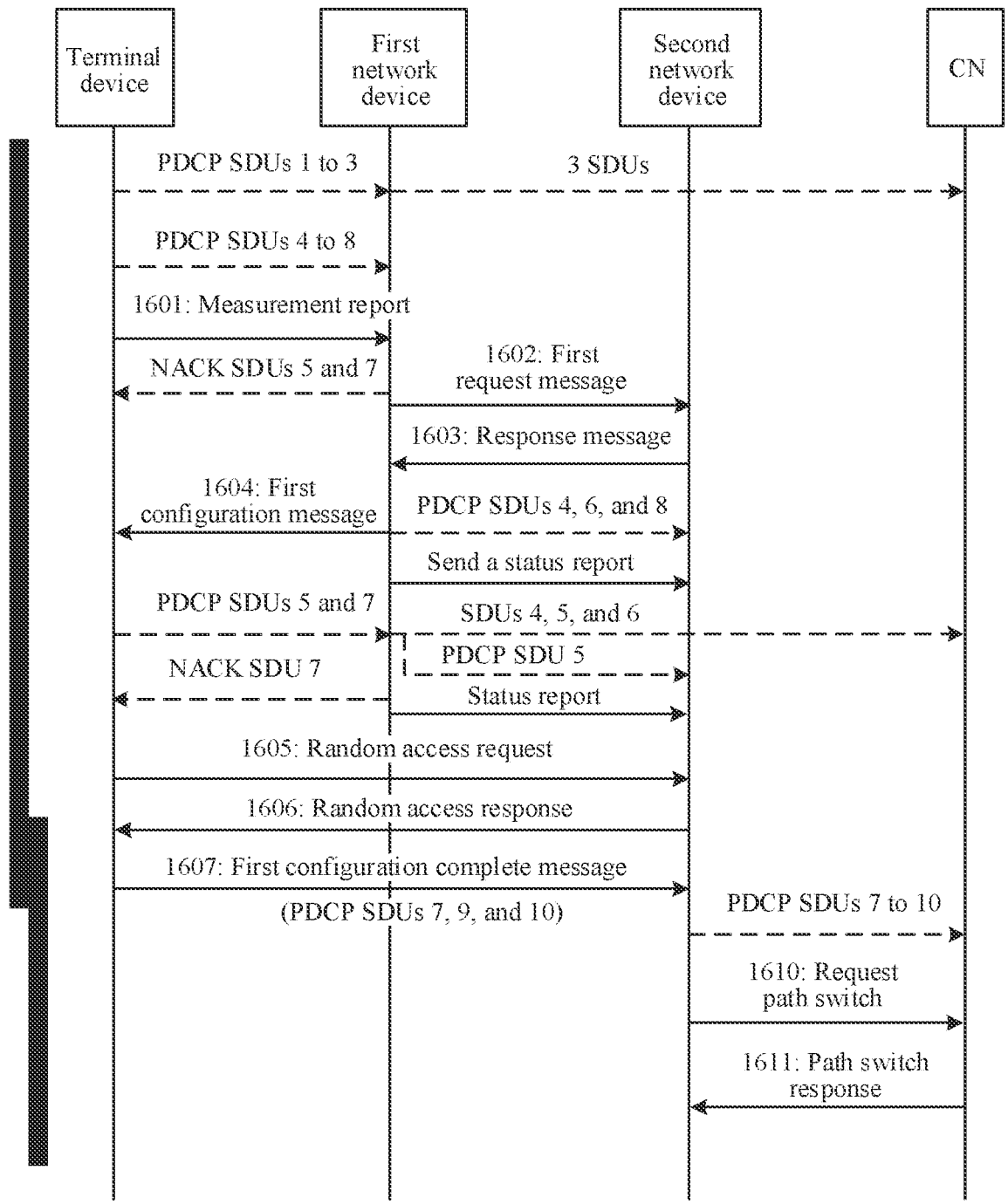
FIG. 17 is a schematic flowchart of a handover method according to another embodiment of this application.

FIG. 17 is a schematic flowchart of a handover method according to another embodiment of this application. In the method shown in FIG. 17, a specific handover process of uplink data transmission is described.

The handover method 1600 shown in FIG. 17 is similar to the handover method 1200 shown in FIG. 13. To avoid repetition, detailed descriptions are properly omitted herein.

The following mainly describes a difference between FIG. 17 and FIG. 13, and a same part of FIG. 17 and FIG. 13 is not described in detail.

Blocks 1601 to 1604 correspond to blocks 1201 to 1204, and a difference lies in that in block 1602 and block 1603, messages carrying corresponding content are a handover request message and a handover request response message.

After block 1603 or block 1604, the first network device starts to forward uplink data to the second network device. In this case, the first network device may continue to forward uplink data to the CN. The second network device backs up the uplink data.

In addition, the first network device may send a status report (SN status Transfer) to the second network device, to notify the second network device of data already transferred to the CN. In this case, the second network device may discard the data and store only a data packet not transferred by the first network device to the CN.

In this way, after uplink data from the terminal device arrives at the first network device, after the first network device performs processing such as deciphering and reordering, the first network device transfers the data to the CN. Data not transferred is forwarded to the second network device.

Blocks 1605 and 1606 correspond to blocks 1205 and 1206, and the terminal device is synchronized with the second network device and obtains an uplink resource and a TA.

1607: The terminal device sends a first configuration complete message to the second network device.

Specifically, when the terminal device receives the UL grant and the TA of the second network device, in a non-contention-based random access process, it indicates that uplink access succeeds. Subsequently, the terminal device may send the first configuration complete message (also may be referred to as an RRC Connection Reconfiguration Complete message) to the second network device, to indicate that the terminal device successfully accesses the second network device.

Before block 1607, the terminal device sends uplink data to the first network device. In block 1607 and after block 1607, the terminal device starts to send uplink data to the second network device. The terminal device first sends a data packet (for example, a PDCP SDU 7) that is not determined as being successfully received, and then sends a new data packet (for example, PDCP SDUs 9 and 10) to the second network device. After receiving the RRC connection reconfiguration complete message and corresponding data, the second network device starts to transfer uplink data (for example, the PDCP SDUs 7, 8, 9, and 10) to the CN.

Blocks 1609 and 1610 correspond to blocks 1209 and 1210. Refer to descriptions of FIG. 13.

It should be noted that the examples of FIG. 12 to FIG. 17 are only intended to help a person skilled in the art understand the embodiments of this application, instead of limiting the embodiments of this application to examples of specific values or specific scenarios. Apparently, a person skilled in the art may make various equivalent modifications or changes based on the examples in FIG. 12 to FIG. 17. Such modifications or changes shall also fall within the range of the embodiments of this application.

It should be understood that sequence numbers of the foregoing processes do not indicate an execution sequence, and an execution sequence of processes shall be determined based on functions and internal logic thereof, and shall constitute no limitation on an implementation process of the embodiments of this application.

The foregoing describes the handover methods based on the embodiments of this application in detail with reference to FIG. 1 to FIG. 17, and the following describes devices in the embodiments of this application in detail with reference to FIGS. 18 to 22.

Figure 18:
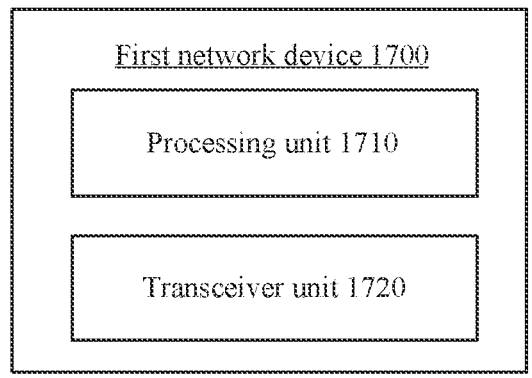
FIG. 18 is a schematic block diagram of a first network device according to an embodiment of this application.

FIG. 18 is a schematic block diagram of a first network device 1700 according to an embodiment of this application. Specifically, as shown in FIG. 18, the first network device 1700 includes: a processing unit 1710 and a transceiver unit 1720.

Specifically, the processing unit controls the transceiver unit to send a first configuration message to a terminal device, where the first configuration message is used to instruct the terminal device to configure a second ciphering/deciphering function associated with a second network device and share a first data packet numbering/reordering function, and the terminal device is configured with the first data packet numbering/reordering function and a first ciphering/deciphering function associated with the first network device; and to receive a first configuration complete message sent by the terminal device.

Therefore, in this embodiment, the first configuration message is used so that the terminal device may configure the function associated with the second network device. Therefore, during handover, the terminal device may simultaneously perform data transmission with the second network device and the first network device, to reduce or avoid a service interruption time caused by handover.

Optionally, in another embodiment, the second network device is configured with a third ciphering/deciphering function, the third ciphering/deciphering function corresponds to the second ciphering/deciphering function, the first network device is configured with a fourth ciphering/deciphering function, and the fourth ciphering/deciphering function corresponds to the first ciphering/deciphering function.

Optionally, in another embodiment, the processing unit is further configured to configure a fifth ciphering/deciphering function, and the fifth ciphering/deciphering function corresponds to the second ciphering/deciphering function.

Optionally, in another embodiment, a second Packet Data Convergence Protocol PDCP entity and a first PDCP entity are established for the communications device, the second PDCP entity includes the second ciphering/deciphering function and a second data packet numbering/reordering function, and the first PDCP entity includes the first ciphering/deciphering function and the first data packet numbering/reordering function;

when the terminal device processes downlink data, the first data packet numbering/reordering function of the first PDCP entity performs reordering processing on data on which the second ciphering/deciphering function of the second PDCP entity has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function of the second PDCP entity to perform ciphering processing; or the second ciphering/deciphering function and the first PDCP entity are established for the terminal device, and the first PDCP entity includes the first ciphering/deciphering function and the first data packet numbering/reordering function;

when the terminal device processes downlink data, the first data packet numbering/reordering function of the first PDCP entity performs reordering processing on data on which the second ciphering/deciphering function has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function to perform ciphering processing.

Optionally, in another embodiment, the transceiver unit is further configured to: before sending the first configuration message to the terminal device, send a first request message to the second network device, where the first request message is used to request to hand over the terminal device to the second network device or the first request message is used to request to add the second network device as an auxiliary service device for the terminal device, and the first request message includes at least one of the following:

a first security key that is allocated by the first network device to the second network device and that is associated with the terminal device;

a second security key that is used by the first network device and that is associated with the terminal device;

first indication information indicating that the terminal device has a multi-connection-based handover capability;

second indication information indicating that the terminal device has a multi-connection communication capability; and third indication information indicating whether data forwarded by the first network device to the second network device is a repeated version or a non-repeated version; and receive a response message sent by the second network device, where the response message is used to indicate that the second network device accepts a request of the first request message of the first network device, and the response message includes at least one of the following:

a third security key allocated by the second network device to the terminal device;

a configuration parameter used by the second network device to configure a PDCP entity of the terminal device;

a configuration parameter used by the second network device to configure the terminal device to establish a second header adding/removing function and/or the second ciphering/deciphering function and/or a second header compression/decompression function corresponding to the second network device;

fourth indication information indicating that the terminal device uses the first data packet numbering/reordering function; and fifth indication information instructing the terminal device to use, during communication with the second network device, a security key that is allocated by the first network device to the terminal device and that corresponds to the first network device.

Optionally, in another embodiment, the transceiver unit is further configured to: after receiving the first configuration complete message sent by the terminal device, send sixth indication information to the second network device, where the sixth indication information is used to indicate that the terminal device already completes RRC connection reconfiguration; or send seventh indication information to the terminal device, where the seventh indication information is used to instruct the terminal device to release an RRC connection to the first network device; or send eighth indication information to the terminal device, where the eighth indication information is used to instruct the terminal device to start an RRC connection to the second network device.

Optionally, in another embodiment, the transceiver unit is further configured to:

send non-enciphered first data to the second network device, so that the second network device enciphers the first data by using the third ciphering/deciphering function, where the first data is a part or all of data received by a PDCP layer of the first network device from a higher layer of the PDCP layer; or receive second data that is sent by the second network device and that is deciphered by using the third ciphering/deciphering function.

Optionally, in another embodiment, the transceiver unit is further configured to:

send third data enciphered by using the fifth ciphering/deciphering function to the second network device, where the third data is a part or all of data received by a PDCP layer of the first network device from a higher layer of the PDCP layer; or receive non-deciphered fourth data sent by the second network device; and decipher, by the first network device, the fourth data by using the fifth ciphering/deciphering function.

Optionally, in another embodiment, the transceiver unit is further configured to send ninth indication information to the second network device, where the ninth indication information is used to indicate downlink data already successfully received by the terminal device, so that the second network device discards the downlink data already successfully received by the terminal device.

Optionally, in another embodiment, the transceiver unit is further configured to send tenth indication information to the second network device, where the tenth indication information is used to indicate uplink data already successfully transferred to a third network device by the first network device, so that the second network device discards the uplink data already successfully transferred to the third network device by the first network device.

Therefore, in this embodiment, the first configuration message is used so that the terminal device may configure the function associated with the second network device. Therefore, during handover, the terminal device may simultaneously perform data transmission with the second network device and the first network device, to reduce or avoid a service interruption time caused by handover.

It should be understood that the first network device 1700 shown in FIG. 18 can implement processes of the first network device in the method embodiments in FIG. 2 to FIG. 17. Operations and/or functions of the modules of the first network device 1700 are used to implement corresponding procedures in the method embodiments in FIG. 2 to FIG.

17. For details, refer to the descriptions in the method embodiments. To avoid repetition, details are properly omitted herein.

Figure 19:
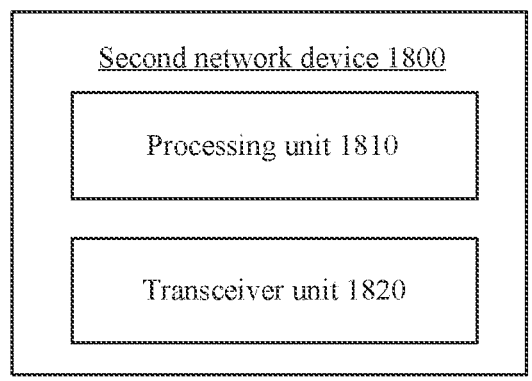
FIG. 19 is a schematic block diagram of a second network device according to an embodiment of this application.

FIG. 19 is a schematic block diagram of a second network device 1800 according to an embodiment of this application. Specifically, as shown in FIG. 19, the second network device 1800 includes: a processing unit 1810 and a transceiver unit 1820.

Specifically, the processing unit controls the transceiver unit to receive a first request message sent by a first network device, where the first request message is used to request to hand over the terminal device to the second network device or the first request message is used to request to add the second network device as an auxiliary service device for the terminal device, and the first request message includes at least one of the following:

a first security key that is allocated by the first network device to the second network device and that is associated with the terminal device;

a second security key that is used by the first network device and that is associated with the terminal device;

first indication information indicating that the terminal device has a multi-connection-based handover capability;

second indication information indicating that the terminal device has a multi-connection communication capability; and third indication information indicating whether data forwarded by the first network device to the second network device is a repeated version or a non-repeated version; and to send a response message to the first network device, so that the first network device sends a first configuration message to the terminal device, where the first configuration message is used to instruct the terminal device to configure a second ciphering/deciphering function associated with the second network device and share a first data packet numbering/reordering function, the terminal device is configured with the first data packet numbering/reordering function and a first ciphering/deciphering function associated with the first network device, the response message is used to indicate that the second network device accepts a request of the first request message of the first network device, and the response message includes at least one of the following:

a third security key allocated by the second network device to the terminal device;

a configuration parameter used by the second network device to configure a Packet Data Convergence Protocol PDCP entity of the terminal device;

a configuration parameter used by the second network device to configure the terminal device to establish a second header adding/removing function and/or the second ciphering/deciphering function and/or a second header compression/decompression function corresponding to the second network device;

fourth indication information indicating that the terminal device uses the first data packet numbering/reordering function; and fifth indication information instructing the terminal device to use, during communication with the second network device, a security key that is allocated by the first network device to the terminal device and that corresponds to the first network device.

Therefore, in this embodiment, the first configuration message is used so that the terminal device may configure the function associated with the second network device. Therefore, during handover, the terminal device may simultaneously perform data transmission with the second network device and the first network device, to reduce or avoid a service interruption time caused by handover.

Optionally, in another embodiment, the processing unit is further configured to configure a third ciphering/deciphering function, and the third ciphering/deciphering function corresponds to the second ciphering/deciphering function.

The first network device is configured with a fourth ciphering/deciphering function, and the fourth ciphering/deciphering function corresponds to the first ciphering/deciphering function.

Optionally, in another embodiment, the first network device is configured with a fifth ciphering/deciphering function, and the fifth ciphering/deciphering function corresponds to the second ciphering/deciphering function.

Optionally, in another embodiment, a second PDCP entity and a first PDCP entity are established for the communications device, the second PDCP entity includes the second ciphering/deciphering function and a second data packet numbering/reordering function, and the first PDCP entity includes the first ciphering/deciphering function and the first data packet numbering/reordering function;

when the terminal device processes downlink data, the first data packet numbering/reordering function of the first PDCP entity performs reordering processing on data on which the second ciphering/deciphering function of the second PDCP entity has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function of the second PDCP entity to perform ciphering processing; or the second ciphering/deciphering function and the first PDCP entity are established for the terminal device, and the first PDCP entity includes the first ciphering/deciphering function and the first data packet numbering/reordering function;

when the terminal device processes downlink data, the first data packet numbering/reordering function of the first PDCP entity performs reordering processing on data on which the second ciphering/deciphering function has performed deciphering processing; and when the terminal device processes uplink data, the first data packet numbering/reordering function of the first PDCP entity performs numbering processing on data, and then sends the data to the first ciphering/deciphering function of the first PDCP entity and/or the second ciphering/deciphering function to perform ciphering processing.

Optionally, in another embodiment, the transceiver unit is further configured to receive sixth indication information sent by the first network device, where the sixth indication information is used to indicate that the terminal device already completes RRC connection reconfiguration.

Optionally, in another embodiment, the transceiver unit is further configured to receive non-enciphered first data sent by the first network device; and the processing unit is further configured to encipher the first data by using the third ciphering/deciphering function, where the first data is a part or all of data received by a PDCP layer of the first network device from a higher layer of the PDCP layer; or the transceiver unit is further configured to send second data that is deciphered by using the third ciphering/deciphering function to the first network device.

Optionally, in another embodiment, the transceiver unit is further configured to receive third data that is enciphered by using the fifth ciphering/deciphering function and that is sent by the first network device, where the third data is a part or all of the data received by the PDCP layer of the first network device from the higher layer of the PDCP layer; or send non-deciphered fourth data to the first network device, so that the first network device deciphers the fourth data by using the fifth ciphering/deciphering function.

Optionally, in another embodiment, the transceiver unit is further configured to receive ninth indication information sent by the first network device, where the ninth indication information is used to indicate downlink data already successfully received by the terminal device, so that the second network device discards the downlink data already successfully received by the terminal device.

Optionally, in another embodiment, the transceiver unit is further configured to receive tenth indication information sent by the first network device, where the tenth indication information is used to indicate uplink data already successfully transferred to a third network device by the first network device, so that the second network device discards the uplink data already successfully transferred to the third network device by the first network device.

Optionally, in another embodiment, the transceiver unit is further configured to: after the second network device and the terminal device establish an RRC connection, send an eleventh indication message to the first network device, where the eleventh indication information is used to instruct the first network device to stop sending the downlink data to the terminal device.

Therefore, in this embodiment, the first configuration message is used so that the terminal device may configure the function associated with the second network device. Therefore, during handover, the terminal device may simultaneously perform data transmission with the second network device and the first network device, to reduce or avoid a service interruption time caused by handover.

It should be understood that the second network device 1800 shown in FIG. 19 can implement processes of the second network device in the method embodiments in FIG. 2 to FIG. 17. Operations and/or functions of the modules of the second network device 1800 are used to implement corresponding procedures in the method embodiments in FIG. 2 to FIG. 17. For details, refer to the descriptions in the method embodiments. To avoid repetition, details are properly omitted herein.

Figure 20:
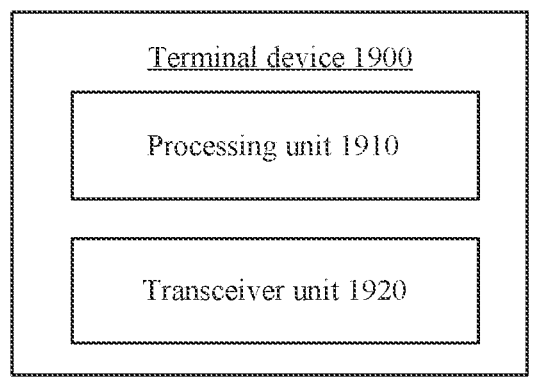
FIG. 20 is a schematic block diagram of a terminal device according to an embodiment of this application.

FIG. 20 is a schematic block diagram of a terminal device 1900 according to an embodiment of this application. Specifically, as shown in FIG. 20, the terminal device 1900 includes: a processing unit 1910 and a transceiver unit 1920.

Specifically, the processing unit controls the transceiver unit to receive a first configuration message sent by a first network device, where the first configuration message is used to instruct the terminal device to configure a second ciphering/deciphering function associated with a second network device and share a first data packet numbering/reordering function, and the terminal device is configured with the first data packet numbering/reordering function and a first ciphering/deciphering function associated with the first network device; and to send a first configuration complete message to the first network device.

Therefore, in this embodiment, the first configuration message is used so that the terminal device may configure the function associated with the second network device. Therefore, during handover, the terminal device may simultaneously perform data transmission with the second network device and the first network device, to reduce or avoid a service interruption time caused by handover.

Optionally, in another embodiment, the second network device is configured with a third ciphering/deciphering function, the third ciphering/deciphering function corresponds to the second ciphering/deciphering function, the first network device is configured with a fourth ciphering/deciphering function, and the fourth ciphering/deciphering function corresponds to the first ciphering/deciphering function.

Optionally, in another embodiment, the first network device is configured with a fifth ciphering/deciphering function, and the fifth ciphering/deciphering function corresponds to the second ciphering/deciphering function.

Optionally, in another embodiment, a second Packet Data Convergence Protocol PDCP entity and a first PDCP entity are established for the communications device, the second PDCP entity includes the second ciphering/deciphering function and a second data packet numbering/reordering function, and the first PDCP entity includes the first ciphering/deciphering function and the first data packet numbering/reordering function; and the processing unit is further configured to:

when the terminal device processes downlink data, control the first data packet numbering/reordering function of the first PDCP entity to perform reordering processing on data on which the second ciphering/deciphering function of the second PDCP entity has performed deciphering processing; and when the terminal device processes uplink data, control the first data packet numbering/reordering function of the first PDCP entity to perform numbering processing on data, and then to send the data to the first ciphering/deciphering function of the first PDCP entity and/or the second ciphering/deciphering function of the second PDCP entity to perform ciphering processing; or the second ciphering/deciphering function and the first PDCP entity are established for the terminal device, and the first PDCP entity includes the first ciphering/deciphering function and the first data packet numbering/reordering function; and the processing unit is further configured to:

when the terminal device processes downlink data, control the first data packet numbering/reordering function of the first PDCP entity to perform reordering processing on data on which the second ciphering/deciphering function has performed deciphering processing; and when the terminal device processes uplink data, control the first data packet numbering/reordering function of the first PDCP entity to perform numbering processing on data, and then to send the data to the first ciphering/deciphering function of the first PDCP entity and/or the second ciphering/deciphering function to perform ciphering processing.

Optionally, in another embodiment, the transceiver unit is further configured to receive seventh indication information sent by the first network device, where the seventh indication information is used to instruct the terminal device to release an RRC connection to the first network device;

optionally, the processing unit is further configured to release an RRC connection to the first network device; or the transceiver unit is further configured to receive eighth indication information sent by the first network device, where the eighth indication information is used to instruct the terminal device to start an RRC connection to the second network device.

Optionally, the processing unit is further configured to start an RRC connection to the second network device.

Therefore, in this embodiment, the first configuration message is used, so that the terminal device may configure the function associated with the second network device. Therefore, during handover, the terminal device may simultaneously perform data transmission with the second network device and the first network device, to reduce or avoid a service interruption time caused by the handover.

It should be understood that the terminal device 1900 shown in FIG. 20 can implement each process related to the terminal device in the method embodiments of FIG. 2 to FIG. 17. Operations and/or functions of the modules of the terminal device 1900 are used to implement corresponding procedures in the method embodiments in FIG. 2 to FIG. 17. For details, refer to the descriptions in the method embodiments. To avoid repetition, details are properly omitted herein.

Figure 21:
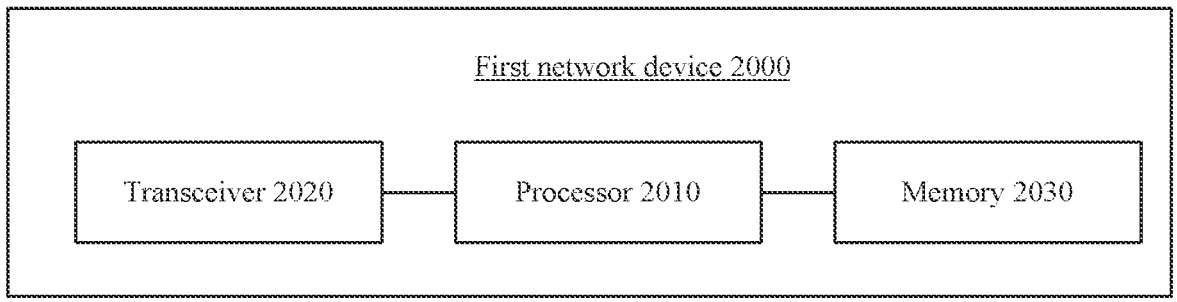
FIG. 21 is a schematic block diagram of a first network device according to another embodiment of this application.

FIG. 21 is a schematic block diagram of a first network device 2000 according to an embodiment of this application. Specifically, as shown in FIG. 21, the first network device 2000 includes: a processor 2010 and a transceiver 2020, where the processor 2010 and the transceiver 2020 are connected. Optionally, the network device 2000 further includes a memory 2030, where the memory 2030 and the processor 2010 are connected, and the processor 2010, the memory 2030, and the transceiver 2020 communicate with each other and transfer a control and/or data signal through an internal connection path. The memory 2030 may be configured to store an instruction, the processor 2010 is configured to: execute the instruction stored by the memory 2030, and control the transceiver 2020 to receive and send information or signals, and the controller 2010 executes the instruction in the memory 2030 to perform each process of the first network device in the method embodiments in FIG. 2 to FIG. 17. To avoid repetition, details are not described herein again.

Figure 22:
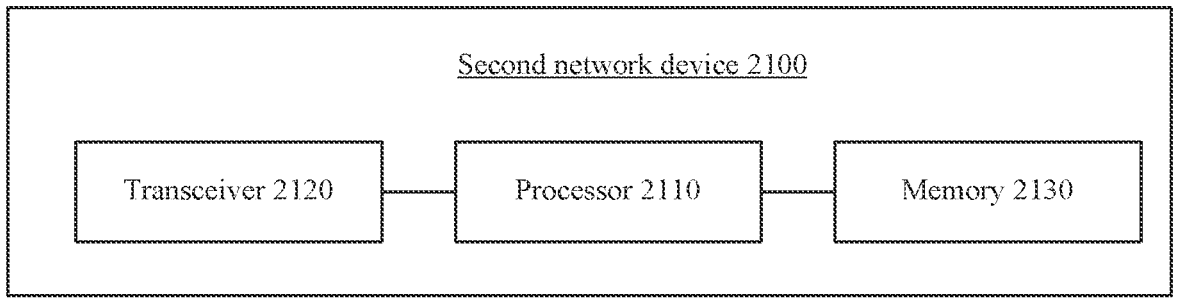
FIG. 22 is a schematic block diagram of a second network device according to another embodiment of this application.

FIG. 22 is a schematic block diagram of a second network device 2100 according to an embodiment of this application. Specifically, as shown in FIG. 22, the second network device 2100 includes: a processor 2110 and a transceiver 2120, where the processor 2110 and the transceiver 2120 are connected. Optionally, the second network device 2100 further includes a memory 2130, where the memory 2130 and the processor 2110 are connected, and the processor 2110, the memory 2130, and the transceiver 2120 communicate with each other and transfer a control and/or data signal through an internal connection path. The memory 2130 may be configured to store an instruction, the processor 2110 is configured to: execute the instruction stored by the memory 2130, and control the transceiver 2120 to receive and send information or signals, and the controller 2110 executes the instruction in the memory 2130 to perform each process of the second network device in the method embodiments in FIG. 2 to FIG. 17. To avoid repetition, details are not described herein again.

Figure 23:
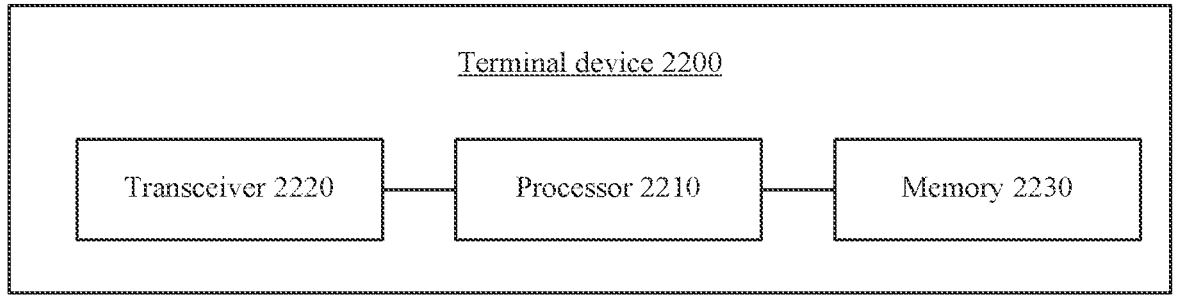
FIG. 23 is a schematic block diagram of a terminal device according to another embodiment of this application.

FIG. 23 is a schematic block diagram of a terminal device 2200 according to an embodiment of this application. Specifically, as shown in FIG. 23, the terminal device 2200 includes: a processor 2210 and a transceiver 2220, where the processor 2210 and the transceiver 2220 are connected. Optionally, the terminal device 2200 further includes a memory 2230, where the memory 2230 and the processor 2210 are connected, and the processor 2210, the memory 2230, and the transceiver 2220 communicate with each other and transfer a control and/or data signal through an internal connection path. The memory 2230 may be configured to store an instruction, the processor 2210 is configured to: execute the instruction stored by the memory 2230, and control the transceiver 2220 to receive and send information or signals, and the controller 2210 executes the instruction in the memory 2230 to perform each process of the terminal device in the method embodiments in FIG. 2 to FIG. 17. To avoid repetition, details are not described herein again.

It should be noted that the method embodiments of the embodiments of this application may be applied to a processor (for example, the processor 2010 in FIG. 21, the processor 2110 in FIG. 22, or the processor 2210 in FIG. 23), or may be implemented by a processor. The processor may be an integrated circuit chip and has a signal processing capability. In an implementation process, actions, functions, tasks, operations, etc., in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logical device, a discrete gate or transistor logic device, or a discrete hardware component. It may implement or perform the methods, the actions, functions, tasks, operations, etc., and logical block diagrams that are disclosed in the embodiments of this application. The general purpose processor may be a microprocessor, or the processor may be any conventional processor or the like. Actions, functions, tasks, operations, etc., of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the actions, functions, tasks, operations, etc., in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

It should be understood that the communications device in the embodiments of this application may be a terminal device or may be another device. The foregoing only uses an example in which the communications device is a terminal device for description, but the embodiments of this application are not limited thereto. The another device may include a device in another form such as a circuit.

Figure 24:
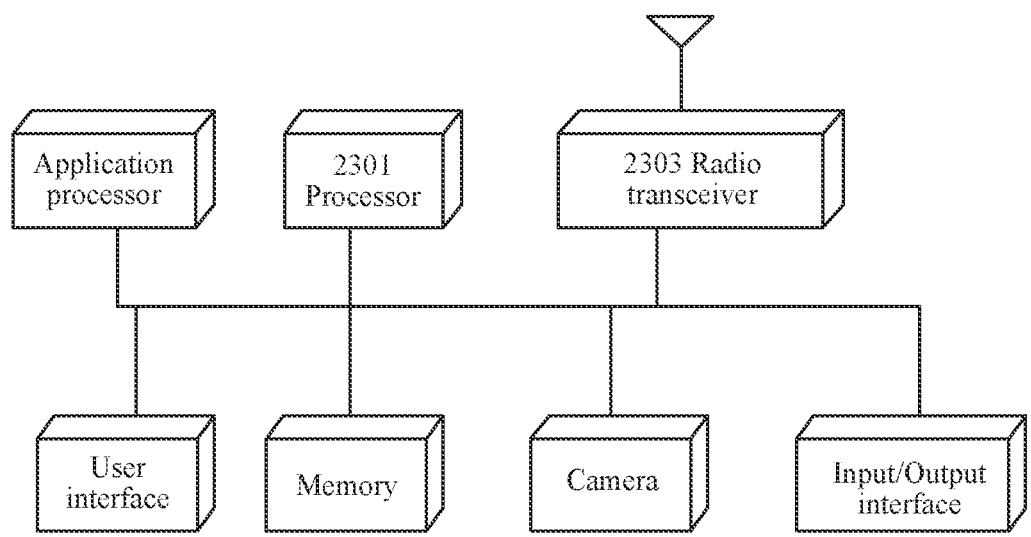
FIG. 24 is a schematic structural diagram of a communications device according to an embodiment of this application.

For the communications device in the embodiments of this application, refer to the device shown in FIG. 24. The device includes a processor 2301, an application processor, a memory, a user interface, and some other components (including a device such as a power supply not shown). In FIG. 24, the processing unit of the terminal device may be the processor 2301, and performs a corresponding function. The transceiver unit of the terminal device may be the radio transceiver 2303 in the figure, and performs a corresponding function through an antenna. It may be understood that the components shown in the figure are only examples, and are not mandatory components for implementation of the embodiments.

Figure 25:
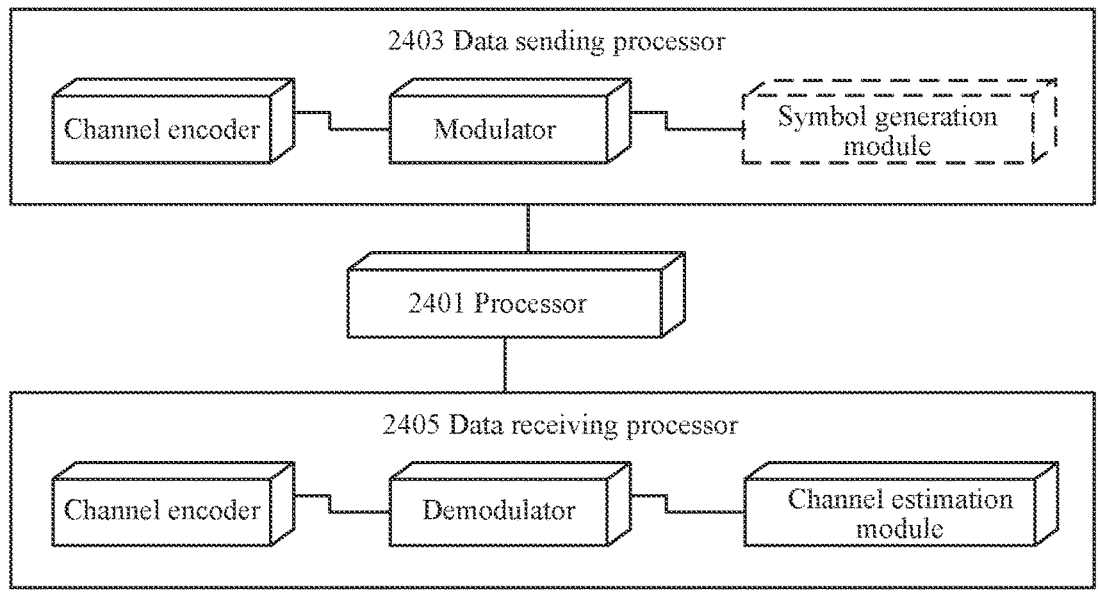
FIG. 25 is another schematic structural diagram of a communications device according to an embodiment of this application.

For the communications device in this embodiment, refer to the device shown in FIG. 25. In an example, the device may perform a function similar to that of the processor in FIG. 24. In FIG. 25, the device includes a processor, a data sending processor, and a data receiving processor. In FIG. 25, the processing unit of the terminal device may be the processor 2401, and perform a corresponding function. The transceiver unit of the terminal device may include a sending unit and a receiving unit, the sending unit may be a data sending processor 2403 in FIG. 25, and the receiving unit may be a data receiving processor 2405 in FIG. 25. Although the channel encoder and the channel decoder are shown in the figure, it may be understood that the modules constitute no limitative description on the embodiments, and are only examples.

Figure 26:
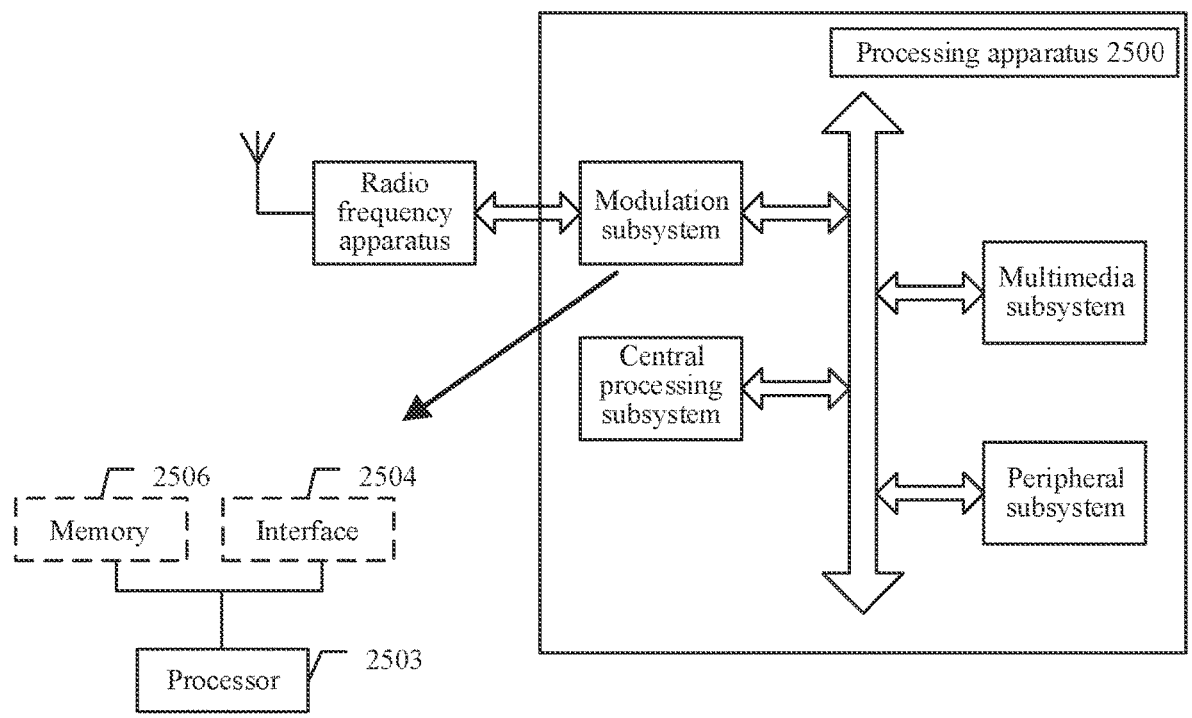
FIG. 26 is another schematic structural diagram of a communications device according to an embodiment of this application.

FIG. 26 shows another form of this embodiment. A processing apparatus 2500 includes modules such as a modulation subsystem, a central processing subsystem, and a peripheral subsystem. The communications device in this embodiment may be used as the modulation subsystem. Specifically, the modulation subsystem may include a processor 2503 and an interface 2504. The processor 2503 performs a function of the processing unit, and the interface 2504 performs a function of the sending unit and/or the receiving unit. In another variation, the modulation subsystem includes a memory 2506, a processor 2503, and a program that is stored by the memory and that can be run on the processor. When executing the program, the processor performs the method in one of Embodiments 1 to 5. It should be noted that the memory 2506 may be non-volatile or may be volatile, and may be located in the modulation subsystem, or may be located in the processing apparatus 2500 as long as the memory 2506 may be connected to the processor 2503.

The processor in the embodiments may be a general purpose processor, a digital signal processor (DSP), an application specific integrated circuit (ASIC), a field programmable gate array (FPGA) or another programmable logical device, a discrete gate or transistor logic device, or a discrete hardware component. It may implement or perform the methods, the actions, functions, tasks, operations, etc., and logical block diagrams that are disclosed in the embodiments of this application. The general purpose processor may be a microprocessor, or the processor may be any conventional processor or the like. Actions, functions, tasks, operations, etc., of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory 2502, and the processor 2501 reads an instruction in the memory 2502, and completes the actions, functions, tasks, operations, etc., of the foregoing methods in combination with hardware of the processor.

It should be understood that "an embodiment" or "an embodiment" mentioned in the whole specification means that particular features, structures, or characteristics related to the embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithms may be implemented by electronic hardware, computer software, or a combination thereof. To clearly describe the interchangeability between the hardware and the software, the foregoing has generally described compositions and actions, functions, tasks, operations, etc., of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When the present disclosure may be implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by this application includes a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A handover method, comprising:
sending, by a first network device, a handover request message indicating a request to hand over a communication device to a second network device;
receiving, by the first network device from the second network device, a handover response message indicating that the request from the first network device is accepted;
sending, by the first network device, a radio resource control (RRC) configuration message to the communication device, wherein the RRC configuration message instructs the communication device to configure a second ciphering/deciphering function and share a first data packet numbering/reordering function for processing data between the second network device and a terminal device and data between the first network device and the terminal device, and the second ciphering/deciphering function is associated with the second network device; and
sending, by the first network device, downlink data to the communication device and the second network device.

2. The method of claim 1, wherein
the first network device is configured with a fourth ciphering/deciphering function corresponding to a first ciphering/deciphering function of the communication device; which is
configured with the first data packet numbering/reordering function.

3. The method of claim 1, wherein the handover request message comprises
first indication information indicating that the communication device has a multi-connection-based handover capability to establish connections to the first network device and the second network device in advance in a handover process, and then to replace the connection of the first network device; or
wherein the handover response message comprises one or more of:
a configuration parameter that is configured by the second network device and that is used by the communication device to establish the second ciphering/deciphering function,
a configuration parameter that is configured by the second network device and that is used by the communication device to establish a second header compression/decompression function corresponding to the second network device, or
fourth indication information instructing the communication device to use the first data packet numbering/reordering function.

4. The method of claim 1, further comprising:
sending, by the first network device, ninth indication information to the second network device, wherein the ninth indication information indicates downlink data which has already been successfully received by the communication device.

5. The method of claim 1, further comprising:
sending, by the first network device, at least a portion of the downlink data to the second network device through copying or non-copying.

6. A handover method, comprising:
sending, by a first network device, a handover request message indicating a request to hand over a communication device to a second network device;
receiving, by a second network device, the handover request message to request to hand over the communication device from the first network device;

sending, by the second network device, a handover response message to the first network device, wherein the handover response message indicates that the request from the first network device is accepted;

receiving, by the first network device, the handover response message;

sending, by the first network device, a radio resource control (RRC) configuration message to the communication device, wherein the RRC configuration message instructs the communication device to configure a second ciphering/deciphering function and share a first data packet numbering/reordering function for processing data between the second network device and a terminal device and data between the first network device and the terminal device, and the second ciphering/deciphering function is associated with the second network device;

sending, by the first network device, downlink data to the communication device and the second network device; and receiving, by the second network device, the downlink data from the first network device.

7. The method of claim 6, wherein the handover request message comprises:

first indication information indicating that the communication device has a multi-connection-based handover capability to establish connections to the first network device and the second network device in advance in a handover process, and then to replace the connection of the first network device.

8. The method of claim 6, wherein the handover response message comprises one or more of:

a configuration parameter that is configured by the second network device and that is used by the communication device to establish the second ciphering/deciphering function;

a configuration parameter that is configured by the second network device and that is used by the communication device to establish a second header compression/decompression function corresponding to the second network device, or fourth indication information instructing the communication device to use the first data packet numbering/reordering function.

9. The method of claim 6, wherein the second network device is configured with a third ciphering/deciphering function corresponding to the second ciphering/deciphering function, the first network device is configured with a fourth ciphering/deciphering function corresponding to a first ciphering/deciphering function of the communication device which is configured with the first data packet numbering/reordering function.

10. The method of claim 6, further comprising:

sending, by the first network device, a ninth indication information to the second network device;

receiving, by the second network device, the ninth indication information from the first network device indicating downlink data which has already been successfully received by the communication device.

11. The method of claim 6, wherein the RRC configuration message comprises a part of the handover response message.

12. A communication apparatus, comprising:

a processor coupled to a non-transitory memory that stores an execution instruction, which when executed by the processor, causes the communication apparatus to perform following operations:

sending a handover request message to request to hand over a communication device to a second network device;

receiving a handover response message from the second network device, wherein the handover response message indicates that the request is accepted, sending a radio resource control (RRC) configuration message to the communication device, wherein the RRC configuration message instructs the communication device to configure a second ciphering/deciphering function and share a first data packet numbering/reordering function for processing data between the second network device and a terminal device and data between the first network device and the terminal device, and the second ciphering/deciphering function is associated with the second network device; and sending downlink data to the communication device and the second network device.

13. The communication apparatus of claim 12, wherein the communication apparatus is configured with a fourth ciphering/deciphering function corresponding to a first ciphering/deciphering function of the communication device which is configured with the first data packet numbering/reordering function.

14. The communication apparatus of claim 12, wherein the handover request message comprises:

first indication information indicating that the communication device has a multi-connection-based handover capability to establish a connection to the communication apparatus and the second network device in advance in a handover process, and then to replace the connection of the communication apparatus; or the handover response message comprises one or more of:

a configuration parameter that is configured by the second network device and that is used by the communication device to establish the second ciphering/deciphering function, a configuration parameter that is configured by the second network device and that is used by the communication device to establish a second header compression/decompression function corresponding to the second network device; or fourth indication information instructing the communication device to use the first data packet numbering/reordering function.

15. The communication apparatus of claim 12, wherein the operations further comprise:

sending ninth indication information to the second network device, wherein the ninth indication information indicates downlink data which has already been successfully received by the communication device.

16. The communication apparatus of claim 12, wherein the operations further comprise:

sending at least a portion of the downlink data to the second network device through copying or non-copying.

17. A communication system, comprising a first network device and a second network device, wherein the first network device is configured to send a handover request message indicating a request to hand over a communication device to the second network device;

the second network device is configured to receive the handover request message to request to hand over the communication device from the first network device;

the second network device is further configured to send a handover response message indicating that the handover request from the first network device is accepted;

the first network device is further configured to receive the handover response message;

the first network device is further configured to send a radio resource control (RRC) configuration message to the communication device, wherein the RRC configuration message instructs the communication device to configure a second ciphering/deciphering function and share a first data packet numbering/reordering function for processing data between the second network device and a terminal device and data between the first network device and the terminal device, and the second ciphering/deciphering function is associated with the second network device;

the first network device is further configured to send downlink data to the communication device and the second network device; and the second network device is further configured to receive the downlink data from the first network device.

18. The communication system of claim 17, wherein the handover request message comprises first indication information indicating that the communication device has a multi-connection-based handover capability to establish a connection to the first network device and a second network device in advance in a handover process, and then to replace the connection of the first network device.

19. The communication system of claim 17, wherein the handover response message comprises one or more of:

a configuration parameter that is configured by the second network device and that is used by the communication device to establish the second ciphering/deciphering function;

a configuration parameter that is configured by the second network device and that is used by the communication device to establish a second header compression/decompression function corresponding to the second network device; or fourth indication information instructing the communication device to use the first data packet numbering/reordering function.

20. The communication system of claim 17, wherein the second network device is configured with a third ciphering/deciphering function corresponding to the second ciphering/deciphering function, the first network device is configured with a fourth ciphering/deciphering function corresponding to a first ciphering/deciphering function of the communication device which is configured with the first data packet numbering/reordering function.

21. The communication system of claim 17, wherein the second network device is further configured to receive ninth indication information from the first network device, where the ninth indication information indicates downlink data which has already been successfully received by the communication device.

22. The communication system of claim 17, wherein the RRC configuration message comprises a part of the handover response message.

* * * * *